United States Patent
Kwak et al.

(10) Patent No.: US 9,571,734 B2
(45) Date of Patent: Feb. 14, 2017

(54) MULTI DISPLAY DEVICE AND METHOD OF PHOTOGRAPHING THEREOF

(71) Applicant: SAMSUNG Electronics Co., Ltd., Suwon-si, Gyeonggi-do (KR)

(72) Inventors: Ji-yeon Kwak, Seoul (KR); Seok-weon Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 506 days.

(21) Appl. No.: 14/050,683

(22) Filed: Oct. 10, 2013

(65) Prior Publication Data

US 2014/0098188 A1  Apr. 10, 2014

(30) Foreign Application Priority Data

Oct. 10, 2012 (KR) .................. 10-2012-0112683

(51) Int. Cl.
*H04N 5/232* (2006.01)
*G06T 3/40* (2006.01)

(52) U.S. Cl.
CPC ............ *H04N 5/23238* (2013.01); *G06T 3/40* (2013.01)

(58) Field of Classification Search
CPC .................................................. H04N 5/23238
USPC ......................................................... 348/38
See application file for complete search history.

(56) References Cited

U.S. PATENT DOCUMENTS

| | | |
|---|---|---|
| 5,862,251 A | 1/1999 | Al-Karmi et al. |
| 6,545,669 B1 | 4/2003 | Kinawi et al. |
| 6,750,858 B1 | 6/2004 | Rosenstein |
| 6,819,939 B2 | 11/2004 | Masamura |
| 7,006,134 B1 | 2/2006 | Arai et al. |
| 7,120,317 B1 | 10/2006 | Wu et al. |
| 8,049,737 B2 | 11/2011 | Cho et al. |
| 2003/0179422 A1 | 9/2003 | Liu |
| 2004/0020941 A1 | 2/2004 | Engesser et al. |
| 2004/0150671 A1 | 8/2004 | Kamiwada et al. |
| 2006/0062466 A1 | 3/2006 | Zou et al. |
| 2006/0161870 A1 | 7/2006 | Hotelling et al. |
| 2007/0242056 A1 | 10/2007 | Engelhardt et al. |
| 2008/0126955 A1 | 5/2008 | Takatoshi |

(Continued)

FOREIGN PATENT DOCUMENTS

| | | |
|---|---|---|
| EP | 2244166 | 10/2010 |
| EP | 2347317 | 7/2011 |

(Continued)

OTHER PUBLICATIONS

US 7,092,574, 08/2006, Suzuki et al. (withdrawn)

(Continued)

*Primary Examiner* — Yulin Sun

(74) *Attorney, Agent, or Firm* — Staas & Halsey LLP

(57) ABSTRACT

A multi display device and a method of photographing thereof. The multi display device includes a first body having a first display unit, a second body having a second display unit, a hinge unit disposed to connect the first and second bodies to each other, a first imaging unit provided in the first body, a second imaging unit provided in the second body, and a controller which, if photographing is performed by the first or second imaging unit when the first or second body pivots based on the hinge unit, combines a plurality of photographed images to generate a panorama image content.

21 Claims, 53 Drawing Sheets

(56) References Cited

U.S. PATENT DOCUMENTS

| | | |
|---|---|---|
| 2008/0148184 A1 | 6/2008 | Davis |
| 2008/0244468 A1 | 10/2008 | Nishihara et al. |
| 2009/0148149 A1* | 6/2009 | Chishima ............... G03B 17/04 396/326 |
| 2010/0060664 A1 | 3/2010 | Kilpatrick, II et al. |
| 2010/0064244 A1 | 3/2010 | Kilpatrick, II et al. |
| 2010/0073306 A1 | 3/2010 | Hickerson |
| 2010/0079355 A1 | 4/2010 | Kilpatrick, II et al. |
| 2010/0085382 A1 | 4/2010 | Lundqvist et al. |
| 2010/0103099 A1 | 4/2010 | Lee |
| 2010/0182265 A1 | 7/2010 | Kim et al. |
| 2010/0188353 A1 | 7/2010 | Yoon et al. |
| 2010/0245256 A1 | 9/2010 | Estrada et al. |
| 2010/0255862 A1 | 10/2010 | Mitsunaga et al. |
| 2010/0275159 A1 | 10/2010 | Matsubara et al. |
| 2011/0102314 A1 | 5/2011 | Roux |
| 2011/0107226 A1 | 5/2011 | Heo |
| 2011/0187646 A1 | 8/2011 | Mahmoud |
| 2011/0191704 A1 | 8/2011 | Hinckley et al. |
| 2011/0209102 A1 | 8/2011 | Hinckley et al. |
| 2011/0216064 A1 | 9/2011 | Dahl et al. |
| 2011/0291988 A1 | 12/2011 | Bamji et al. |
| 2011/0310031 A1 | 12/2011 | Harris et al. |
| 2012/0015694 A1 | 1/2012 | Han |
| 2012/0042246 A1 | 2/2012 | Schwesinger et al. |
| 2012/0064947 A1 | 3/2012 | Yi et al. |
| 2012/0081267 A1 | 4/2012 | Sirpal et al. |
| 2012/0081270 A1 | 4/2012 | Gimpl et al. |
| 2012/0084710 A1 | 4/2012 | Sirpal et al. |
| 2012/0218202 A1 | 8/2012 | Sirpal et al. |
| 2012/0242599 A1* | 9/2012 | Seo ....................... G06F 1/1641 345/173 |
| 2012/0249601 A1 | 10/2012 | Kawashimo et al. |

FOREIGN PATENT DOCUMENTS

| | | |
|---|---|---|
| EP | 2469804 | 6/2012 |
| GB | 2 394 381 A | 4/2004 |
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 1020100053597 | 5/2010 |
| KR | 10-0960577 | 6/2010 |
| KR | 1020100086639 | 8/2010 |
| KR | 1020100105005 | 9/2010 |
| KR | 1020100115547 | 10/2010 |
| KR | 1020100121880 | 11/2010 |
| KR | 1020100132772 | 12/2010 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110116699 | 10/2011 |
| KR | 10-1094769 | 12/2011 |
| KR | 20110139697 | 12/2011 |
| KR | 20120006674 | 1/2012 |
| KR | 1020120001944 | 1/2012 |
| KR | 1020120026395 | 3/2012 |
| KR | 1020120038692 | 4/2012 |
| WO | 2006086508 | 8/2006 |
| WO | 2012044510 | 4/2012 |
| WO | 2012044545 | 4/2012 |

OTHER PUBLICATIONS

Extended European Search Report dated Jan. 15, 2014 issued in EP Application No. 13188133.6.

Ken Hinckley et al.: "Codex: A Dual Screen Tablet Computer", Proceedings of the 27th International Conference on Human Factors in Computing Systems, Chi '09, Jan. 1, 2009, pp. 1933-1942, XP055083247, New York, New York, USA *figure 2*.

Jessica R. Cauchard et al: "Visual separation in mobile multi-display environments", Proceedings of the 24th Annual ACM Symposium on User Interface Software and Technology: Oct. 16-19, 2011, Santa Barbara, CA, USA, ACM, New York, NY, Oct. 16, 2011, pp. 451-460, XP058006144, *figure 2*.

Vlad Stirbu et al: "Experiences Building a Multi-Display Mobile Application for Exploring Mirror Worlds", Next Generation Mobile Applications, Services and Technologies 5th International Conference on, IEEE, Sep. 14, 2011, pp. 1-6, XP032012369, *figure 3*.

European Office Action dated Jul. 9, 2015 in corresponding European Patent Application No. 13188133.6.

European Examination Report dated Jan. 29, 2016 issued in corresponding European Patent Application 13 188 133.6.

* cited by examiner

FIG. 8
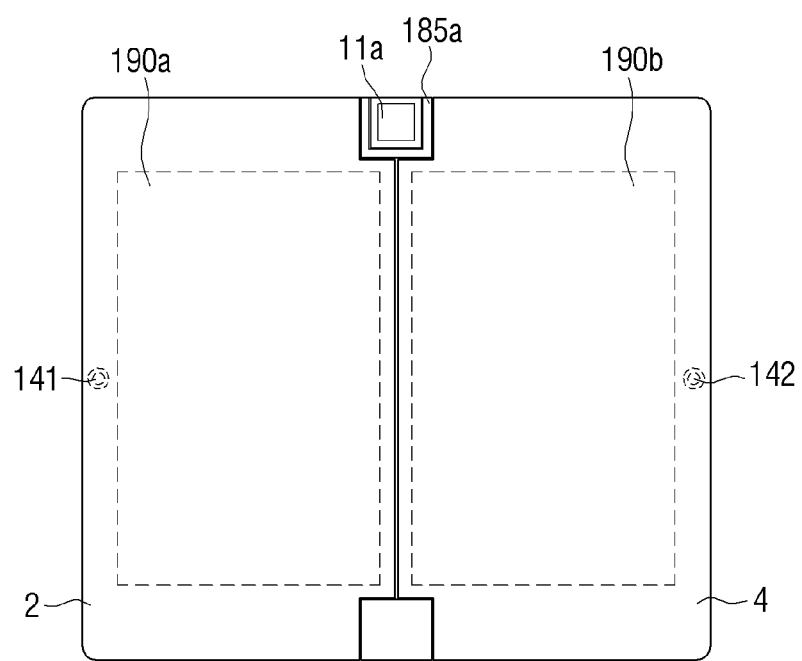
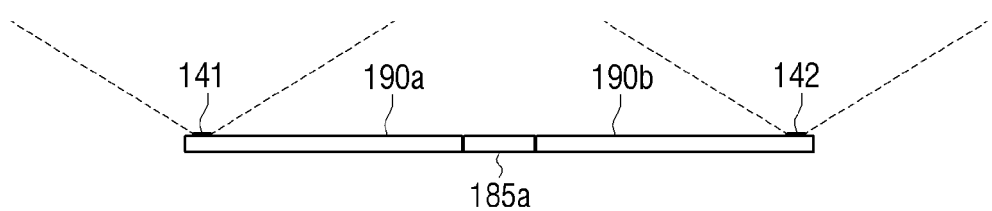

FIG. 14
(1)
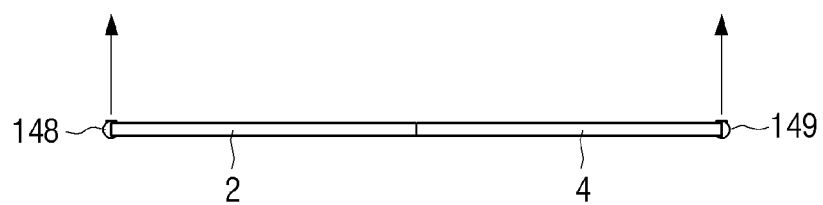
(2)
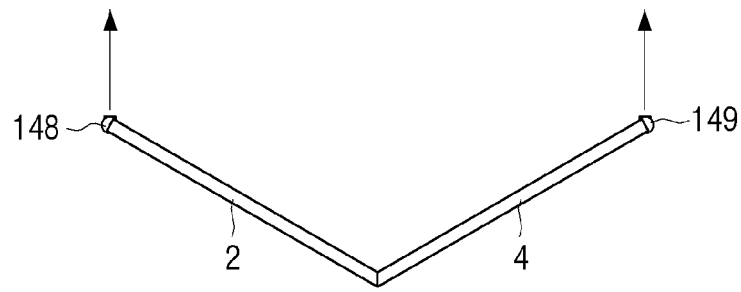

FIG. 15
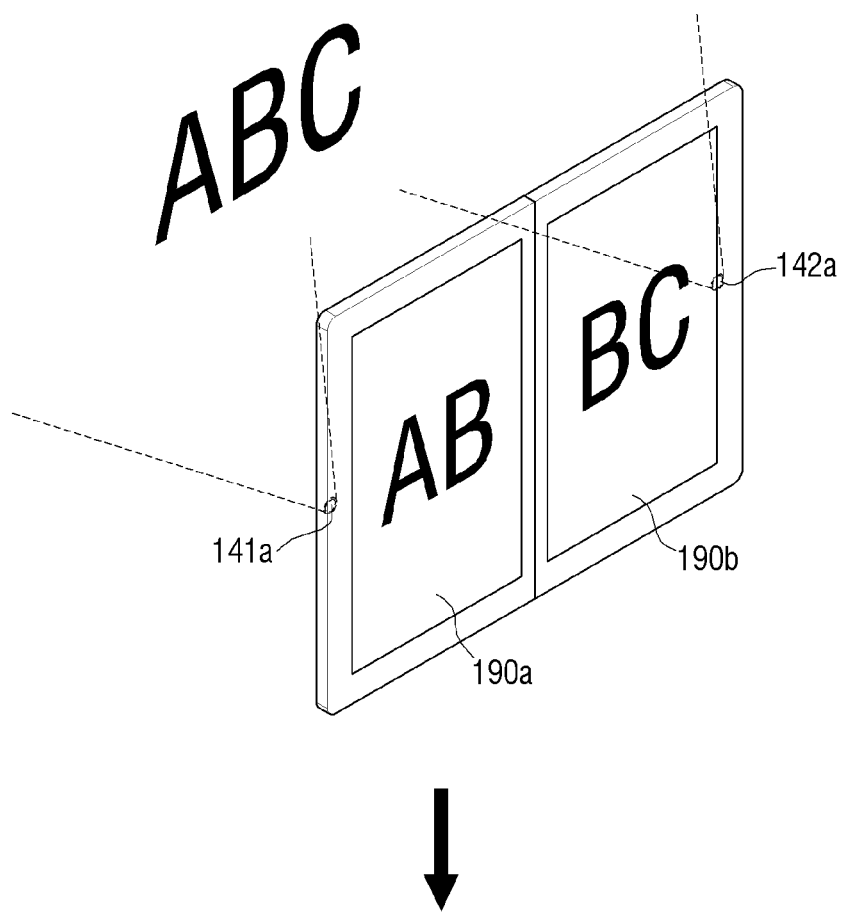
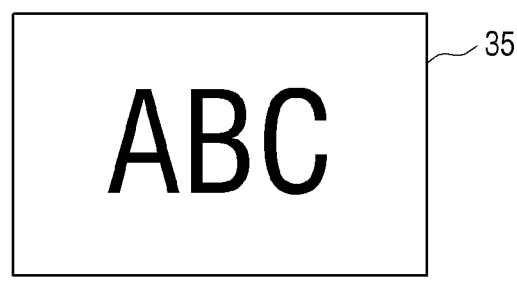

ABCD

ABCD

FIG. 23
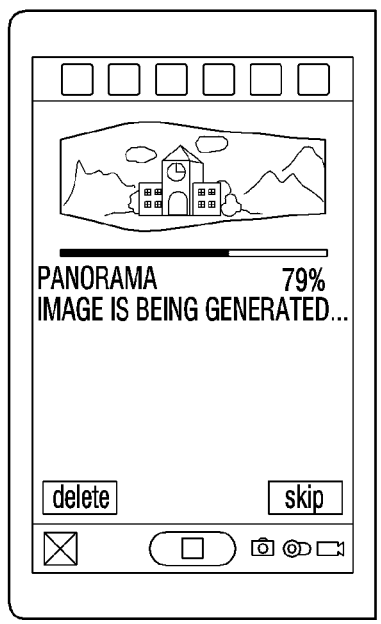
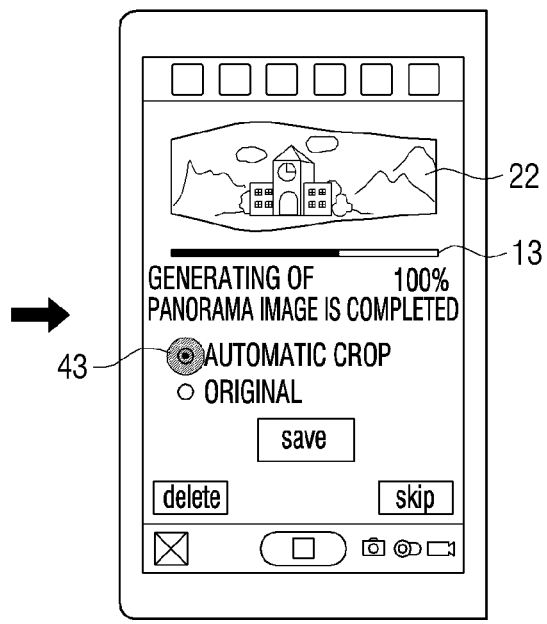

FIG. 30
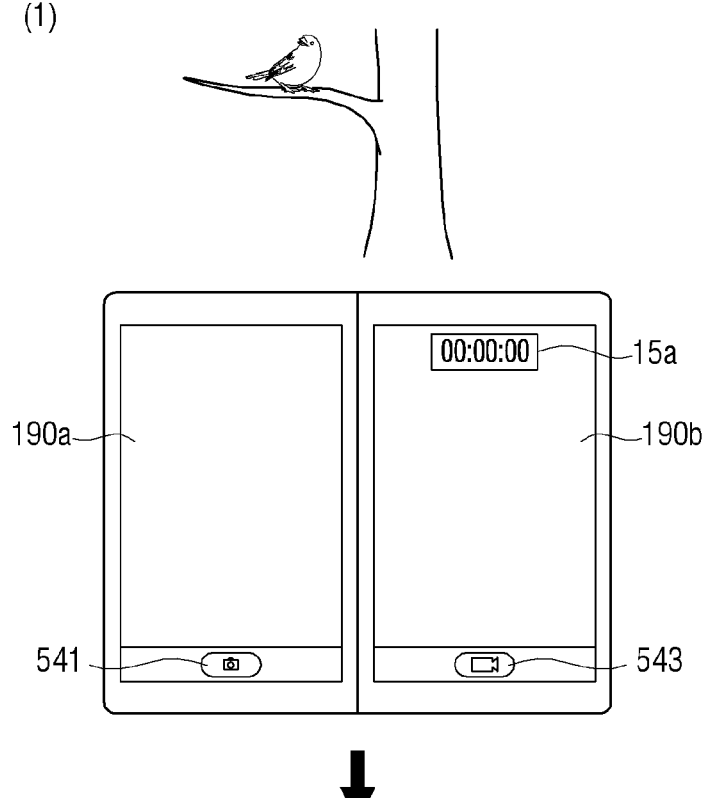
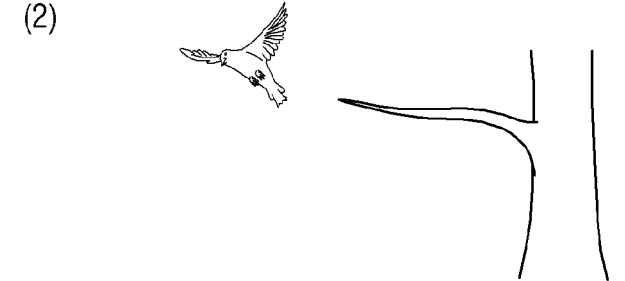
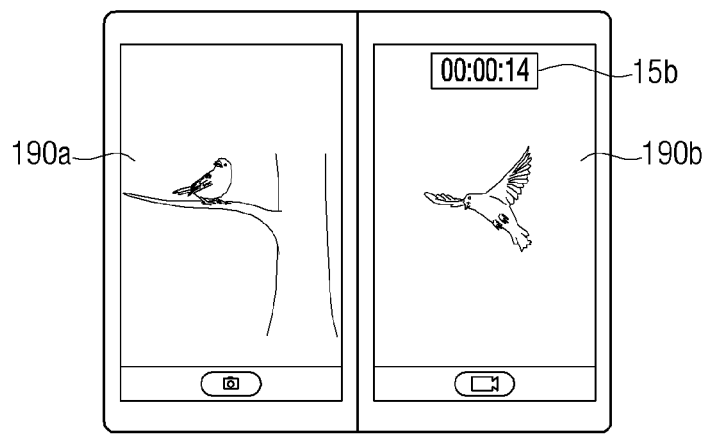

FIG. 31
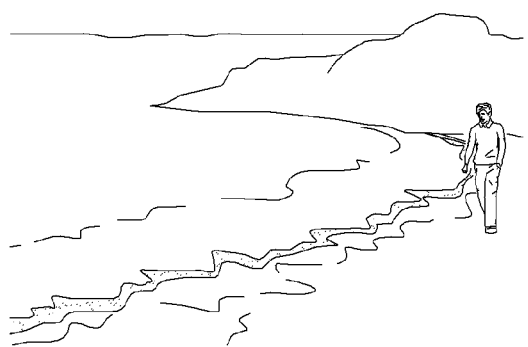
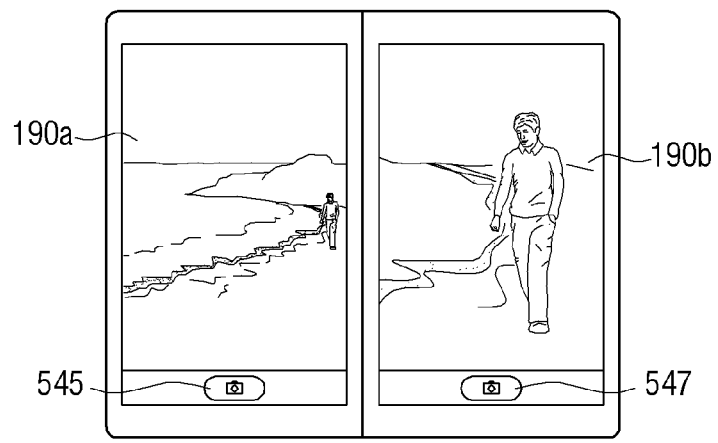

MULTI DISPLAY DEVICE AND METHOD OF PHOTOGRAPHING THEREOF

CROSS-REFERENCE TO RELATED APPLICATIONS

This application claims priority under 35 U.S.C. §119 from Korean Patent Application No. 10-2012-0112683, filed on Oct. 10, 2012, in the Korean Intellectual Property Office, the disclosure of which is incorporated herein by reference in its entirety.

BACKGROUND OF THE INVENTION

1. Field of the Invention

The present general inventive concept generally relates to providing a multi display device and a method of photographing thereof, and more particularly, to providing a multi display device which captures one or more subjects by using a plurality of imaging units and captured images of the subjects, and a method of photographing thereof.

2. Description of the Related Art

Various types of display devices have been used with the development of technologies. Such a display device includes a camera. In general, the camera installed in the display device provides basic functions of capturing subjects and moving pictures.

As a performance of hardware of a portable display device is improved, and a display unit displays a high-quality, clear image, various functions using a camera have been developed. A camera installed in a display device having a communication function includes a general photographing function and a function of capturing and transmitting an image to a user when performing a video conference.

However, a conventional camera using technology mainly premises a display device including one display unit. Therefore, researches on a camera using technology appropriate for a multi display device including a plurality of display units have been unsatisfied. In particular, if a plurality of cameras are installed, researches on a method of effectively using the cameras have also been unsatisfied.

Accordingly, there is required a technology by which a user variously uses a plurality of cameras in a multi display device including the plurality of cameras and a plurality of display units

SUMMARY OF THE INVENTION

The exemplary embodiments provide a multi display device which captures various images by using a plurality of imaging units, and a method of photographing thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a multi display device including a first body which includes a first display unit, a second body which includes a second display unit, a hinge unit which connects the first and second bodies to each other, a first imaging unit which is provided in the first body, a second imaging unit which is provided in the second body, and a controller which, if photographing is performed by the first or second imaging unit when the first or second body pivots based on the hinge unit, combines a plurality of photographed images to generate a panorama image content.

If the first body pivots in a first direction based on the hinge unit, the controller may control the second display unit to display a live view generated by the first imaging unit and perform photographing by using the first imaging unit to capture images within a first photographing range, and combine all of the images captured within the first photographing range to one another to generate a panorama image content.

If the first body pivots in a first direction based on the hinge unit, the controller may control the second display unit to display a live view generated by the first imaging unit and perform photographing by using the first imaging unit to capture images within a first photographing range. If the second body pivots in a second direction opposite to the first direction based on the hinge unit, the controller may control the first display unit to display a live view generated by the second imaging unit and perform photographing by using the second imaging unit to capture images within a second photographing range. The controller may combine all of the images captured within the first photographing range and the images captured with in the second photographing range to one another to generate a panorama image content.

If a particular portion of a subject is recognized in the live view, the controller may perform automatic photographing.

If an interval angle between the first and second bodies meets a preset condition, the controller may perform automatic photographing.

If the pivoting starts, the controller may perform automatic photographing every preset time period.

The controller may control at least one of the first and second display units to display a photographing range setting screen if a panorama photographing mode starts and automatically adjust photographing angles of the first and second imaging units according to a set photographing range if the photographing range is set on the photographing range setting screen.

The controller may control at least one of the first and second display units to display a photographing range setting screen if a panorama photographing mode starts and display a guide image on the first and second display units, wherein the guide image induces photographing angles of the first and second imaging units to be adjusted according to a set photographing range if the photographing range is set on the photographing range setting screen.

The first imaging unit may be arranged on the same side as that on which the first display unit is arranged, in the first body, and the second imaging unit may be arranged on the same side as that on which the second display unit is arranged, in the second body.

The first imaging unit may be arranged on an opposite side to that on which the first display unit is arranged, in the first body, and the second imaging unit may be arranged on an opposite side to that on which the second display unit is arranged, in the second body.

At least one of the first and second imaging units may be rotatable.

The controller may control at least one of the first and second display units to display a setting screen for respectively setting functions of the first and second display units and separately control display operations of the first and second display units according to functions selected on the setting screen.

If a panorama display function may be set on the first display unit, and a general display function may be set on the second display unit, the controller may control to display the panorama image content on the first display unit and control to display at least one of image contents respectively photographed by the first and second imaging units on the second display unit.

The foregoing and/or other features and utilities of the present general inventive concept may also be achieved by providing a multi display device including a first body which includes a first display unit, a second body which includes a second display unit, a hinge unit which connects the first and second bodies to each other, a first imaging unit which is provided in the first body, a second imaging unit which is provided in the second body, and a controller which controls the first display unit to display a first live view generated by the first imaging unit and controls the second display unit to display a second live view generated by the imaging unit. If a portion of an overlapping area of the first and second live views meets a preset condition, the controller may respectively control the first and second imaging units to perform photographing and combines photographed images to generate a panorama image content.

The foregoing and/or other features and utilities of the present general inventive concept may also be achieved by providing a multi display device including a first body which includes a first display unit, a second body which includes a second display unit, a hinge unit which connects the first and second bodies to each other, a first imaging unit which is provided in the first body, a second imaging unit which is provided in the second body, and a controller which combines a first image photographed by the first imaging unit and a second image photographed by the second photographing unit to generate one content. The controller may process the first image as a left eye image and process the second image as a right eye image to generate a 3-dimensional (3D) image content including the left and right eye images.

The controller may control at least one of the first and second display units to display a setting screen for respectively setting functions of the first and second display units and separately control display operations of the first and second display units according to functions selected on the setting screen.

If a 3D display function is set on the first display unit, and a 2-dimensional (2D) function is displayed on the second display unit, the controller may control the first display unit to display the 3D image content and control the second display unit to display at least one of the left and right eye images.

The foregoing and/or other features and utilities of the present general inventive concept may also be achieved by providing a photographing method of a multi display device which includes a first body including a first display unit, a second body including a second display unit, and a hinge unit connecting the first and second bodies to each other. The photographing method may include performing photographing by using the first imaging unit provided in the first body or the second imaging unit provided in the second body, and combining a plurality of photographed images to generate a panorama image content. If the first or second body pivots based on the hinge unit, the photographing may be performed by the first or second imaging unit.

If the first body pivots in a first direction based on the hinge unit, a live view generated by the first imaging unit may be displayed on the second display unit, and the photographing may be performed by using the first imaging unit to capture images within a first photographing range. All of the images captured in the first photographing range may be connected to one another to generate the panorama image content.

If the first body pivots in a first direction based on the hinge unit, a live view generated by the first imaging unit may be displayed on the second display unit, and the photographing may be performed by using the first imaging unit to capture images within a photographing range. If a second body pivots in a second direction opposite to the first direction based on the hinge unit, a live view generated by the second imaging unit may be displayed on the first display unit, and the photographing may be performed by the second imaging unit to capture images within a second photographing range. All of the images captured within the first photographing range and the images captured within the second photographing range may be combined to one another to generate the panorama image content.

If a particular portion of a subject is recognized in the live view, automatic photographing may be performed.

If an interval angle between the first and second bodies meets a preset condition, automatic photographing may be performed.

If the pivoting starts, automatic photographing may be performed every preset time period.

If a panorama photographing mode starts, a photographing range setting screen may be displayed through at least one of the first and second display units, and if a photographing range is set on the photographing range setting screen, photographing angles of the first and second imaging units may be automatically adjusted according to the set photographing range.

If a panorama photographing mode starts, a photographing range setting screen may be displayed through at least one of the first and second imaging units, and a guide image may be displayed on the first and second display units, wherein the guide image induces photographing angles of the first and second imaging units to be adjusted according to a set photographing range if the photographing range is set on the photographing range setting screen.

The photographing method may further include: displaying a setting screen for respectively setting functions of the first and second display units through at least one of the first and second display units; and displaying functions selected on the setting screen on the first and second display units.

If a panorama display function is set on the first display unit, and a general display function is set on the second display unit, the panorama image content may be displayed on the first display unit, and at least one of image contents photographed by the first and second imaging units may be displayed on the second display unit.

The foregoing and/or other features and utilities of the present general inventive concept may also be achieved by providing a photographing method of a multi display device which includes a first body including a first display unit, a second body including a second display unit, and a hinge unit connecting the first and second bodies to one another. The photographing method may include performing photographing by using the first imaging unit provided in the first body or the second imaging unit provided in the second body, and combining a plurality of photographed images to generate a panorama image content. A first live view generated by the first imaging unit may be displayed through the first display unit, a second live view generated by the second imaging unit may be displayed through the second display unit, and, if a portion of an overlapping area between the first and second live views meets a preset condition, the first and second imaging units may be respectively controlled to perform the photographing.

The foregoing and/or other features and utilities of the present general inventive concept may also be achieved by providing a photographing method of a multi display device which includes a first body including a first display unit, a second body comprising a second display unit, and a hinge unit connecting the first and second bodies to each other. The photographing method may include performing photographing by using the first imaging unit provided in the first body and the second imaging unit provided in the second body, and combining a first image photographed by the first imaging unit and a second image photographed by the second imaging unit to generate one image content. The first image may be processed as a left eye image, and the second image may be processed as a right eye image to generate a 3D image content including the left and right eye images.

The photographing method may further include: displaying a setting screen for respectively setting functions of the first and second display units through at least one of the first and second display units; and displaying functions selected on the setting screen on the first and second display units.

If a 3D display function is set on the first display unit, and a 2D display function is displayed on the second display unit, the 3D image content may be displayed on the first display unit, and at least one of the left and right eye images may be displayed on the second display unit.

Accordingly, a multi display device may photograph various types of photographed images by using images photographed by using a plurality of cameras.

The foregoing and/or other features and utilities of the present general inventive concept may also be achieved by providing a computer-readable medium to contain computer-readable codes as a program to execute the method described above or hereinafter.

The foregoing and/or other features and utilities of the present general inventive concept may also be achieved by providing a multi display device including a first body having a first display unit and a first imaging unit, a second body having a second display unit and a second imaging unit, a hinge unit disposed to connect the first and second bodies to each other, and a controller configured to control at least one of the first and second imaging units to perform photographing, to control at least one of the first and second imaging units to display images generated through the photographing, and to combine the images to generate an image content.

The image content may be a panorama image content or a 3D image content.

At least one of the first display unit of the first body and the second display unit of the second body may display a user interface to set one or more functions of at least one of the first and second imaging units.

The controller may generate a status bar to show a progress and completion in generating the image content, and the status bar may be displayed on at least one of the first and second display units.

Screens of the first and second display units may be disposed on a same plane when the first body and the second body are disposed parallel with respect to the hinge unit.

The second display unit may display the images when the first imaging unit performs the photographing during a movement of the first body with respect to the second body about the hinge unit.

The first and second bodies may have a same dimension with respect to the hinge unit.

The first and second bodies may be set in one of different modes according to a position state of the first and second bodies with respect to a reference plane and the hinge unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 8 and 9 are views illustrating a multi display device including a viewfinder according to an exemplary embodiment of the present general inventive concept;

FIG. 14 is a view illustrating a method of generating a 3D image content in a multi display device including a rotary imaging unit according to an exemplary embodiment of the present general inventive concept;

FIG. 15 is a view illustrating a method of generating a panorama image content according to an exemplary embodiment of the present general inventive concept;

FIG. 23 is a view illustrating a method of generating a crop image according to an exemplary embodiment of the present general inventive concept;

FIGS. 30 and 31 are views illustrating an operation of a multi display device according to another exemplary embodiment of the present general inventive concept;

DETAILED DESCRIPTION OF THE PREFERRED EMBODIMENTS

Figure 1:
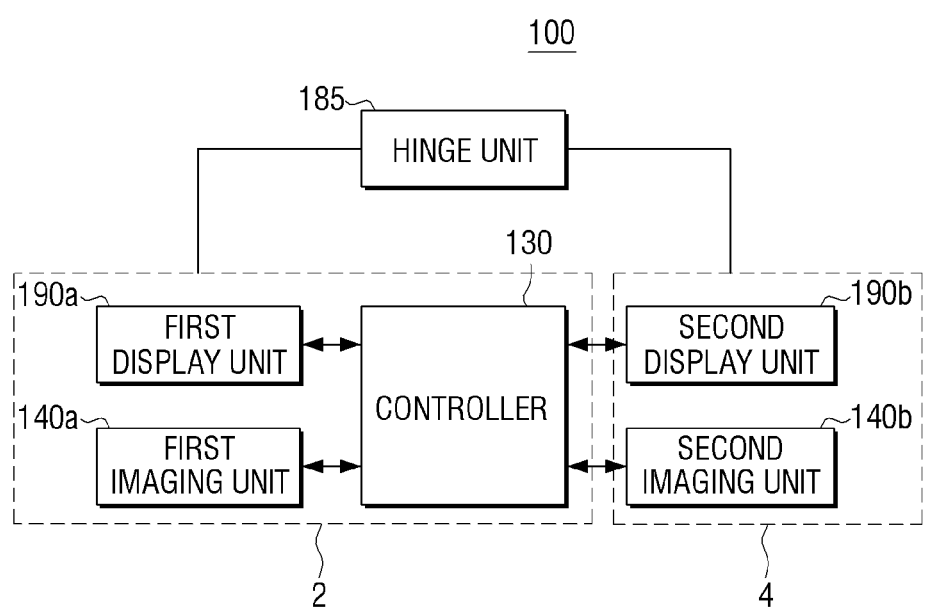
FIG. 1 is a block diagram illustrating a structure of a multi display device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

In the present specification, a multi display device includes a plurality of display units and displays various types of screens through the display units. In detail, the multi display device may be realized as a type such as a tablet personal computer (PC), a portable multimedia player (PMP), a personal digital assistant (PDA), a smart phone, a portable phone, a digital frame, a game machine, or the like.

FIG. 1 is a block diagram illustrating a structure of a multi display device 100 according to an exemplary embodiment of the present general inventive concept.

Referring to FIG. 1, the display device 100 includes a first body 2, a second body 4, and a hinge unit 185. The first body 2 is referred to as one independent external structure including a first imaging unit 140a and a display unit 190a, and the second body 2 is also referred to as another independent external structure including a second imaging unit 140b and a second display unit 190b.

A controller 130 may be included in the second body 4 or a plurality of controllers 130 may be installed to be included in both the first and second bodies 2 and 4. When the controller 130 is included in the second body 4, the controller 130 may control both the first body 2 and the first body 4. When the plurality of controllers 130 are included in the first and second bodies 2 and 4, at least one of the plurality of controllers 130 may control both the first and second bodies 2 and 4. The first and second bodies 2 and 4 may further include various types of circuits, chips, signal lines, etc. besides illustrated elements. For convenience of description, illustrations of detailed elements will be omitted.

The first and second bodies 2 and 4 are connected to each other through the hinge unit 185. The hinge unit 185 supports the first and second bodies 2 and 4 so that the first and second bodies 2 and 4 pivot on the hinge unit 185. Rotation angles of the first and second bodies 2 and 4 may be variously determined with respect to each other or a reference plane according to a shape of the hinge unit 185.

For example, when one of the first and second bodies 2 and 4 pivots, the first and second display units 190*a* and 190*b* may be closed in contact with each other to be folded in a direction such that front surfaces of the first and second display units 190*a* and 190*b* face or contact each other and rear surfaces thereof are opened, or the first and second displayed units 190*a* and 190*b* may be closed in contact with each other to be folded in an opposite direction such that rear surfaces of the first and second display units 190*a* and 190*b* face or contact each other and the front surfaces thereof are opened. Alternatively, the first and second display units 190*a* and 190*b* may be disposed at a plane to form an angle of 180° to be opened according to a structure of the hinge unit 185. Shapes of the first and second bodies 2 and 4 that are unfolded based on the hinge unit 185 will be described in detail in various exemplary embodiments that will be described later.

The controller 130 controls an operation of the multi display device 100 according to various user's controls such as user's touches on the first and second display units 190*a* and 190*b*, selections of buttons of the first and second bodies 2 and 4, user's gestures, voice commands, etc. If power buttons are provided on the first and second bodies 2 and 4, the controller 130 may perform a turn-on operation or a turn-off operation according to selections of the power buttons. It is possible that when one of the power buttons is selected, a corresponding one of the first and second bodies 2 and 4 is turned on and off. It is also possible that when a power button of the second body 4 is selected, both the first and second bodies 2 and 4 are turned on or off when the controller 130 is disposed in the first body 2 to control both the first and second bodies 2 and 4. It is also possible that when a power button of the first body 2 is selected, the first body may be turned on or off. If a power button is provided on one of the first and second bodies 2 and 4, the controller 130 may perform a turn-on and off operation of the first and second bodies 2 and 4. If menus are displayed on screens of the first and second display units 190*a* and 190*b*, and a user touches the menus, the controller 130 may perform operations corresponding to the touched menus.

Also, the controller 130 displays various types of screens by using at least one of the first and second display units 190*a* and 190*b*. In this case, the first and second display units 190*a* and 190*b* may display one screen together and may separately display different screens. The controller 130 selectively activates the first and second display units 190*a* and 190*b* according to various conditions, such as an execution application, a type of content, a selection of the user, etc., to display various types of screens. A structure of a device including two display units like the first and second display units 190*a* and 190*b* is illustrated in FIG. 1, and thus the device may be referred to as a dual display device. However, the number of display units may be 2, 3, or more, and thus for convenience of description, the device may be referred to a multi display device herein.

First and second imaging units 140*a* and 140*b* are respectively installed in the first and second bodies 2 and 4. The first and second imaging units 140*a* and 140*b* respectively include cameras. Each of the cameras includes a lens and an image sensor.

As described above, the multi display device 100 includes the plurality of imaging units 140*a* and 140*b* and the plurality of display units 190*a* and 190*b*. Therefore, the controller 130 controls the imaging units 140*a* and 140*b* and the display units 190*a* and 190*b* to perform various types of photographing For example, the controller 130 may combines images respectively photographed by the first and second imaging units 140*a* and 140*b* to generate one image content. The one image content may be a 3-dimensional (3D) image content or a panorama image content. A depth may be applied to a subject by using a binocular parallax between the first and second imaging units 140*a* and 140*b* with respect to the subject to 3-dimensionally recognize the 3D image content. Images respectively photographed from the first and second imaging units 140*a* and 140*b* to be disposed side to side or above and below may be continuously connected to each other to generate the panorama image content.

The controller 130 may also perform various types of photographing operations according to exemplary embodiments. The controller 130 may control a photographing operation based on an angle formed between the first and second bodies 2 and 4, additional information, other user commands, etc.

This photographing operation may be differently realized according to the number of imaging units and shapes and arrangement positions of the photographing units.

The block diagram of the multi display device 100 of FIG. 1 includes the first and second imaging units 140*a* and 140*b* but may further include third and fourth imaging units. Therefore, the controller 130 may control the number of divided screens of the first and second display units 140*a* and 140*b* and a method of dividing screens of the first and second display units 140 and 140*b* according to the number of imaging units that are activated. The controller 130 may also control the first and second imaging units 104*a* and 140*b* to perform different functions. For example, a still image capturing function may be applied to the first imaging unit 140*a*, and a moving picture image generating function may be allocated to the second imaging unit 140*b*. Alternatively, a general photographing function may be allocated to the first imaging unit 140*a*, and a zoom photographing function may be allocated to the second imaging unit 140*b*.

Accordingly, before various exemplary embodiments related to a photographing operation are described, various exemplary embodiments related to arrangements of imaging units will be first described.

FIGS. 2 through 7 are views illustrating arrangements of imaging units of a multi display device according to various exemplary embodiments of the present general inventive concept. For convenience of description, illustrations of parts that are not related to descriptions of the arrangements of the imaging units are simplified or omitted in FIGS. 2 through 7. However, when the imaging units are realized as real products, buttons, speakers, microphones, and other elements may be further included. The multi display apparatus of FIGS. 2 through 7 may be the multi display device 100 of FIG. 1, for example. However, the present general inventive concept is not limited thereto. A multi display device having the controller 130 included in the second body 4 or various types of multi display devices, for example, having a plurality of controllers 130, can be used as the multi display apparatus of FIGS. 2 through 7.

Figure 2:
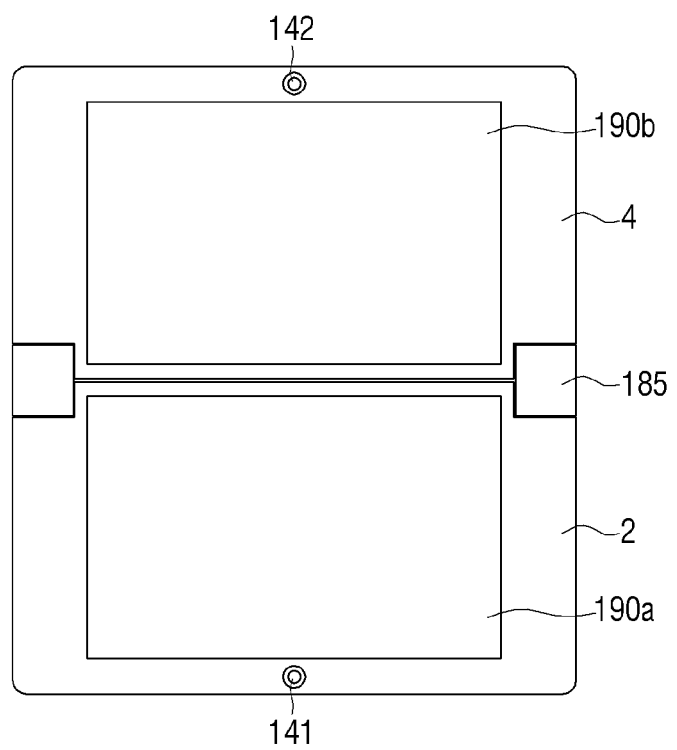
FIGS. 2 through 7 are views illustrating an arrangement of imaging units of a multi display device according to various exemplary embodiments of the present general inventive concept.

Referring to FIG. 2, the multi display apparatus 100 includes the first and second bodies 2 and 4. The first body 2 includes the first display unit 190*a*, and the second body 4 includes the second display unit 190*b*. The first and second bodies 2 and 4 are connected to each other through the hinge unit 185 to relatively move.

A first imaging unit 141 is arranged in a center of an edge area of the first body 2 that is opposite to the hinge unit 185 with respect to a center of the first body 2. The second imaging unit 142 is arranged in a center of an edge area of the second body 4 that is opposite to the hinge unit 185 with respect to a center of the second body 4. The first imaging unit 141 is disposed on a side formed with a display area of the first display unit 190a or a side area surrounding the display area of the first display unit 190a. The edge area may be referred to as a portion of the side area. Here, when an imaging unit is arranged in an area of a body, the imaging unit is disposed to photograph an object positioned in a front portion of the area of the body. However, the present general inventive concept is not limited thereto. It is possible that an imaging unit has a structure and function to photograph both sides of the body. That is, the image unit may photograph an object positioned in a front portion of one side of the body in a first photographing mode or an object positioned a rear portion of the other side of the body in a second photographing mode according to a user or design preference. In this case, when the imaging unit is arranged in an area of a body, the imaging unit may have a primary photographing mode to photograph an object positioned in front of the area of the body.

Figure 3:
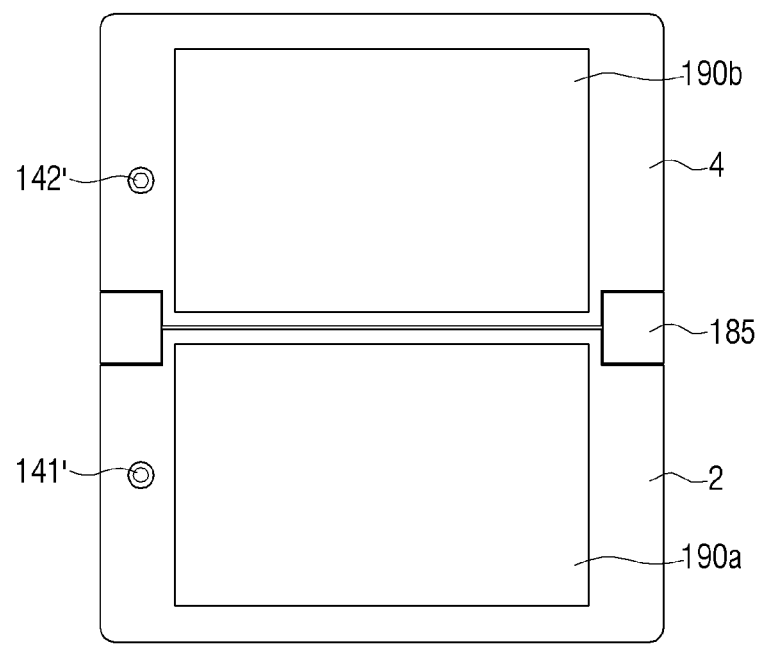

FIG. 3 illustrates another arrangement of imaging units. For convenience of description, the arrangements of the imaging units will be described based on a direction in which the user watches the multi display device 100. A first imaging unit 141' is arranged in a center of a left edge area of the first body 2, and a second imaging unit 142' is arranged in a center of a left edge area of the second body 4. According to another exemplary embodiment, it is possible that the first and second imaging units 141' and 142' may be respectively arranged in centers of right edge areas of the first and second bodies 2 and 4. According to another exemplary embodiment, it is also possible that the first and second imaging units 141' and 142' may be respectively arranged in corner areas of the first and second bodies 2 and 4. The multi display device 100 may be used in a horizontal direction or in a vertical direction in which the first and second imaging units 141 (141') and 142 (142') are disposed as illustrated in FIG. 2 or 3.

Figure 4:
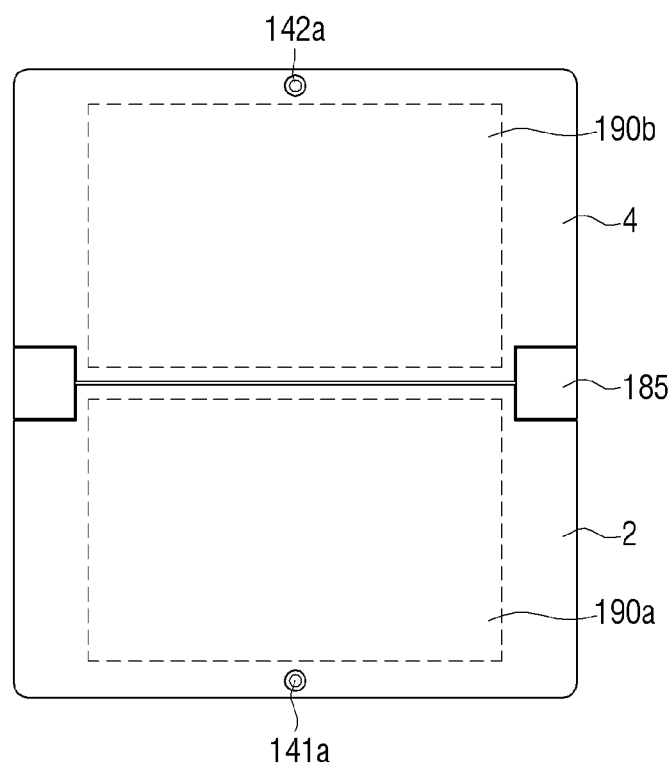

FIG. 4 is a view illustrating a multi display device including display units 190a and 190b arranged (disposed) on sides of the first and second bodies 2 and 4 and imaging units 141a and 142a arranged (disposed) on opposite sides thereof according to an exemplary embodiment of the present general inventive concept. The first and second imaging units 141a and 142a are respectively arranged in edge areas of the sides of the first and second bodies 2 and 4 that are opposite to the sides of the first and second bodies 2 and 4 on which first and second display units 190a and 190b are arranged. However, the arrangements of the first and second imaging units 141a and 142a are not limited to positions illustrated in FIG. 4. If the first and second imaging units 141a and 142a are arranged on the sides that are opposite to the sides on which the first and second display units 190a and 190b are arranged, the user may simultaneously photograph a subject and check live view screens respectively displayed on the first and second display units 190a and 190b.

Figure 5:
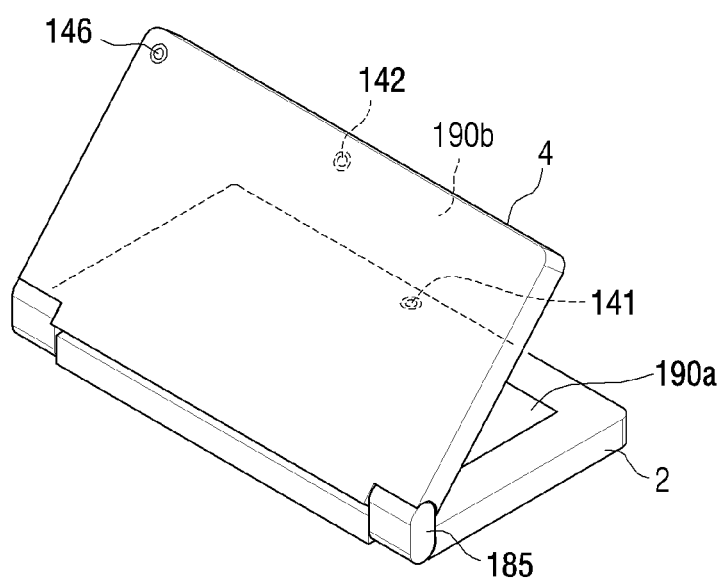

FIG. 5 is a view illustrating the multi display device including three imaging units according to an exemplary embodiment of the present general inventive concept. Referring to FIG. 5, the first body 2 has a first display device 190a and a first imaging unit 141 arranged on a same side of the first body 2. The second body 4 has a second display unit 190b and a second imaging unit 142 arranged on a same side of the second body 4. A third imaging unit 146 is arranged on a side of the second body 4 opposite to that of the second body 4 on which the second display unit 190b is arranged. The multi display device 100 in which the first and second imaging units 141 and 142 are arranged in centers of edge areas opposite to each other with respect to the hinge unit 185 is illustrated in FIG. 5. However, the present general inventive concept is not limited thereto For example, the first and second imaging units 141 and 142 may be respectively arranged in centers of edge areas of one of sides of the first and second bodies 2 and 4 or in corner areas that do not contact the hinge unit 185 (or are disposed away from the hinge unit 185 by a distance). The arrangement of the third imaging unit 146 may not be limited to a corner area of a side of the second body 4 that is opposite to the side of the second body 4 on which the second display unit 190b is arranged. The third imaging unit 146 may be arranged in a corner area of a side of the second body 4 that is opposite to the side on which the second display unit 190b is arranged or in a center of an edge area that does not contact the hinge unit 185. The third imaging unit 146 may be arranged on a side of the first body 2 that is opposite to a side of the first body 2 on which the first display unit 190a is arranged.

Figure 6:
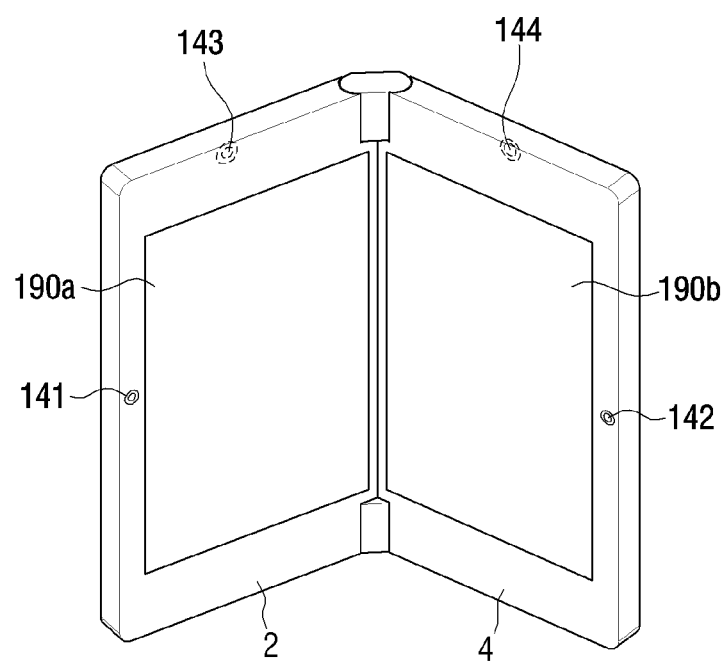

FIG. 6 is a view illustrating a multi display device including four imaging units according to an exemplary embodiment of the present general inventive concept.

Referring to FIG. 6, first and second imaging units 141 and 142 are respectively arranged in centers of edge areas of the first and second bodies 2 and 4 that do not contact the hinge unit 185. The edge areas of sides of the first and second bodies 2 and 4 are respectively disposed on a same side of the first and second bodies 2 and 4 as the first and second display units 190a and 190b are arranged. Third and fourth imaging units 143 and 144 are respectively arranged on sides of the first and second bodies 2 and 4 that are opposite to the first and second display units 190a and 190b. The first, second, third, and fourth imaging units 141, 142, 143, and 144 are not limited to arrangement positions illustrated in FIG. 6.

If three or more multi imaging units are arranged, two of the three multi imaging units arranged on the same side may be used to generate a 3-dimensional (3D) or panorama image content, and the other imaging unit may be used to photograph an image, a moving picture, etc.

Figure 7:
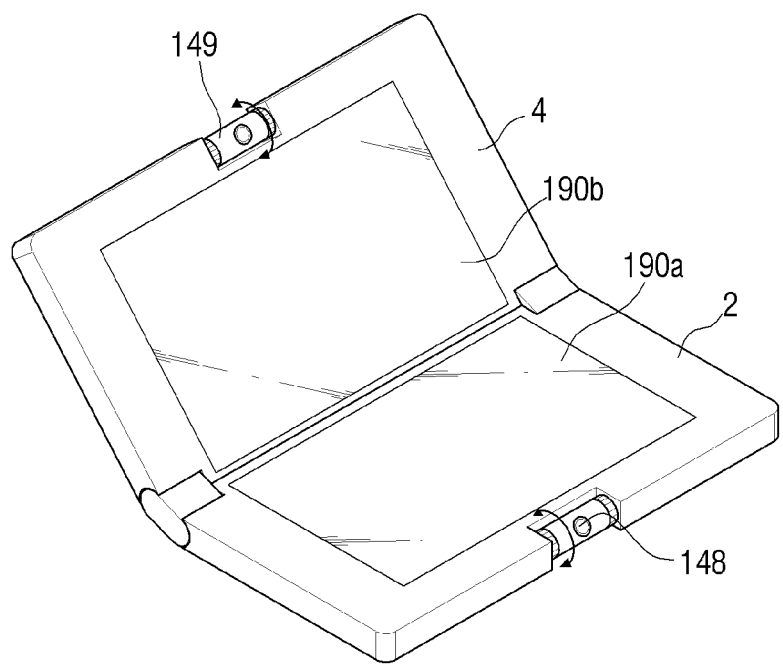

FIG. 7 is a view illustrating a multi display device including rotary imaging units according to an exemplary embodiment of the present general inventive concept.

Referring to FIG. 7, a first rotary imaging unit 148 is arranged in a center of an edge area of the first body 2 that is opposite to the hinge unit 185 with respect to the first display unit 190a. A second rotary imaging unit 149 is arranged in a center of an edge area of the second body 4 that is opposite to the hinge unit 185 with respect to the second display unit 190b. The first and second rotary imaging units 148 and 149 may be respectively connected to the first and second bodies 2 and 4 through a pivotable hinge element. Therefore, the first and second rotary imaging units 148 and 149 may rotate within a predetermined angle range. The first and second bodies 2 and 4 have a portion formed in a side area to accommodate the first and second rotary imaging units 148 and 149, respectively. The pivotable hinge element is rotatably disposed to connect the first and second rotary imaging units 148 and 149 to the first and second bodies, respectively. A photographing angle of the first and second rotary imaging unit 148 and 149 may be variable according a rotation angle of the first and second rotary imaging units 148 and 149 with respect to the first and second bodies 2 and 4, respectively. An electrical line may be disposed through the hinge element or in the portion to provide electrical connection between a controller of the first and second bodies 2 and 4 and the first and second rotary imaging units 148 and 149, respectively.

A method of rotating rotary imaging units may be a manual method of directly rotating the rotary imaging units by a user or an automatic method of rotating the rotary imaging units by using a preset value in a preset condition. The pivotable hinge element may have an electrical component to be controlled by a controller of the first and second bodes 2 and 4 to rotate the first and second rotary imaging units 148 and 149 with respect to the first and second bodies 2 and 4, respectively. Alternatively, the imaging units may be rotated by using both of the manual method and the automatic method. At least one of first and second rotary imaging units may automatically or manually rotate toward a side that is opposite to display units or may be automatically or manually rotate toward the same side as the display units to recognize a space gesture.

The space gesture refers to an operation of operating the multi display device by using a predetermined motion of a user object on a space without a physical contact such as a touch of a touch screen or pressing of a button. The space gesture may be captured or detected by a unit (not illustrated) of the multi display device to control a movement, a rotation angle, a function of the imaging unit according to the space gesture.

As described above, the number of imaging units and arrangement positions of the imaging units may be variously realized according to exemplary embodiments. However, the number of imaging units is not limited to the number illustrated in the above-described drawings, and the arrangement positions of the imaging units are also not limited to the above-described arrangement positions.

The controller 130 displays a live-view corresponding to light incident through imaging units on at least one of the first and second display units 190a and 190b. Therefore, the controller 130 allows the user to perform capturing during watching the live view. However, if imaging units and display units are arranged on the same side as illustrated in FIG. 2 or 3, the user may not watch the live view due to a position of the user. Therefore, a viewfinder or an additional display may be further included to cope with this situation.

Figure 9:
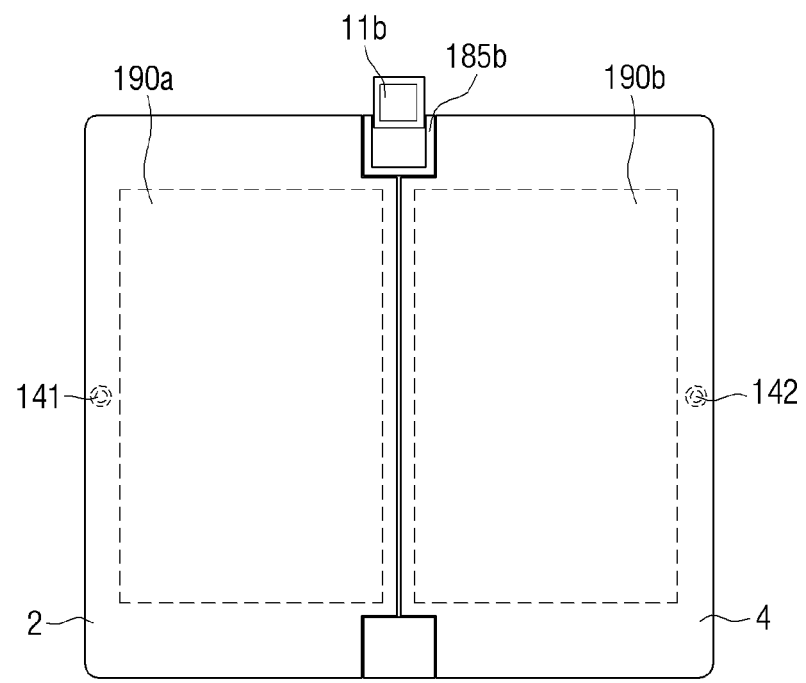

FIGS. 8 and 9 are views illustrating a multi display device including a viewfinder according to an exemplary embodiment of the present general inventive concept. The multi display apparatus of FIGS. 8 and 9 may be the multi display device 100 of FIG. 1, for example.

Referring to FIG. 8, a hinge unit 185a of the multi display device 100 includes a viewfinder 11a. The viewfinder 11a allows a user to see an image or a composition to be photographed when the user photographs a subject by using an imaging unit. If first and second imaging units 141 and 142 are respectively arranged on the same sides as first and second display units 190a and 190b as illustrated in FIG. 8, and the user forces the first and second imaging units 141 and 142 to face the subject in order to photograph the subject, the first and second display units 190a and 190b are disposed to face the subject. Therefore, it may be inconvenient for the user to recognize which image is to be photographed. If a viewfinder is used, the user may recognize which image is photographed through the viewfinder, and thus the above problem may be solved.

According to an exemplary embodiment, the hinge unit 185a may have a hole formed therein, and the viewfinder 11a may be formed in a hole shape corresponding to the hole and having a space with a predetermined size to be disposed in the hole of the hinge unit 185a. The first imaging units 141 and 142 and the viewfinder 11a are respectively fixedly arranged in the first and second bodies 2 and 4 and the hinge unit 185a. Therefore, the composition of the subject seen through the viewfinder 11a nearly matches with an image photographed by the first and second imaging units 141 and 142. The size of the space of the viewfinder 11a may be adjusted or arrangement positions of the first and second imaging units 141 and 142 may be adjusted to match the composition of the subject seen through the viewfinder 11a with the image photographed by the first and second imaging units 141 and 142. The first and second bodies 2 and 4 may be rotatable with respect to the hinge unit 185a, and the viewfinder 11a may be fixedly disposed in the hinge unit 185a. However, the present general inventive concept is not limited thereto. That is, the viewfinder 11a may be movably disposed in the hinge unit 185a.

According to another exemplary embodiment, the viewfinder 11a may be a sub display module according to a design or user preference. In this case, the sub display module may display the same images as displayed on the first and second display units 190a and 190b. The viewfinder 11a is not limited to positions of images illustrated in FIG. 8 and thus may be included in the first body 2 or the second body 4.

Referring to FIG. 9, a viewfinder 11b may be formed in a structure that may be disposed to move, for example, slide up or down on a hinge unit 185b. The viewfinder 11b may move to be extended or disposed higher than a top side of the first and second bodies 2 and 4. As described above with reference to FIG. 8, the viewfinder 11b observing a subject may be manufactured in a hole shape having a space with a predetermined size. The viewfinder 11b may be formed as a sub display module. The sub display module may be realized as various types of display technologies such as a liquid crystal display (LCD) panel, a plasma display panel (PDP), an organic light-emitting diode (OLED), a vacuum fluorescent display (VFD), a field emission display (FED), an electroluminescence display (ELD), a transparent display panel, etc.

According to an exemplary embodiment, the viewfinder 11b may have a structure to move the viewfinder 11b with respect to the hinge unit 185b or the first and second bodies 2 and 4. The structure may include a first rail installed on a side that is opposite to a side on which first and second display units 190a and 190b are arranged, and a second rail installed at left and right ends of the viewfinder 11b to make a pair with the first rail to combine the viewfinder 11b with the hinge unit 185b.

According to another exemplary embodiment, the viewfinder 11b may be combined with the hinge unit 185b in a structure, an end of which pivots. If necessary, the viewfinder 11b may 180° rotate to protrude from the hinge unit 185b.

According to another exemplary embodiment, the viewfinder 11b may be formed in a center of a side of the hinge unit 185b in a shape that pops up toward an axis dividing the first and second display units 190a and 190b. In a method of popping up the viewfinder 11b, the viewfinder 11b may be manually popped up and down. In other words, if the viewfinder 11b is pressed once when the viewfinder 11b is popped down, the viewfinder 11b is popped up. If the viewfinder 11b is pressed once when the viewfinder 11b is popped up, the viewfinder 11b is popped down. An appropriate part, such as a spring, a button, or the like, may be added for the above-described operation.

As described above, the numbers and positions of imaging units and viewfinders used for a capturing operation may be variously changed according to exemplary embodiments. Therefore, the capturing operation using these imaging units may be variously performed. Capturing operations according to various exemplary embodiments of the present general inventive concept will now be described.

Figure 10:
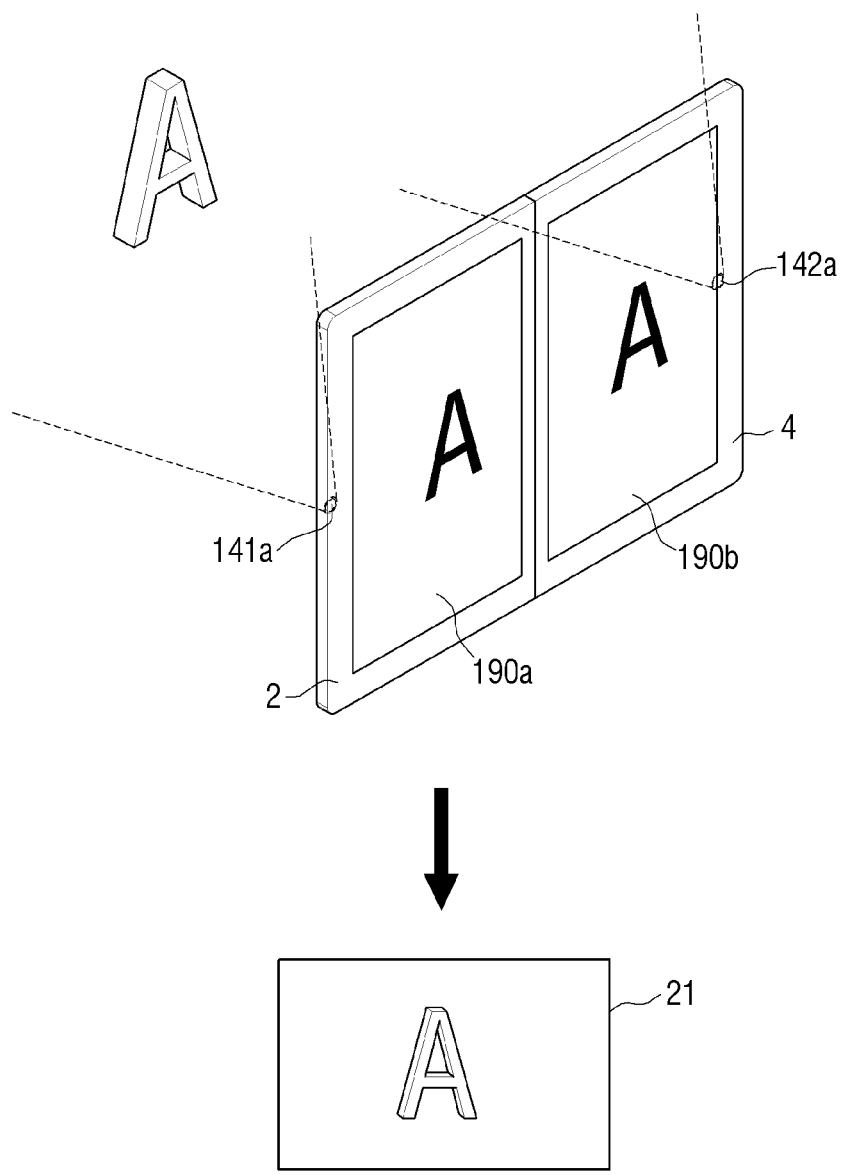
FIG. 10 is a view illustrating a photographing method according to an exemplary embodiment of the present general inventive concept.

FIG. 10 is a view illustrating a photographing method according an exemplary embodiment of the present general inventive concept. In detail, FIG. 10 is a view illustrating a method of photographing a 3D image contents.

A user may see an object with both left and right eyes. The left and right eyes keep a predetermined distance from each other and thus accept the same object as two images having different angles. A cerebrum accepting the two images having the different angles recognizes the two images as one image and 3-dimensionally feels the object in this process.

Referring to FIG. 10, first and second imaging units 141*a* and 142*a* image a subject A. Based on a direction in which a user watches a subject, the first imaging unit 141*a* is positioned on a left side of the subject A, and thus an image seen in a left direction is photographed. Since the second imaging unit 142*a* is positioned on a right side of the subject A, an image seen in a right direction is photographed. A distance between the first and second imaging units 141*a* and 142*a* is referred to as a parallax. Also, two images generating the parallax are combined into one image content to generate a 3D image content 21. In detail, the two images may be combined by using a top-to-bottom method or a side-by-side method to generate the 3D image content 21. Here, the top-to-bottom method is to connect a first image photographed by the first imaging unit 141*a* and a second image photographed by the second imaging unit 141*b* above and below. Also, the side-by-side method is to connect the first and second images from side to side.

A display unit may be manufactured according to a particular method to allow a user to further feel a 3D effect on the 3D image content 21. For example, a barrier may be formed on a display panel to allow both eyes of a user to see different pixels. As the both eyes see the different pixels through the barrier, a depth of an image is generated so that a user feels a 3D effect. The depth refers to a degree of a 3D effect appearing through a binocular parallax. As another example, the display panel may include a small lens. If the user watches an image displayed on a display unit, left and right eyes of the user watch different pixels due to a binocular parallax and a refraction of a lens. Therefore, a depth of the image occurs, and thus the user feels a 3D effect. As a result, the 3D effect may vary according to the depth. The depth is determined by an angle difference between photographing ranges of the first and second imaging units 141*a* and 142*a*. Accordingly, the user manually pivots at least one of the first and second bodies 2 and 4 based on the hinge unit 185 to adjust the at least one so as to secure a desired depth and then performs photographing.

In this case, the user may undergo trials and errors, such as several repetitions, to adjust a depth of a 3D image content to a desired size. Therefore, according to another exemplary embodiment of the present general inventive concept, a depth setting mode may be provided to allow the user to set a desired depth and perform photographing according to the set depth.

Figure 11:
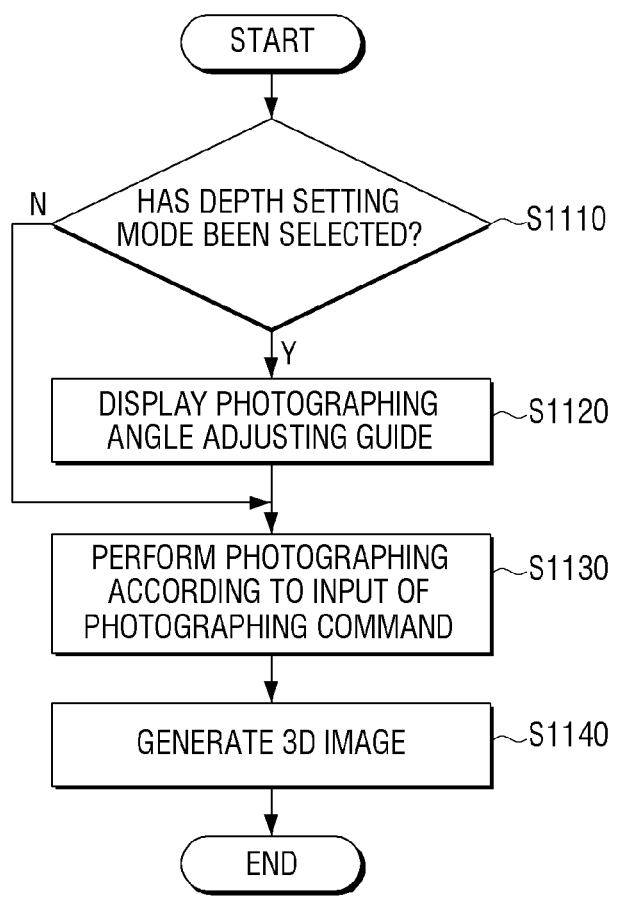
FIG. 11 is a flowchart illustrating a 3-dimensional (3D) image photographing method of a multi display device according to an exemplary embodiment of the present general inventive concept.

FIG. 11 is a flowchart illustrating a method of photographing a 3D image of a multi display device according to an exemplary embodiment of the present general inventive concept.

Referring to FIG. 11, the multi display device supports a depth setting mode. In operation S1110, a controller determines whether the depth setting mode has been selected. For example, if a user selects a setting menu corresponding to the depth setting mode, the multi display device may display a depth setting screen. The user may set a depth on the depth setting screen, and the multi display device determines that the depth setting mode has been selected. The depth setting mode refers to a mode in which the user selects a depth of a 3D image content to a desired size.

If a distance between two imaging units is adjusted, a parallax is changed, and thus a depth is adjusted. In operation S1130, the user performs photographing without setting the depth or may set a desired depth to perform photographing. For example, the depth may be divided into deep, normal, and shallow levels or may be divided into levels to be classified according to numbers. It is possible that the depth may be manually set by a user or that a user controls an angle between the imaging units to adjust the depth. The angle may be a photographing angle formed between a first line connecting a subject and one of the imaging units and a line connecting the subject and the other one of the imaging units.

As described above, the depth is formed by a parallax of the two imaging units, and thus the imaging units are adjusted so that a distance between the imaging units corresponds to the set depth. Therefore, in operation S1120, the controller displays a photographing angle adjusting guide. The photographing angle adjusting guide may include degrees of the imaging units to be moved, displayed to the user through the display unit. Alternatively, an angle between the imaging units may be displayed, and a depth degree corresponding to the angle between the imaging units may be displayed.

If the adjusting of the angle is completed, the multi display device performs photographing according to an input of a photographing command of the user in operation S1130. In operation S1140, the controller 130 combines two images to generate a 3D image content. The 3D image content may be generated in a basic depth according to a photographing parallax of the two imaging units or may be generated by changing depth levels by using a corresponding method.

As described above, the controller 130 monitors an interval angle to provide a depth guide corresponding to the interval angle. In this case, the multi display device may include a hinge unit sensor. The hinge unit sensor senses the interval angle formed between reference planes of first and second bodies based on a hinge unit.

The controller 130 performs the depth setting mode based on a sensing value of the hinge unit sensor. If a depth is set, the controller 130 determines an interval angle corresponding to the set depth and displays a depth guide corresponding to the interval angle. Therefore, if the user pivots the first or second body, the controller 130 measures the interval angle by using the hinge unit sensor. The controller 130 changes the depth guide or ends displaying of the depth guide according to the measurement result.

An operation of setting a depth in a multi display device in which a user manually pivots a body has been described above. However, according to another exemplary embodiment of the present general inventive concept, the multi display device may automatically pivot at least one of the bodies to adjust the depth. For example, the multi display device may further include a hinge unit actuator (not illustrated). The hinge unit actuator is an element that pivots the first or second body based on a rotation shaft.

If one depth is selected on the depth setting screen, the controller 130 actuates the hinge unit actuator to form an interval angle corresponding to the selected depth in order to pivot the first or second body.

Figure 12:
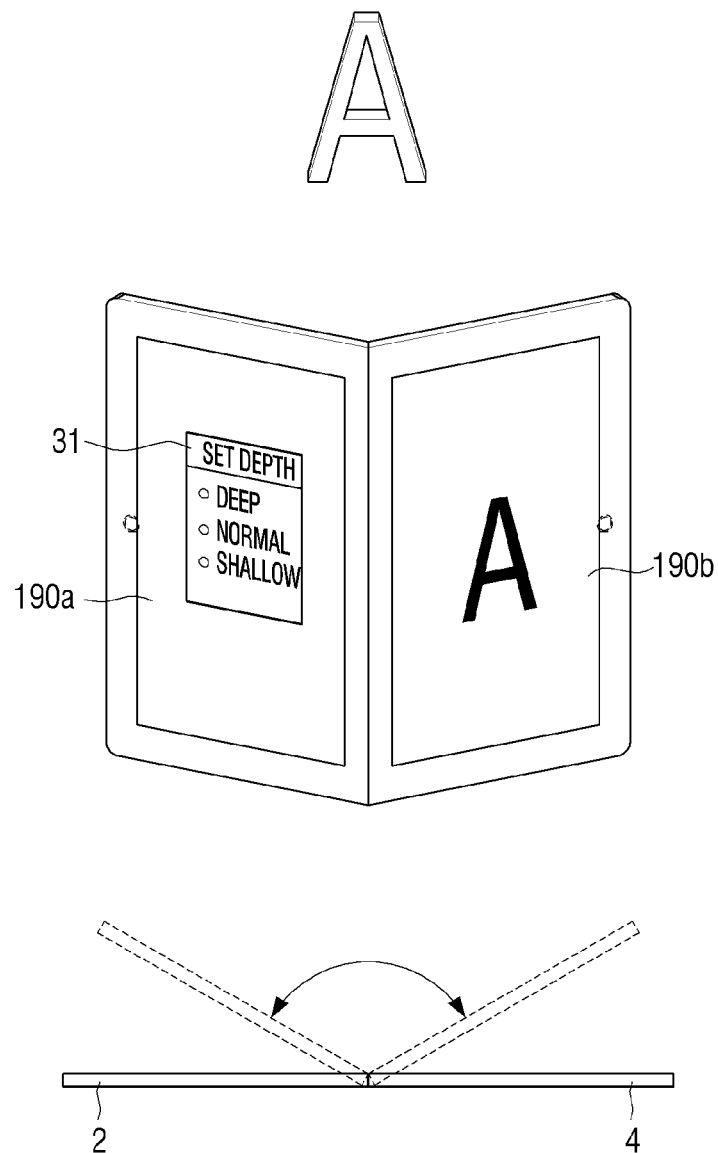
FIG. 12 is a view illustrating a method of setting a depth of a 3D image content according to an exemplary embodiment of the present general inventive concept.

FIG. 12 is a view illustrating a method of setting a depth of a 3D image content according to an exemplary embodiment of the present general inventive concept.

Referring to FIG. 12, a first display unit 190*a* displays a depth setting screen 31. The depth setting screen 31 may be displayed in a pop-up window form or may be displayed in a bar form in a predetermined space of the first display unit 190*a*. The depth setting screen 31 having the pop-up window form may be displayed transparently or semi-transparently. The first display unit 190*a* may display only the depth setting screen 31 or may display a screen photographed by a first imaging unit and display the depth setting screen 31 on the screen. For example, the depth setting screen 31 may be displayed in deep, normal, shallow levels or levels of the depth setting screen 31 may be displayed by using numbers according to a depth degree A second display unit 190*b* displays a live view screen generated by a second imaging unit. The second display unit 190*b* may display only a screen photographed by the second imaging unit on an entire screen or may divide the screen into two areas to display screens photographed by the first and second imaging units. Alternatively, the second display unit 190*b* may generate and display images photographed by the first and second imaging units as a 3D image content.

Figure 13:
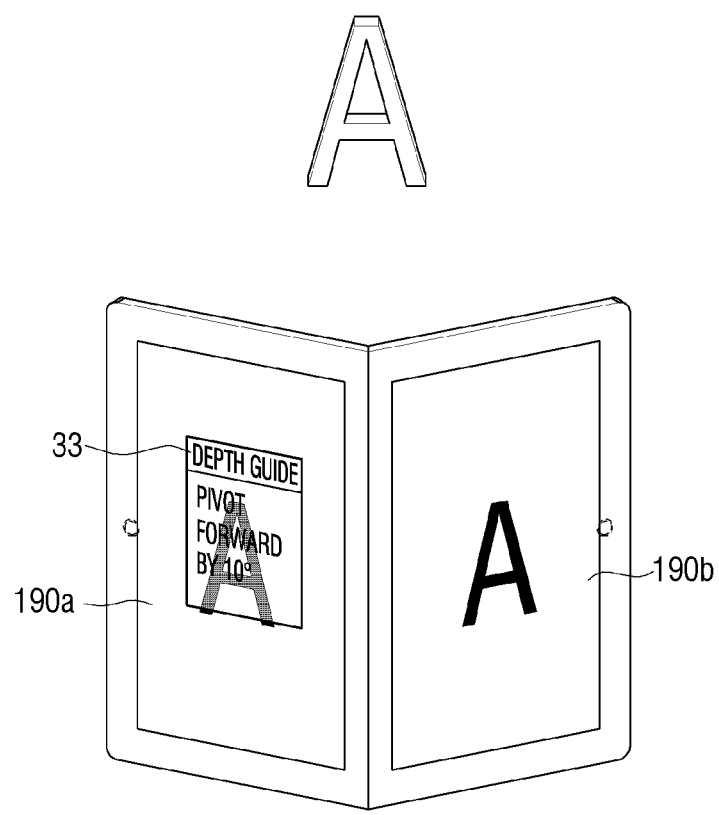
FIG. 13 is a view illustrating a method of using a depth guide to photograph a 3D image according to an exemplary embodiment of the present general inventive concept.

FIG. 13 is a view illustrating a method of using a depth guide to photograph a 3D image according to an exemplary embodiment of the present general inventive concept.

Referring to FIG. 13, a first display unit 190*a* displays a depth guide 33. The depth guide 33 may be expressed as various graphic objects such as a text, a symbol, a number, etc. As described above, a depth may be set to various levels on a depth setting screen. For example, the depth may be set to one of three levels such as deep, normal, and shallow levels or to one of levels classified according to numbers like first level through fifth level. An angle between first and second bodies is differently determined according to each depth level. Therefore, the controller 130 generates the depth guide 33 that induces at least one of the first and second bodies to pivot by a pivoting angle corresponding to a depth level selected in the depth setting mode.

Referring to FIG. 13, the depth guide 33 is displayed in a text form to cause the first or second body to pivot further forward or backward. A user may pivot or move the first body 2 forward according to an instruction of the depth guide 33. If it is determined that the first body 2 has pivoted by a predetermined angle, the controller 130 may change the depth guide 33 into a message indicating a photographable status and display the message. Alternatively, differently from FIG. 12, the depth guide 33 may directly indicate a pivot angle like "pivot forward by 10°". In this case, if the user pivots the first body 2 forward, the controller 130 may update the depth guide 33 according to the pivoting angle. The depth guide 33 may include the angle to be variable according to a current angle between the first and second imaging units. Therefore, the depth guide 33 may include at least one of a level of a desired depth, a desirable angle corresponding to the desired depth, and an instruction to show an angle variable according to the angle and a current angle.

According to another exemplary embodiment of the present general inventive concept, if the user pivots a body according to the depth guide 33 and then forms a pivoting angle matching with a set depth, the controller 130 may automatically perform a photographing operation.

In FIG. 13, the depth guide 33 is displayed only on the first display unit 190*a*, and the live view of a subject is displayed on the second display unit 190*b*. However, the depth guide 33 may overlap with the live view to be displayed or may be displayed on both of the first and second display units 190*a* and 190*b*.

The second display unit 190*b* may display the same screen as that described with reference to FIG. 12. The screens displayed on the first and second display units 190*a* and 190*b* of FIGS. 12 and 13 may be displayed on opposite display units.

In general, for 3D photographing, a central line between two imaging units is kept horizontal with respect to a subject. However, although the central line between the two imaging units is not horizontal according to a distance of the subject, 3D photographing is possible up to a predetermined angle. However, a rotary imaging unit may keep horizontal with respect to a subject and thus may generate a 3D image content having further various depths.

FIG. 14 is a view illustrating a method of generating a 3D image content in a multi display device including rotary imaging units according to an exemplary embodiment of the present general inventive concept.

Referring to a view (1) of FIG. 14, a first rotary imaging unit 148 is installed in a first body 2, and a second rotary imaging unit 149 is installed in a second body 4. A distance between the first and second rotary imaging units 148 and 149 is changed according to changes of angles of the first and second bodies 2 and 4. However, since the first and second rotary imaging units 148 and 149 pivot, a central line between the first and second rotary imaging units 148 and 149 may face frontwards. A view (2) of FIG. 14 illustrates the above-described contents. Therefore, a 3D image content may be generated regardless of the angles of the first and second bodies 2 and 4. However, if the angles of the first and second bodies 2 and 4 are approximate 0° with respect to a reference, the first and second rotary imaging units 148 and 149 may photograph images to generate a 3D image content having a shallow depth. If the angles of the first and second bodies 2 and 4 are approximate 180° with respect to the reference, the first and second rotary imaging units 148 and 149 may photograph images to generate a 3D image content having a deep depth.

The first and second rotary imaging units 148 and 149 may be manually rotated, for example, may be automatically rotated if a predetermined angle is input.

A multi display device that generates a 3D image content by using a plurality of imaging units according to various exemplary embodiments has been described. A method of generating a panorama image content according to various exemplary embodiments will now be described.

FIG. 15 is a view illustrating a method of generating a panorama image content according to an exemplary embodiment of the present general inventive concept.

Referring to FIG. 15, first and second imaging units 141*a* and 142*b* perform photographing with respect to a subject "ABC". A first display unit 190*a* displays an image photographed by the first imaging unit 141*a*, and a second display unit 190*b* displays an image photographed by the second imaging unit 142*a*. In other words, the first display unit 190*a* displays "AB", and the second display unit 190*b* displays "BC". An overlapping portion is required to generate a panorama image. In FIG. 15, an area "B" is an overlapping portion. The controller 130 detects overlapping portions between images photographed by two imaging units and overlaps the overlapping portions with each other to generate a panorama image 35 of ABC. The panorama image 35 may replace the displayed images. It is possible that the panorama image 35 may be displayed on at least one of the first and second display units 190a and 190b according to a user selection or an option setting. The user selection or the option setting may be set using a user interface displayed on at least one of the first and second display units 190a and 190b. In FIG. 15, the images photographed by the first and second imaging units 141a and 142a are respectively displayed on the first and second display units 190a and 190b. However, the first and second display units 190a and 190b may be recognized as one whole screen, and the whole screen may be divided into upper and lower screens to display the photographed images.

Photographing for generating a panorama image content may be performed according to a selection of a user or may be automatically performed if a preset condition is satisfied.

Figure 16:
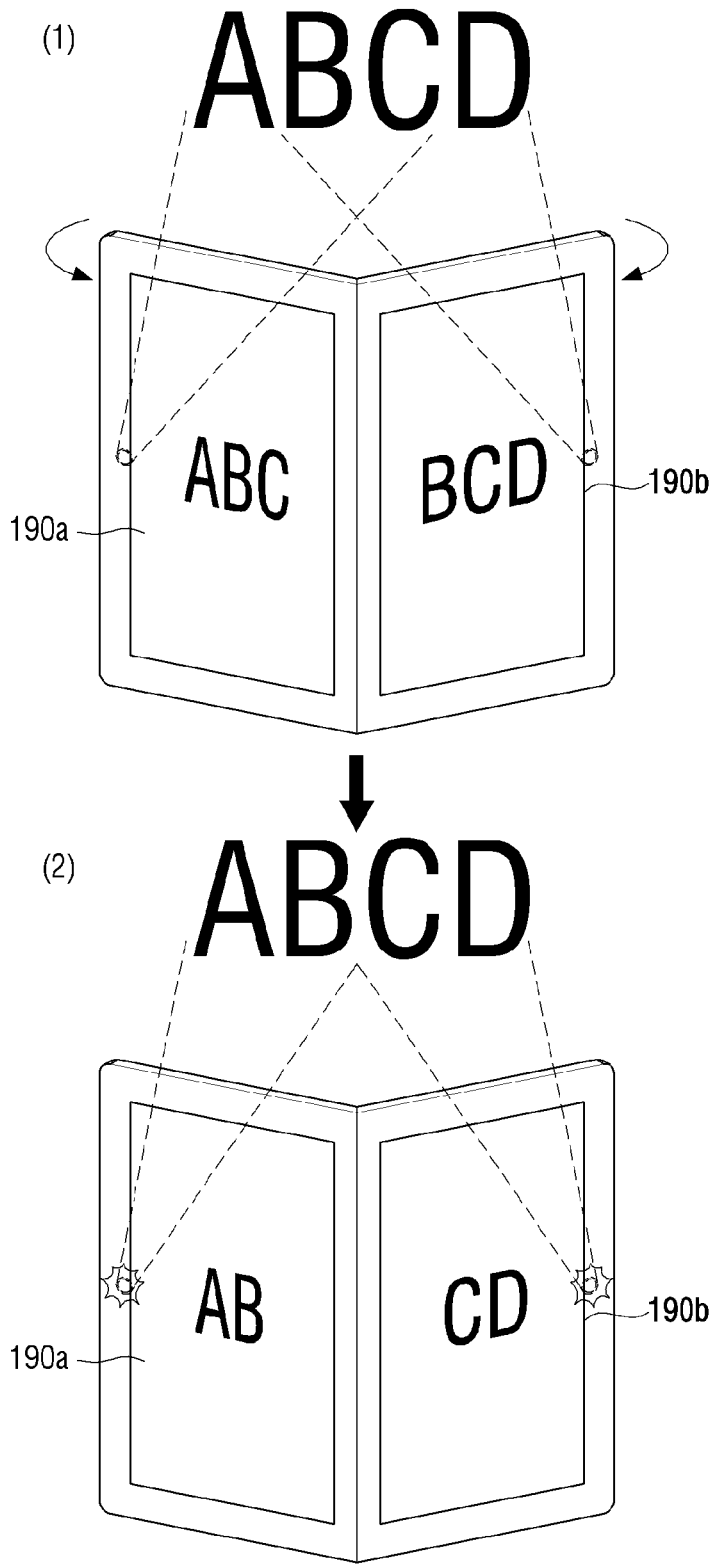
FIG. 16 is a view illustrating a method of recognizing a minimum overlapping area to automatically photograph a panorama image according to an exemplary embodiment of the present general inventive concept.

FIG. 16 is a view illustrating a method of recognizing a minimum overlapping area to automatically photograph a panorama image according to an exemplary embodiment of the present general inventive concept.

Referring to a view (1) of FIG. 16, a multi display device photographs a subject "ABCD". A first display unit 190a displays "ABC" according to angles of first and second bodies, and a second display unit 190b displays "BCD". In other words, a portion "BC" is an overlapping area.

Referring to a view (2) of FIG. 16, the angles of the first and second bodies are adjusted, and thus images photographed by first and second imaging units have a minimum overlapping area. In detail, the first display unit 190a displays "AB", and the display unit 190b displays "CD". The imaging units automatically perform photographing in this moment.

The minimum overlapping area refers to a minimum area that is overlapped in images photographed by the first and second imaging units.

The minimum overlapping area indicates that the images photographed by the first and second imaging units continue without overlap with each other. In order to check the overlapping area, the controller 130 divides each of the images photographed by the first and second imaging units into a plurality of blocks and check pixel values of pixels of the blocks. For example, if each of the images is divided into a plurality of blocks including n×m pixels, the controller 130 calculates an average value or a sum value of pixels of each of the blocks and sets the calculation result value to a representative block value. Here, n and m are a natural number. The controller 130 compares a representative value of each block of a first image photographed by the first imaging unit with a representative value of each block of a second image photographed by the second imaging unit to determine that blocks having values within a preset error range overlap with one another.

The controller 130 may determine a ratio of a predetermined overlapping area of one image and, if the ratio of the predetermined overlapping area is within a preset ratio, recognizes the predetermined overlapping area as a minimum overlapping area. Alternatively, the controller 130 may determine predetermined areas of imaging units and, if an overlapping area of photographed images is within a preset area, recognize the overlapping area as a minimum overlapping area.

The controller 130 may control the imaging units to perform automatic photographing by using other conditions. For example, the imaging units may perform the automatic photographing by using recognitions of a particular portion of a subject, angles and predetermined periods of first and second imaging units, etc. As one example, automatic photographing using a recognition method of recognizing a particular portion of a subject indicates that a shape or a face of a human is recognized to be automatically photographed.

If first and second imaging units are fixedly disposed in the corresponding bodies, there are several methods of photographing a panorama image. A method of photographing a panorama image according to various exemplary embodiments of the present general inventive concept will now be described.

Figure 17:
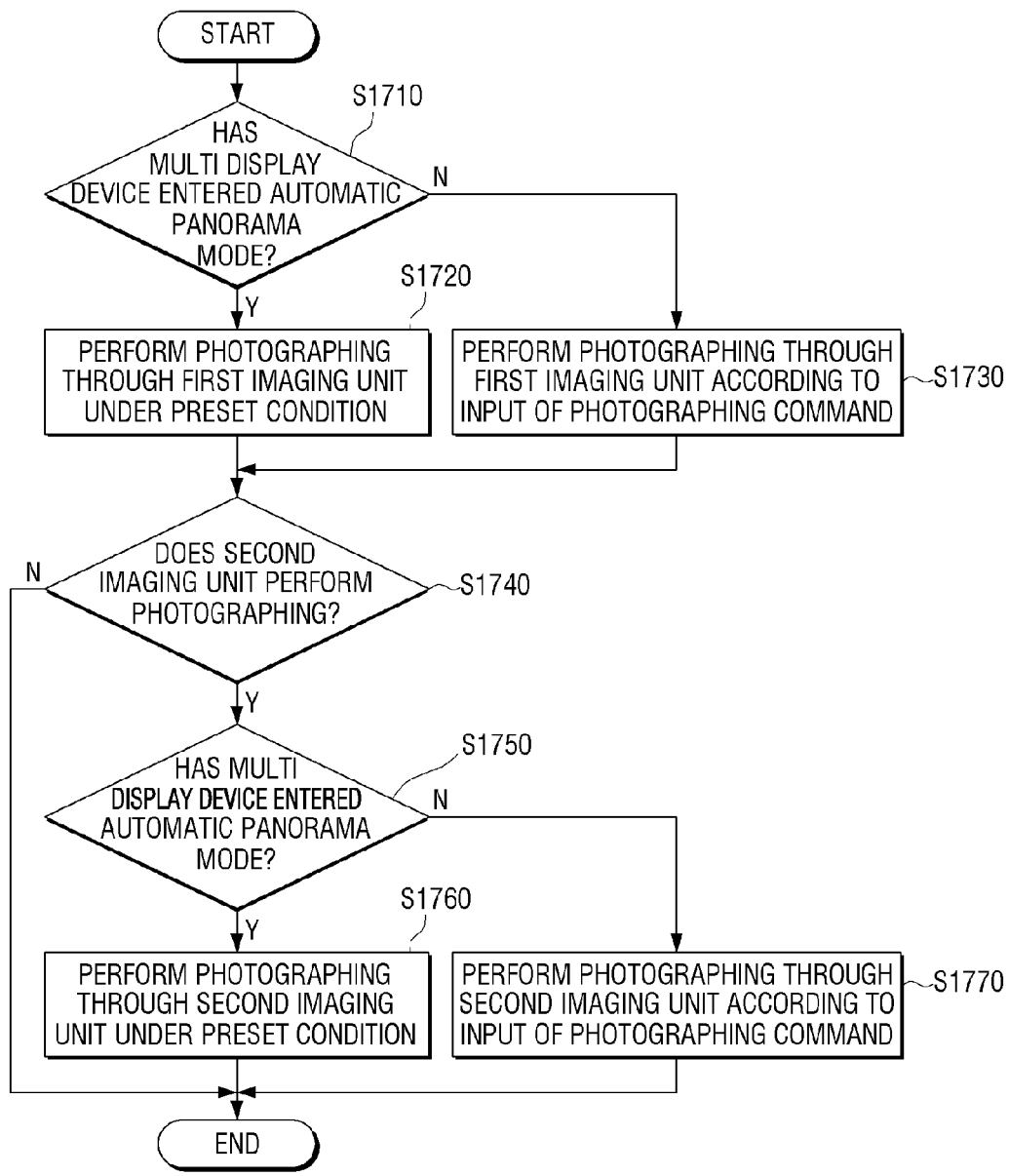
FIG. 17 is a flowchart illustrating a method of capturing a panorama image according to an exemplary embodiment of the present general inventive concept.

FIG. 17 is a flowchart illustrating a method of photographing a panorama image in a multi display device according to an exemplary embodiment of the present general inventive concept.

Referring to FIG. 17, in operation S1710, the controller 130 determines whether a multi display device is in an automatic panorama mode. The automatic panorama mode refers to a mode in which imaging units automatically perform photographing according to preset conditions. For example, the preset conditions may include a predetermined period, predetermined angles of first and second imaging units, a recognition of a particular portion of a subject, a recognition of a minimum overlapping area, the number of frames to be photographed, etc.

If the multi display device is set to the automatic panorama mode, the controller 130 transmits a photographing command to a first imaging unit according to the preset conditions in operation S1720. Therefore, the first imaging unit performs photographing a plurality of times and stores photographed images in a storage unit (not illustrated). If the multi display device is not in the automatic panorama mode, the controller 130 transmits a photographing command to the first imaging unit according to an input of a photographing command of a user in operation S1730.

If the preset conditions are satisfied, the controller 130 ends the photographing performed by the first imaging unit and determines whether photographing is to be performed by a second imaging unit in operation S1740. For example, the preset conditions may indicate that angles of the first and second imaging units are parallel with each other and are kept for 2 seconds.

In operation S1750, the controller 130 determines whether the multi display device is in the automatic panorama mode. Since the controller 130 determines whether the multi display device is in the automatic panorama mode in operation S1710, operation S1750 may be omitted. If the multi display device enters the automatic panorama mode, the controller 130 transmits a photographing command to the second imaging unit according to a preset condition when a second display unit pivots, in operation S1760. If the multi display device does not enter the automatic panorama mode, the controller 130 transmits a photographing command to the second imaging unit according to an input of a photographing command of the user in operation S1770. When operation S1750 is omitted, operation S1760 and operation S1770 may be selectively performed according to the determination of the previous operation S1710. A detailed process of performing photographing of the second imaging unit is the same as that of performing photographing of the first imaging unit.

Figure 18:
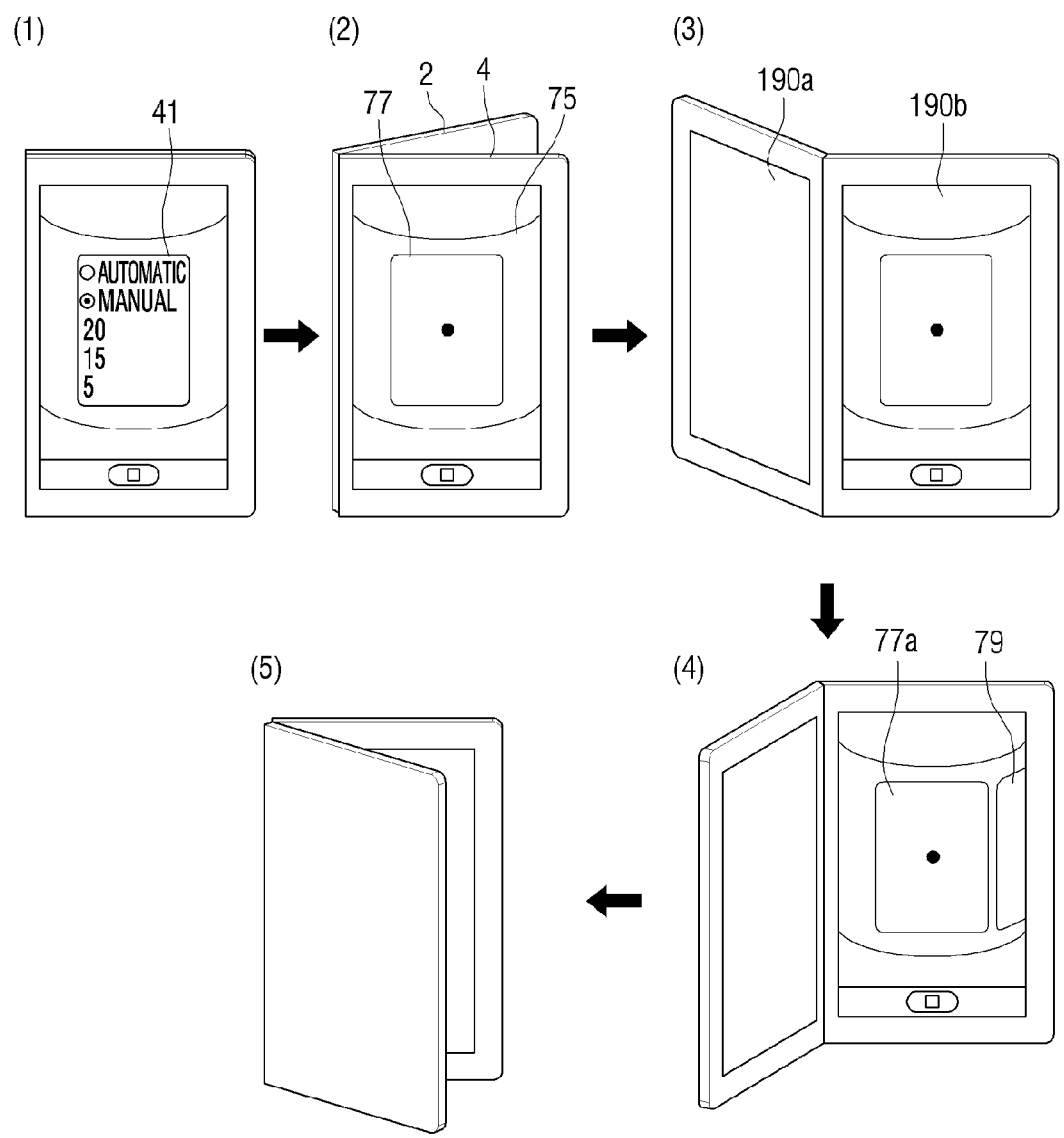
FIG. 18 is a view illustrating a method of capturing a panorama image in a single photographing mode according to an exemplary embodiment of the present general inventive concept.

FIG. 18 is a view illustrating a method of photographing a panorama image in a single photographing mode of a multi display device according to an exemplary embodiment of the present general inventive concept.

Referring to a view (1) of FIG. 18, first and second bodies 2 and 4 are disposed to face opposite directions and overlap with each other. Photographing of a panorama image is performed when the first and second bodies 2 and 4 are completely folded outwards (that is, display units and/or imaging units of the first and second bodies 2 and 4 are exposed to an outside of the first and second bodies 2 and 4), and the first body 2 including a first imaging unit pivots with respect to the second body 4. Before performing the photographing of the panorama image, a user may select a single or multi photographing mode. The single photographing mode indicates that the photographing for the panorama image is performed by using only the first imaging unit. The multi photographing mode indicates that the photographing of the panorama image is performed by using both the first and second imaging units. In other words, the multi photographing mode indicates that the photographing of the panorama image is performed with sequentially pivoting the first and second bodies 2 and 4.

A second display unit 190*b* displays a menu 41 to select manual and/or automatic panorama modes. If the manual panorama mode is selected, the multi display device 100 performs photographing according to a photographing command of a user. If the automatic panorama mode is selected, the user may select a photographing frame. The selection of the photographing frame is to select how many images are to be photographed until a photographing process is ended.

Only a photographing frame selection window is illustrated in a view (1) of FIG. 18, but other conditions may be set to perform the automatic panorama mode. For example, the multi display device may recognize a face of a human to perform automatic photographing. In this case, the multi display device may simultaneously apply a predetermined angle condition or a minimum overlapping area recognition condition and a subject particular portion recognition condition to perform the automatic photographing.

Referring to a view (2) of FIG. 18, photographing is performed with pivoting the first body 2 in a left direction A with respect to the second body 4. The first body 2 may be manually pivoted by the user or may be automatically pivoted by using a motor or a pivoting device (not illustrated) controlled by a controller. The second display unit 190*b* of the second body 4 displays menus related to photographing on upper and lower ends. A curved semi-arc 75 and an image 77 photographed by the first imaging unit are displayed in a center of the second display unit 190*b*.

Referring to views (3) and (4) of FIG. 18, if the first imaging unit performs photographing and then pivots in the left direction A to perform next photographing, the second display unit 190*b* moves the image 77, which has been previously photographed, to the right side along the curved semi-arc 75 to be displayed as an image 79, and displays an image 77*a*, which is currently photographed, in the center. As another example, the second display unit 190*b* may display the image 77*a* in the center and move and display the image 77 to the left side as the image 79. Alternatively, the second display unit 190*b* may respectively simultaneously move and display the image 77*a* and the image 77 to the right side and to the left side, respectively.

Referring to a view (5) of FIG. 18, if the first body 2 in which the first imaging unit is arranged forms a predetermined angle with the second body 2, photographing is ended.

As described above, if the first body 2 pivots in a first direction based on a hinge unit with respect to the second body 4, a multi display device displays a live view generated by a first imaging unit on a second display unit and performs photographing by using the first imaging unit. A controller controls the multi display device to photograph images within a first photographing range and connect the images photographed within the first photographing range to one another in order to generate a panorama image content. The capturing of the images may be performed at a preset time or a time when a photographing command of a user is input. It is possible that the capturing of the images may be performed at preset angles between the first body 2 and the second body 4. It is also possible that the capturing of the images may be performed at preset conditions or present relationships between images according to a user or design preference. The photographed images may be stored in a storage unit (not illustrated) of the multi display device. The photographed images may be stored in an external storage unit in an exemplary embodiment. The multi display device may temporarily store the photographed images in a random access memory (RAM) and then automatically delete the photographed images if a corresponding photographing mode is ended. Also, the multi display device may output a message to ask the user about whether to delete the photographed images and, if the user selects the deletion of the photographed images, delete the photographed images. Alternatively, the multi display device may store the photographed images in a flash memory, a hard disk, or the like automatically or according to a user selection.

Figure 19:
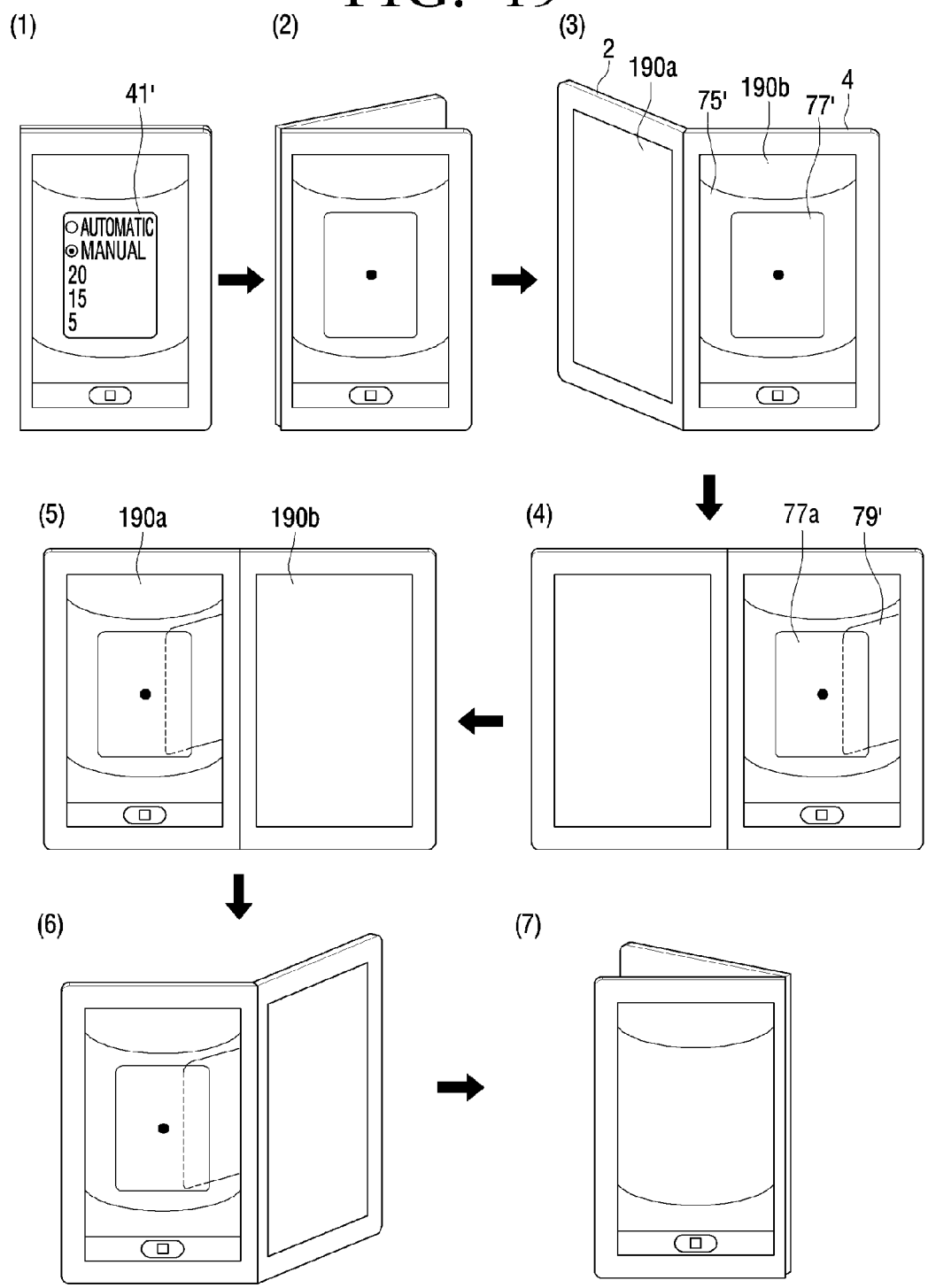
FIG. 19 is a view illustrating a method of capturing a panorama image in a multi photographing mode according to an exemplary embodiment of the present general inventive concept.

FIG. 19 is a view illustrating a method of photographing a panorama image in a multi photographing mode according to an exemplary embodiment of the present general inventive concept.

Referring to a view (1) of FIG. 19, a first body 2 including a first display unit 190*a* and a second body 4 including a second display unit 190*b* are disposed to face opposite directions and overlap with each other. The second display unit 190*b* displays a menu window 41' to select manual and/or automatic panorama modes. Referring to a view (2) of FIG. 19, as the first body 2 pivots to a left direction with respect to the second body 4, photographing is performed. Referring to views (3) and (4) of FIG. 19, if a first imaging unit of the first body 2 performs photographing and then pivots to the left direction to perform next photographing, the second display unit 190*b* moves an image 77', which has been previously photographed, along a semi-arc 75' to be displayed as an image 79' and displays a next photographed image 77*a* in a center thereof. A detailed description thereof is as described with reference to FIG. 18.

Referring to a view (5) of FIG. 19, if the first and second bodies 2 and 4 are disposed to be parallel with each other, the photographing of the first imaging unit is ended, and photographing of the second imaging unit is performed. Alternatively, if the first and second bodies 2 and 4 are disposed to be parallel with each other and are kept parallel with each other for several seconds, the multi display device may set the second imaging unit to perform photographing.

In this case, a photographing screen displayed on the second display unit 190*b* is automatically switched over to the first display unit 190*a*. For example, if the first and second display units 190*a* and 190*b* are disposed to be parallel with each other and kept parallel with each other for a predetermined time, the controller automatically switches the screen. As another example, when an angle between the first and second display units 190*a* and 190*b* exceeds 180°, the controller may automatically switch the screen.

Referring to a view (6) of FIG. 19, as the second body 4 pivots to a right direction with respect to the first body 2, photographing is performed by the second imaging unit of the second body 4. A detailed description thereof is as described above. Referring to a view (7) of FIG. 19, the second body 4 in which the second imaging unit is arranged forms a predetermined angle with the first body 2, photographing is ended. Alternatively, if the second body 4 is disposed to face an opposite direction to a direction that the first body 2 faces and to overlap the first body 2, the photographing may be ended.

Figure 20:
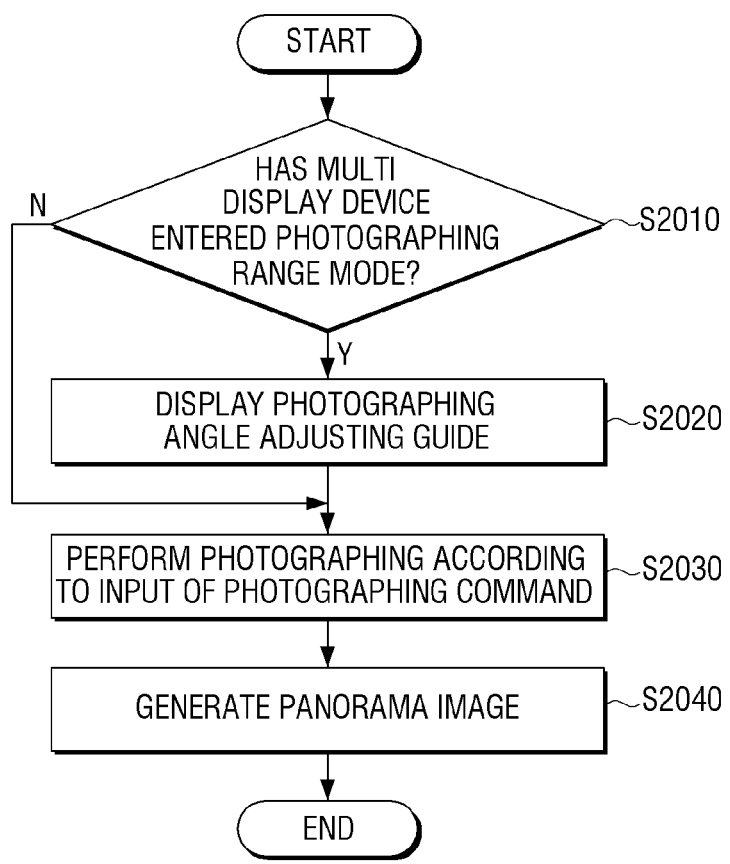
FIG. 20 is a flowchart illustrating a method of capturing a panorama image in a multi display device according to another exemplary embodiment of the present general inventive concept.

FIG. 20 is a flowchart illustrating a method of photographing a panorama image in a multi display device according to an exemplary embodiment of the present general inventive concept.

In operation S2010, a controller determines whether a multi display device is in a photographing range setting mode. The controller displays a photographing range setting screen on a display unit in the photographing range setting mode. For example, a user may set one or more photographing angles of first and second imaging units on the photographing range setting screen. Alternatively, the user may set an overlapping portion of the first and second imaging units to be a minimum. If a photographing range is set, the controller displays a photographing angle adjusting guide in operation S2020. The photographing angle adjusting guide may display an angle to be formed between the first and second imaging units to perform photographing. Alternatively, if the angle between the first and second imaging units is formed so that an overlapping portion between the first and second imaging units is minimum, the controller may inform the user of the angle by using a sound or an image. As another example, an angle movement guide may be displayed to directly induce a photographing angle set by the user.

If adjusting of the angle is ended, photographing is performed according to an input of a photographing command of the user in operation S2030. If the photographing is performed, the controller combines two images to generate a panorama image content in operation S2040.

Figure 21:
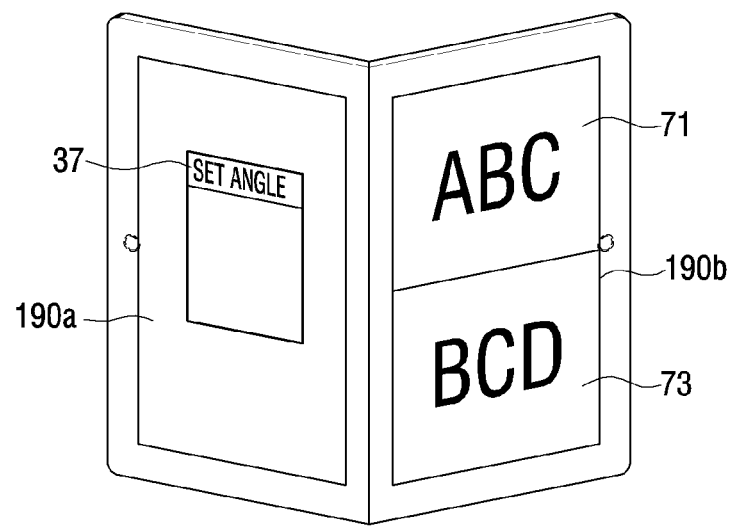
FIG. 21 is a view illustrating a method of setting an angle of an imaging unit for capturing a panorama image according to an exemplary embodiment of the present general inventive concept.

FIG. 21 is a view illustrating a method of setting an angle of an imaging unit to photograph a panorama image according to an exemplary embodiment of the present general inventive concept.

Referring to FIG. 21, a first display unit 190*a* displays a photographing range setting screen 37. The photographing range setting screen 37 may be displayed in a pop-up window form or may be displayed in a menu bar form in a predetermined space of the first display unit 190*a*. The photographing range setting screen 37 having the pop-up window form may be transparently or semi-transparently displayed. The first display unit 190*a* may display only the photographing range setting screen 37 or may display a screen photographed by a first imaging unit and display the photographing range setting screen 37 on the screen. For example, the photographing range setting screen 37 may display several angles of the first imaging unit so that the user selects one of the several angles. As another example, an input window may be displayed so that the user inputs an angle with a number. Alternatively, the photographing range setting screen 37 may include a list of minimum overlapping area angles.

A second display unit 190*b* displays a live view screen generated by an imaging unit. The second display unit 190*b* may display only a screen photographed by a second imaging unit as an entire screen or may divide the screen into two areas to respectively display screens 71 and 73 photographed by the first and second imaging units in the two areas.

Figure 22:
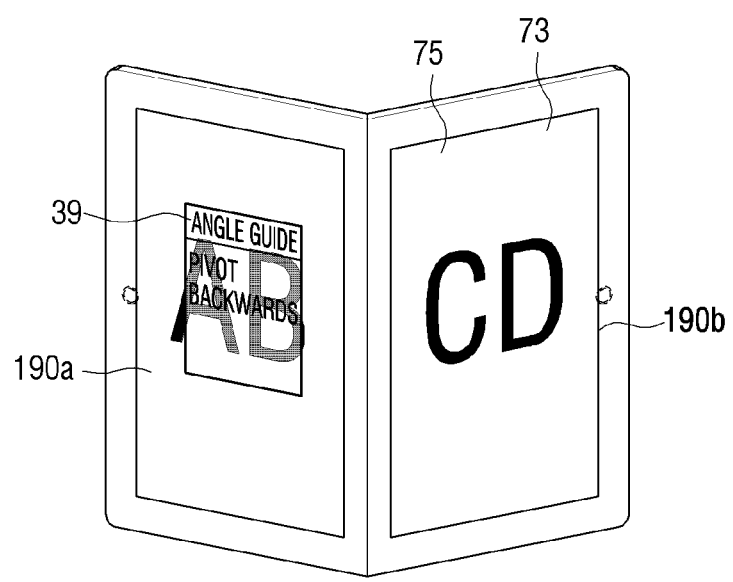
FIG. 22 is a view illustrating a method of using an angle guide for capturing a panorama image according to an exemplary embodiment of the present general inventive concept.

FIG. 22 is a view illustrating a method of using an angle guide to photograph a panorama image according to an exemplary embodiment of the present general inventive concept.

Referring to FIG. 22, a first display unit 190*a* displays an angle guide 39 having a text form to induce a photographing angle set by a user.

The angle guide 39 may directly display directions and degrees of movements of imaging units to the user and display angles changing according to changes of angles of the imaging units. Alternatively, the angle guide 39 may display an image at an angle at which the imaging unit performs photographing, on the first display unit 190*a*. According to the method of displaying the image at the angle at which the photographing is performed, if the imaging unit photographs a left portion of a subject, an image leaning to (disposed at) a left area of a display unit may be displayed. If the imaging unit photographs a right portion, an image leaning to (disposed at) a right area of the display unit may be displayed. If an angle of the imaging unit becomes an angle set on a photographing range setting screen or a minimum overlapping area angle, the user is informed of the angle by using an image or a sound. As another example, if the angle of the imaging unit becomes an angle set by the user, the imaging unit may automatically perform photographing.

A second display unit 190*b* may display the same screen as that described with reference to FIG. 21. The screens displayed on the first and second display units 190*a* and 190*b* of FIGS. 21 and 22 may be displayed on opposite display units.

As described in the method above, the multi display device photographs a plurality of images in a horizontal direction. However, the multi display device may photograph the plurality of images in a vertical direction. The controller connects the plurality of images photographed by the above-described method to one another in a horizontal or vertical direction to generate one panorama image content. The panorama image content generated by the above-described method may have various forms and thus requires editing such as cropping.

FIG. 23 is a view illustrating a method of generating a cropped image according to an exemplary embodiment of the present general inventive concept.

Referring to a view (1) of FIG. 23, a display unit combines a plurality of images to generate one panorama image. The panorama image refers to one continuous image that is generated by connecting overlapping portions of images to one another. Since compositions of images of an initially generated panorama image 22 do not accurately match with one another, the initially generated panorama image 22 may have various forms. If the initially generated panorama image 22 is selected, the controller may enlarge the selected image to display the initially generated panorama image 22 to an entire screen of first and second display units.

Referring to a view (2) of FIG. 23, the display unit displays a menu which is to select whether the initially generated panorama image 22 is to be cropped. Since the initially generated panorama image 22 has the various forms as described above, a predetermined rectangular shape may be cropped from the initially generated panorama image 22. If an automatic crop 43 is selected, the display unit displays a progress bar 13 indicating a progress state of generating a cropped image. The cropped image may be stored, and enlarged and displayed on the display unit.

Figure 24:
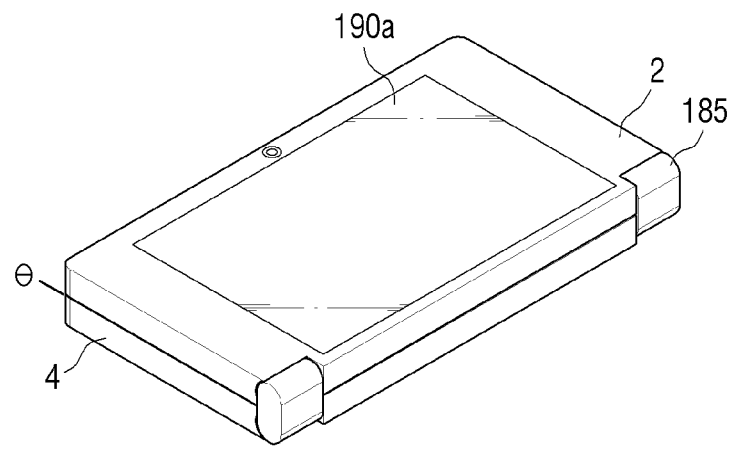
FIG. 24 is a view illustrating a single mode of a multi display device according to an exemplary embodiment of the present general inventive concept.

FIG. 24 is a view illustrating a single mode according to a hinge unit angle of a multi display device according to an exemplary embodiment of the present general inventive concept. The multi display device of FIG. 24 may be described with reference to the multi display device 100 of FIGS. 1-9.

Referring to FIG. 24, the multi display device 100 includes first and second bodies 2 and 4. The first and second bodies 2 and 4 are connected to each other through a hinge unit 185 to perform relative movements. The first and second bodies 2 and 4 may be electrically connected to each other. A first display unit 190a is arranged on a side of the first body 2, and at least one physical button is arranged on a side of the first display unit 190a.

If the first and second bodies 2 and 4 are connected to each other through the hinge unit 185 to pivot, the multi display device 100 may be a portable phone, a notebook PC, a tablet PC, a portable multimedia player (PMP), or the like. In the above description, the first display unit 190a and a second display unit 190b are respectively arranged on the first and second bodies 2 and 4. However, as will be described later, a touch screen display may be provided on one of two panels. Also, at least one of functional buttons provided on a side of each of the first and second display units 190a and 190b may be omitted. In addition, as described above, the first and second bodies 2 and 4 are connected to each other through the hinge unit 185. However, if the first and second bodies 2 and 4 are folded through relative movements, the first and second bodies 2 and 4 may be connected to each other through another element.

The hinge unit 185 may include two hinges that are arranged at upper and lower connection parts between the first and second bodies 2 and 4. At least one of the first and second bodies 2 and 4 may have a portion disposed between the two hinges of the hinge unit 185 to support the two hinges. The hinge unit 185 may include one hinge that is arranged at all connection parts between the first and second bodies 2 and 4.

The multi display device 100 may include a display device including the first and second display units 190a and 190b that are physically or a graphically separated from each other and may support various screen modes by using the first and second display units 190a and 190b. The first and second display units 190a and 190b may have a screen area. A portion of the screen area may be disposed in the portion of the first and second bodies 2 and 4 between the two hinges.

Various modes may be used according to a relative angle θ between the first and second bodies 2 and 4 of the multi display device 100. The relative angle θ refers to a pivoting angle between the first and second bodies 2 and 4 such that the first and second bodies 2 and 4 pivot in a predetermined direction (for example, in a counterclockwise direction). In detail, the relative angle θ may be detected by a hinge sensor (not illustrated) installed in the hinge unit 185. The hinge sensor includes one of a hole sensor (hall sensor), a pressure sensor, an induction detection sensor, an electrical contact sensor, and an optical sensor to detect a motion and a relative position of the hinge in order to recognize the relative angle θ.

The relative angle θ may be recognized by detecting positions of the first and second bodies 2 and 4 through a geomagnetic sensor or an acceleration sensor besides the hinge sensor.

As illustrated in FIG. 24, when the first and second display units 190a and 190b on the first and second bodies 2 and 4 are disposed opposite to each other, the first and second bodies 2 and 4 are disposed at a position to contact each other. In other words, the second display unit 190 is positioned on a side opposite to a side on which the first display unit 190a is positioned. When the user sees the first display unit 190a, the second display unit 190b is positioned on an opposite side, and thus the user may not directly see the second display unit 190b. The user may see only one display unit as described above.

Here, the relative angle θ may be 0° as illustrated in FIG. 24. For example, if the relative angle θ between the first and second bodies 2 and 4 is between 0° and 60°, the relative angle θ may be referred to as a single mode. The single mode may be usefully used when the multi display device 100 is locked and in a call application. In the single mode, the first display unit 190a arranged on a front side may display a job screen generated by at least one application, and the second display unit 190b on a back side may be turned off. A few of applications may turn on the second display unit 190b arranged on the back side by using an option menu. The user may see only one display screen in the single mode, and thus the controller 130 controls only one display unit. In other words, the controller 130 transmits a control signal only to a display unit that the user currently sees. The controller 130 may not transmit an additional control signal and an additional data signal to a display unit that is not controlled by the controller 130, thereby reducing power consumption.

Here, the display unit that does not receive the control signal and the data signal operates in a sleep mode. Also, if the controller 130 applies a signal to change the sleep mode to another mode to the display unit or the user pivots a direction of the multi display device 100 to see the display unit operating in the sleep mode, the sleep mode of the display unit is changed to another mode.

Figure 25:
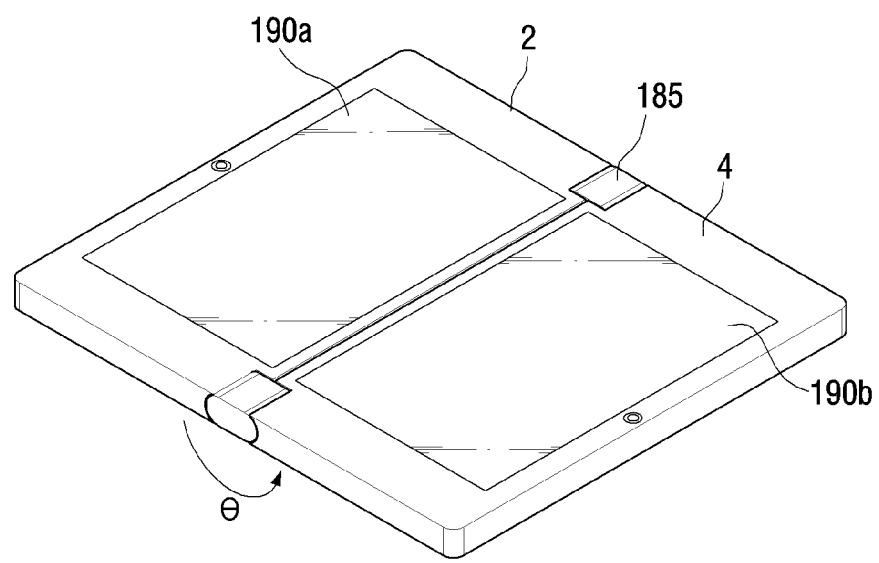
FIG. 25 is a view illustrating an expanding mode of a multi display device according to an exemplary embodiment of the present general inventive concept.

FIG. 25 is a view illustrating an expanding mode of a multi display device according to an exemplary embodiment of the present general inventive concept.

Referring to FIG. 25, first and second bodies 2 and 4 are disposed at a position to be parallel with each other, and a relative angle θ is 180° or is approximate to 180° within a predetermined range. In other words, the first and second bodies 2 and 4 are unfolded. Hereinafter, this is referred to as an expanding mode. For example, when the relative angle θ between the first and second bodies 2 and 4 is within a range between 175° and 185°, the multi display device 100 recognizes the first and second bodies 2 and 4 as being unfolded. In the expanding mode, two job screens for two applications may be respectively displayed on first and second display units 190a and 190b, one job screen for one application may be displayed on the first and second display units 190a and 190b, or two job screens for one application may be displayed on the first and second display units 190a and 190b. Any application may not be displayed on one display unit but a defaulted home screen may be displayed on the one display unit. The expanding mode may be usefully used on an E-book, a moving picture application, and a web browsing screen. The expanding mode may also be usefully used for several types of photographing using the imaging unit 140.

As described above, the controller 130 may control a photographing process to generate a 3D image content by simultaneously using first and second imaging units and a photographing process to generate a panorama image content.

If one imaging unit is activated, the first and second display units 190a and 190b may display an image photographed by the activated imaging unit. A method of displaying a photographed image on a display unit will now be described.

Figure 26:
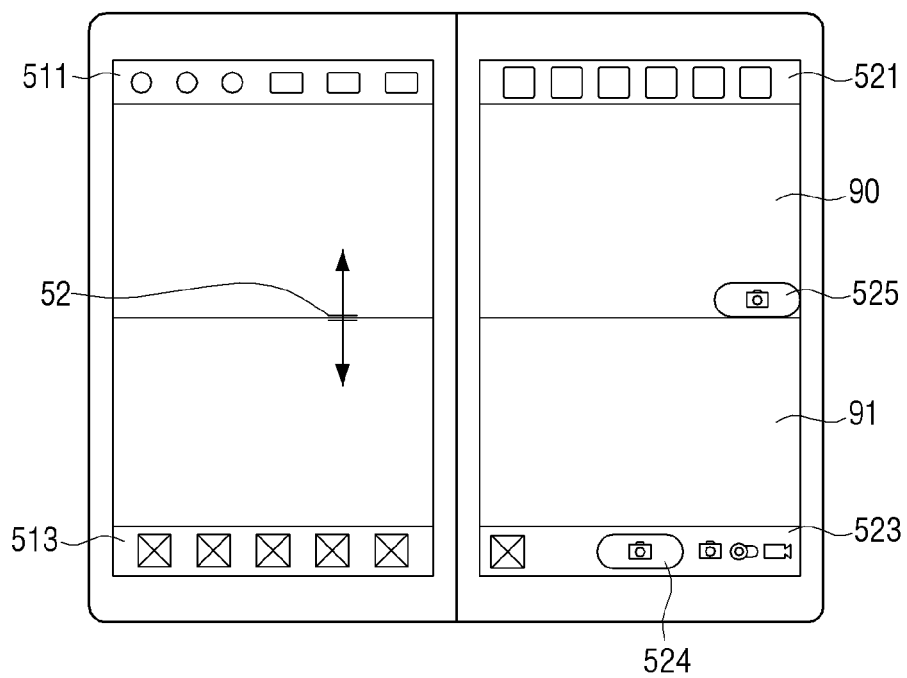
FIGS. 26 through 28 are views illustrating a capturing screen of an imaging unit in an expanding mode according to an exemplary embodiment of the present general inventive concept.
Figure 27:
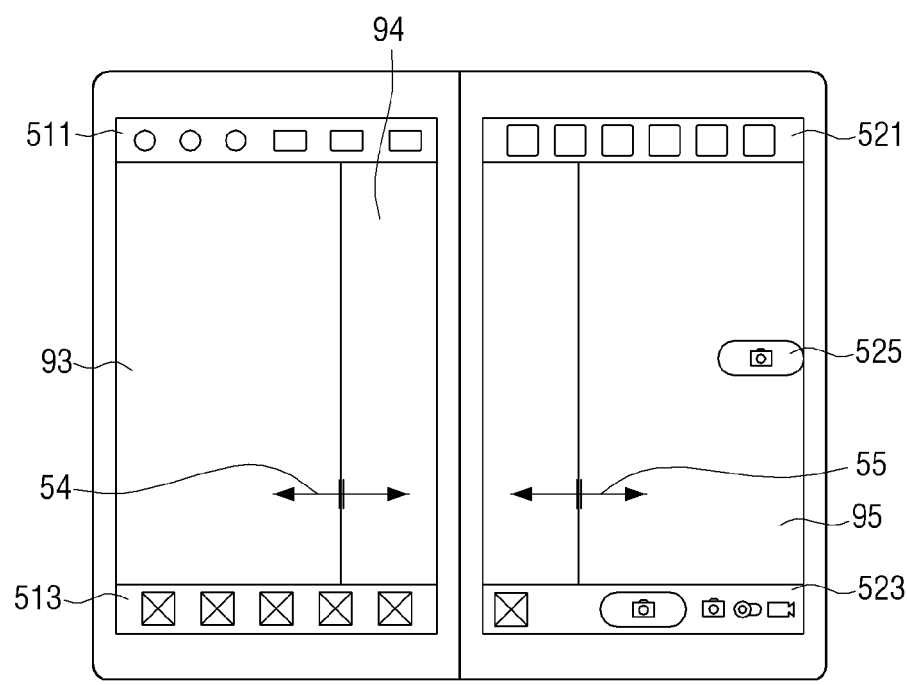
Figure 28:
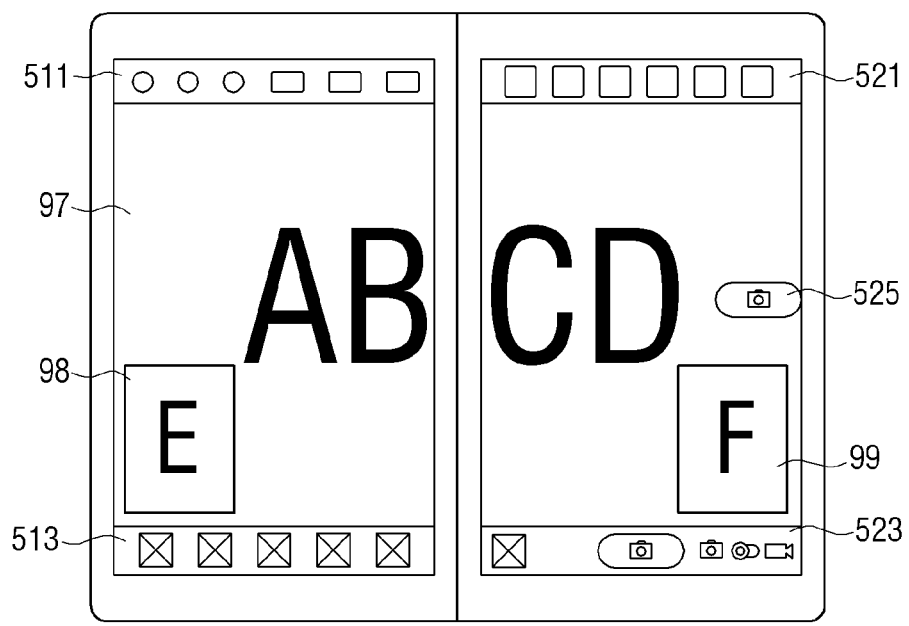

FIGS. 26 through 28 are views illustrating a photographing screen of an imaging unit in an expanding mode in a multi display device according to an exemplary embodiment of the present general inventive concept.

Referring to FIG. 26, a selection menu bar 511 is displayed on an upper end area of the first display unit 190a. The selection menu bar 511 may include an imaging unit selection button, a photographing mode selection mode, etc. The imaging unit selection button may separately turn on and/or off imaging units installed in a multi display device. An album area 513 is displayed on a lower end area of the first display unit 190a. The album area 513 displays a list of the predetermined number of photos that have been recently photographed or stored.

A quick dock bar 521 is displayed on an upper end area of the second display unit 190b. The quick dock bar 521 is an area that quickly executes a shortcut function of a tool set of an image unit. A user may directly activate the tool set to add a desired function to the quick dock bar 521. A control bar 523 is displayed on a lower end area of the second display unit 190b. The control bar 523 may include a photographing button 524, a photo and/moving picture mode change button, etc. An auxiliary photographing button 525 is displayed in a right center area of the second display unit 190b. The auxiliary photographing button 525 is an auxiliary button that executes a photographing function and may be activated by using a proximity sensor when a user object or a pen having a predetermined condition approaches the auxiliary photographing button 525. The photographing button 524 and the auxiliary photographing button 525 may correspond to the first and second imaging units, respectively.

If two imaging units are activated, a display unit may be divided into two areas. According to an exemplary embodiment for dividing the display unit into the two areas, an image photographed by a first imaging unit may be displayed on a first display unit, and an image photographed by a second imaging unit may be displayed on a second display unit. As another exemplary embodiment, as illustrated in FIG. 26, the first and second display units 190a and 190b may be regarded as a whole screen to be divided into upper and lower screens 90 and 91. A boundary 52 between the upper and lower screens 90 and 91 may be moved by using a touch gesture, a space gesture, or the like.

Referring to FIG. 27, three imaging units are activated in the multi display device. Menu screens displayed on the first and second display units 190a and 190b are as described with reference to FIG. 26. A display unit may be divided into three areas to display images photographed by the three imaging units that have been activated. According to an exemplary embodiment, as illustrated in FIG. 27, the first and second display units 190a and 190b may be regarded as a whole screen to be divided into three screens 93, 94, and 95 in a vertical direction. Boundaries 54 and 55 between the three screens 93, 94, and 95 may be moved by using a touch gesture, a space gesture, or the like. Areas of the screens 93, 94, and 95 may be variable according to movements of the boundaries 54 and 55. According to another exemplary embodiment, the three screens 93, 94, and 95 may be vertically equally divided.

According to another exemplary embodiment, referring to FIG. 28, three imaging units are activated to divide a screen.

A display unit is divided into three areas to display images photographed by the three imaging units that have been activated. An image photographed by a first imaging unit is displayed as a first picture-in-picture (PIP) 98 on a lower end of a first display unit. An image photographed by a second imaging unit is displayed as a second PIP 99 on a lower end of a second display unit. An image photographed by a third imaging unit is displayed as a whole screen 97 of the first and second display units. In this case, the image displayed as the whole screen 97 is displayed as a main PIP image including portions to correspond to the first and second PIPs 98 and 99. Positions and sizes of the first and second PIPs 98 and 99 may be variously adjusted, and displays of the images photographed by the first through third imaging units are not limited to the above-described areas.

In FIGS. 26 through 28, divided screens displayed on two display units have been described. However, the above-described method may be applied to one display unit. In other words, the one display unit may be horizontally or vertically divided into two or three areas, and boundaries between the divided areas may be moved. Alternatively, images may be displayed as a whole screen and PIPs on one display unit.

Figure 29:
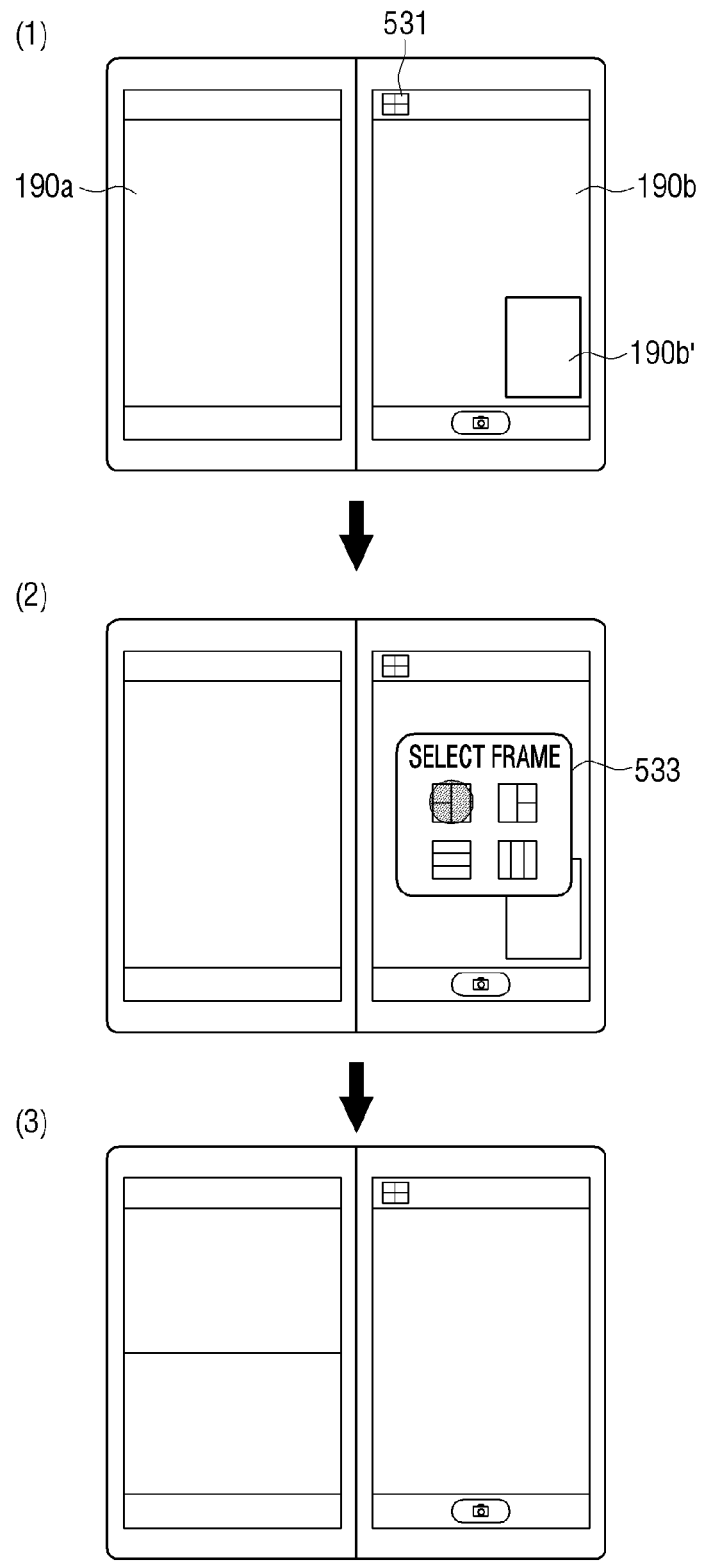
FIG. 29 is a view illustrating a method of selecting a screen frame according to an exemplary embodiment of the present general inventive concept.

FIG. 29 is a view illustrating a method of selecting a screen frame in a multi display device according to an exemplary embodiment of the present general inventive concept.

Referring to a view (1) of FIG. 29, images are displayed in first and second display units 190a and 190b and a PIP area 190b' of the second display unit 190b. A screen frame selection button 531 is displayed on an upper end area of the second display unit 190b. A user taps the screen frame selection button 531.

Referring to a view (2) of FIG. 29, a frame selection menu 533 is displayed as a pop-up window form on the second display unit 190b according to the selection of the screen frame selection button 531 of the view (1) of FIG. 29. The frame selection menu 533 may be variously displayed according to the number of imaging units that are activated. For example, if two imaging units are activated, the first and second display units 190a and 190b may display respectively photographed images by each imaging unit, and a whole part of the first and second display units 190a and 190b may be horizontally divided into two areas and display respectively photographed images by each imaging unit. In the view (2) of FIG. 29, since three imaging units are activated, the frame selection menu 533 displays a menu to horizontally divide the first display unit 190a and to display a whole part of the second display unit 190b, a menu to display a whole part of the first display unit 190a and to horizontally divide the second display unit 190b, a menu to divide the first and second display units 190a and 190b into three areas, and a menu to vertically divide the first and second display units 190a and 190b into three areas.

If one imaging unit is used, a screen dividing function may not be performed. Therefore, in this case, if the screen frame selection button 531 or the frame selection menu 533 is selected, the controller 130 displays a message indicating that the frame selection menu 533 may not be used.

Referring to a view (3) of FIG. 29, a selection of horizontally dividing the first display unit 190a into two areas and wholly displaying the second display unit 190b is made. Therefore, screens are divided as the selection is made, to display images. A boundary may be moved as described with reference to FIG. 26.

Since the multi display device includes a plurality of imaging units and a plurality of display units, various types of images may be acquired by using the plurality of imaging units and the plurality of display units according to various methods. In other words, functions are separately set with respect to the plurality of imaging units and the plurality of display units to apply different functions with respect to the same subject in order to perform photographing and displaying.

For example, a function of photographing a still image may be set with respect to the first imaging unit, and a function of photographing a moving picture may be set with respect to the second imaging unit. Alternatively, a general image photographing function may be set with respect to the first imaging unit, and a special effect photographing function may be set with respect to the second imaging unit. Functions may be separately set with respect to the corresponding display units. For example, a moving picture display function may be set with respect to the first display unit 190*a*, and a still image display function may be set with respect to the second display unit.

The user may set these separate functions through a setting screen. In other words, if the user selects a menu button, the multi display device displays the setting screen on at least one of the first and second display units 190*a* and 190*b*. Functions that may be applied to the imaging units and the display units may be displayed on the setting screen. The user may respectively set and store desired functions with respect to the imaging units or the display units in a memory unit by using the setting screen. The controller 130 of the multi display device stores contents set through the setting screen and uses the stored contents in subsequent operations.

Various methods and operations of setting and using different functions with respect to imaging units or display units as in the present exemplary embodiment will now be described.

FIGS. 30 and 31 are views illustrating operations of a multi display device according to an exemplary embodiment of the present general inventive concept.

FIG. 30 illustrates the multi display device that executes a still image photographing mode and a moving picture photographing mode. Referring to a view (1) of FIG. 30, a first imaging unit is set to the still image photographing mode, and a second imaging unit is set to the moving picture photographing mode. An image photographed by the first imaging unit is displayed on a first display unit 190*a*, and an image photographed by the second imaging unit is displayed on a second display unit 190*b*. Therefore, a photographing button 541 is displayed on a lower end area of the first display unit 190*a*, and a moving picture photographing button 543 is displayed on a lower end area of the second display unit 190*b*. A moving picture photographing progress time 15*a* is displayed on an upper end area of the second display unit 190*b* to indicate a time taken for photographing and/or recording.

Referring to a view (2) of FIG. 30, a bird and a tree are photographed as subjects. If the bird sits on the tree, the first imaging unit photographs a still image, and the second imaging unit photographs a moving picture. If the bird flies from the tree after 14 seconds passes, the first display unit 190*a* displays an image in which the bird sits on the tree, and the second display unit 190*b* displays a progress time 15*b* to indicate that a moving picture is being photographed for 14 seconds and an image which the bird flies from the tree.

FIG. 31 illustrates the multi display device that executes a scenery photographing function and a person photographing function. Referring to a view (1) of FIG. 31, the scenery photographing function is set with respect to a first imaging unit, and the person photographing function is set with respect to a second imaging unit. If the scenery photographing function is set, the controller 130 zooms the first imaging unit out to photograph a whole scenery. If the person photographing function is set, the controller 130 zooms the second imaging unit in to photograph a person on a whole screen. An image photographed by the first imaging unit is displayed on the first display unit 190*a*, and an image photographed by the second imaging unit is displayed on the second display unit 190*b*. Therefore, if a user taps photographing buttons 545 and 547 displayed on lower end areas of the first and second display units 190*a* and 190*b*, the first display unit 190*a* displays a photographed scenery image, and the second display unit 190*b* displays a photographed person image. Alternatively, the user may tap one of the photographing buttons 545 and 547 to simultaneously store the scenery image and the person image in a memory unit.

The functions illustrated in FIGS. 30 and 31 are an exemplary embodiment, and thus various modifications, such as specific effect photographing, continuous photographing, shutter first photographing, iris first photographing, etc., may be made.

As described above, the exemplary embodiment to separately set functions with respect to imaging units and display units may be realized through a combination of an exemplary embodiment for the above-described panorama photographing and an exemplary embodiment for 3D photographing.

For example, in a multi display device executing panorama photographing, a controller may display a setting screen for respectively setting functions with respect to first and second display units on at least one of the first and second display units. The user may select the functions, which are to be respectively applied to the first and second display units, by using the setting screen. The controller separately controls display operations of the first and second display units according to a function selected on the setting screen.

For example, if a panorama display function is set with respect to the first display unit, and a mono display function is set with respect to the second display unit, the controller may display a panorama image content on the first display unit and display one of separate image contents respectively photographed by the first and second imaging units. Alternatively, a screen of the second display unit may be divided to all of images photographed by the first and second imaging units. The user may touch and drag a screen on the first display unit that displays the panorama image content to move the panorama image content in order to check a whole part of the panorama image content. Also, the user may touch and flick a screen on the second display unit to change separate image contents in order to check the separate image contents one by one.

Besides the panorama display function or the mono display function, various special effects, such as a black and white display function, a negative display function, a sepia function, zoom-in/zoom-out functions, etc., may be separately set with respect to display units.

Alternatively, different functions may be separately set with respect to imaging units. For example, a panorama photographing function may be set with respect to the first imaging unit, and a still image photographing function or a moving picture photographing function may be set with respect to the second imaging unit to separately acquire images. The present exemplary embodiment may also be realized in an exemplary embodiment for 3D photographing. The controller displays a setting screen for respectively setting functions of the first and second display units on at least one of the first and second display units. The controller may separately control display operations of the first and second display units according to a function selected on the setting screen. According to a detailed exemplary embodiment, the controller performs a 3D display function with respect to the first display unit and a 2D display function with respect to the second display unit according to an input of the user. A 3D image content may be displayed on the first display unit, and at least one of left and right eye images may be displayed on the second display unit.

Figure 32:
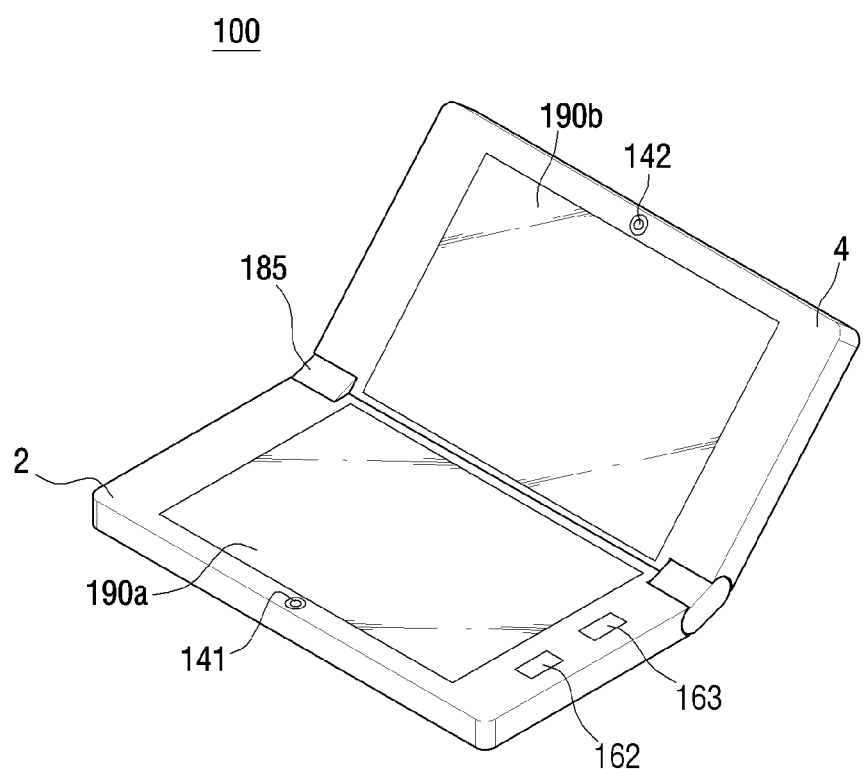
FIG. 32 is a view illustrating a toolkit mode of a multi display device according to an exemplary embodiment of the present general inventive concept.

FIG. 32 is a view illustrating a tool kit mode of a multi display device according to an exemplary embodiment of the present general inventive concept.

A structure of a first body 2 is as described with reference to FIG. 24. A second display unit 190b is arranged on a side of a second body 4, and at least one physical button is arranged on a side of the second display unit 190b. The physical button includes at least one of a push button and a touch button. According to an exemplary embodiment, a first display unit 190a may be arranged on the first body 2 including a speaker 163 and a microphone 162 and operate as a main screen. The speaker 163 and the microphone 162 may correspond to at least one of the first body 2 and the second body 4 according to a user or design preference/selection. Although FIG. 32 illustrates the speaker 163 and the microphone 162 disposed on the same side of the first body 2 as the first display unit 190a, the speaker 163 and the microphone 162 may be disposed on a different side of the first body. It is also possible that the speaker 163 and the microphone 162 may be formed as a single unit. It is also possible that the speaker 163 and/or the microphone 162 are disposed on the second body 4. The second display unit 190b arranged on the second body 4 may operate as a sub screen. According to an exemplary embodiment, the first body 2 includes a first imaging unit 141, and the second body 4 includes a second imaging unit 142.

As illustrated in FIG. 32, a relative angle between the first and second bodies 2 and 4 exceeds 180°, i.e., the first and second display units 190a and 190b are slightly folded inwards. In the present specification, this state is referred to as a tool kit mode. As an example, the relative angle between the first and second bodies 2 and 4 is within a range, for example, between 185° and 265°, this state is recognized as the tool kit mode. The tool kit mode is useful when the first and second display units 190a and 190b are folded inward, and thus the multi display device 100 is used as a similar form to a notebook PC. As an example, a job screen is displayed on one of the first and second display units 190a and 190b, and various job environments are displayed on the second display unit 190b to display a tool such as a keyboard, etc.

Figure 33:
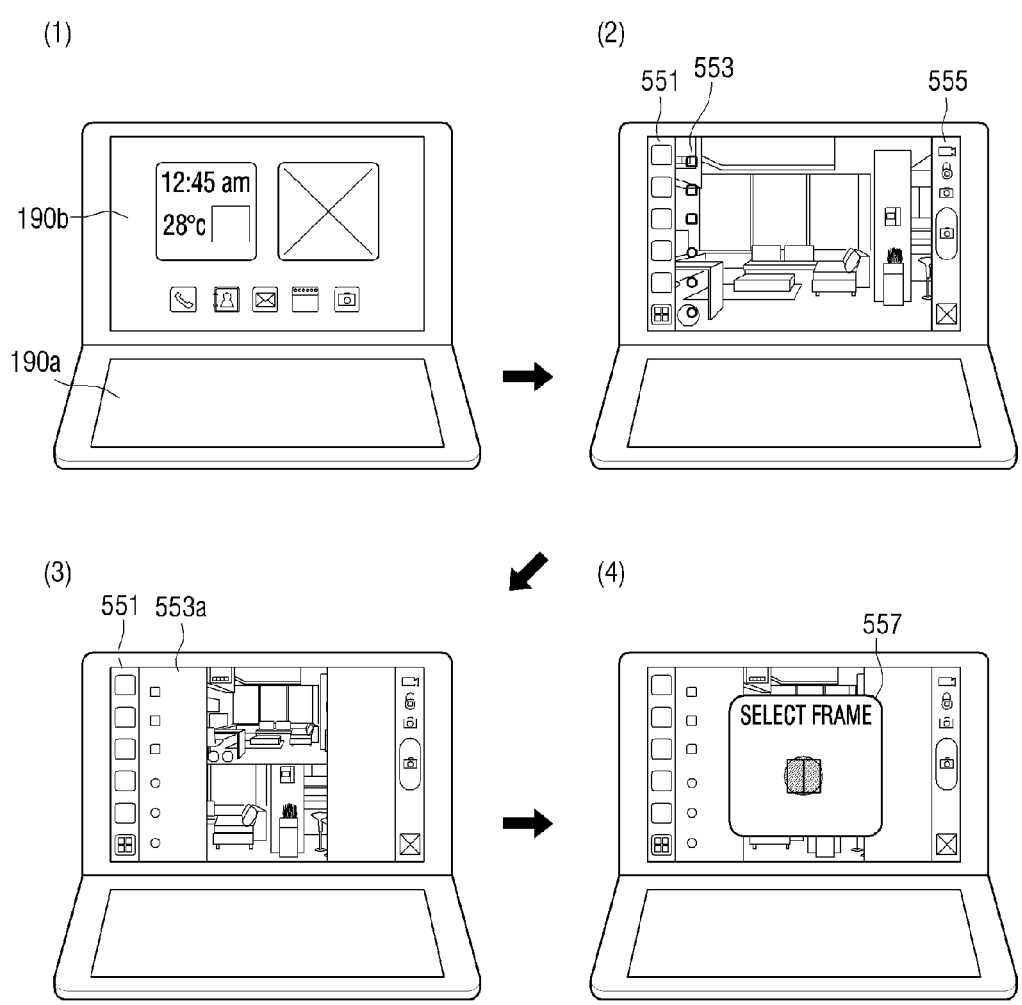
FIGS. 33 through 35 are views illustrating a screen frame in a toolkit mode according to an exemplary embodiment of the present general inventive concept.
Figure 34:
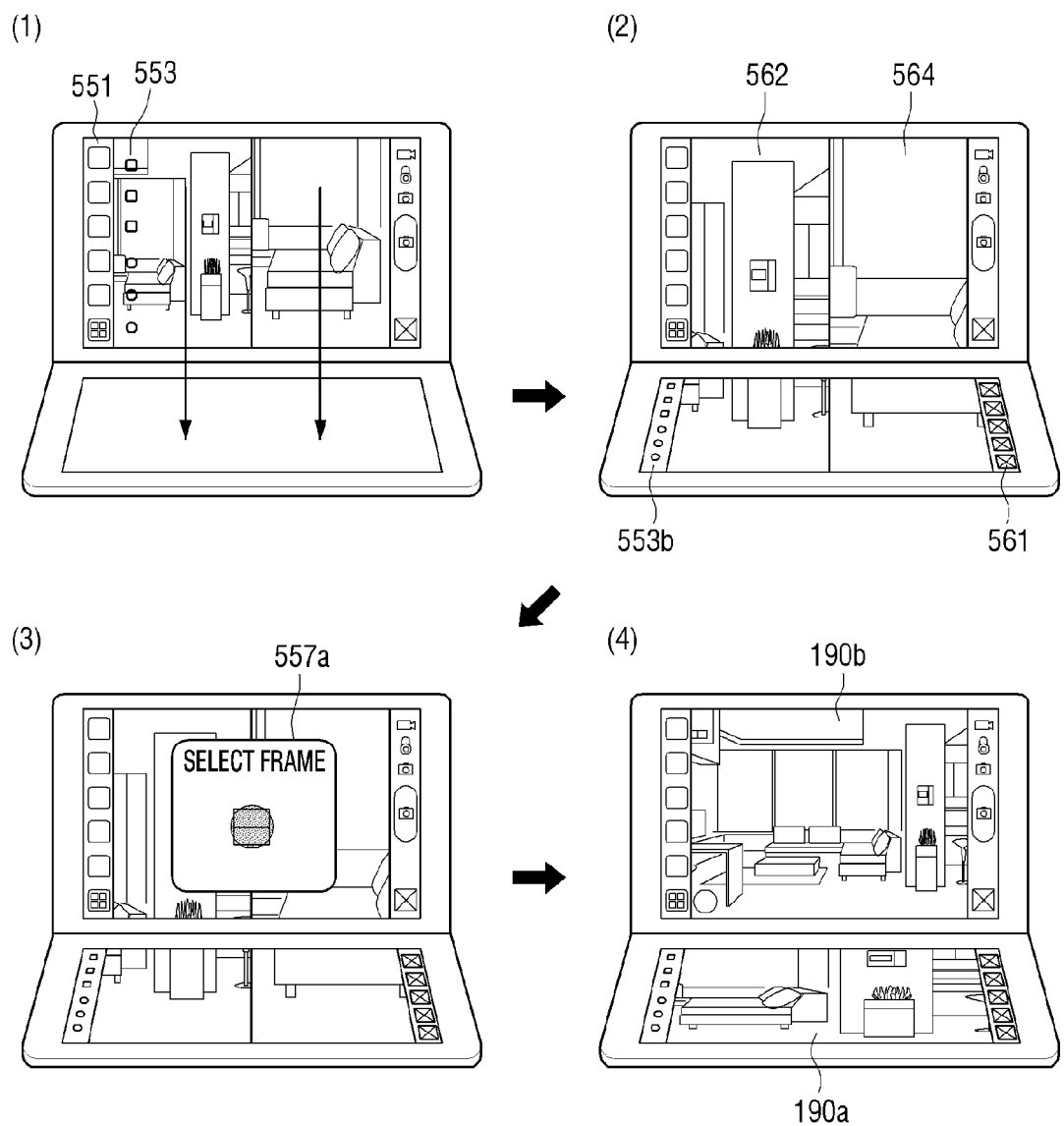
Figure 35:
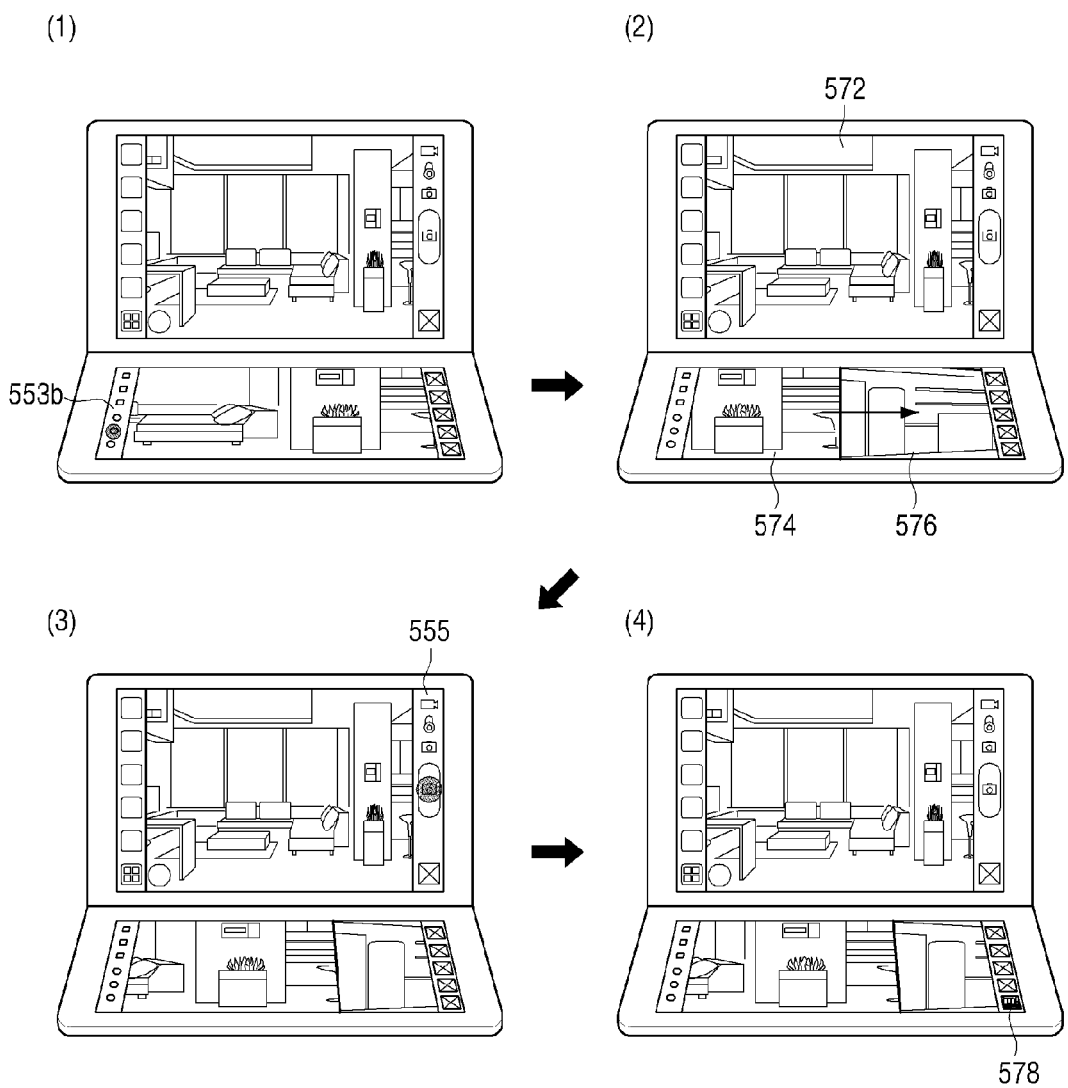

FIGS. 33 through 35 are views illustrating a screen frame in a tool kit mode of a multi display device according to an exemplary embodiment of the present general inventive concept.

Referring to a view (1) of FIG. 33, a second display unit 190b displays a home screen. Several types of menus and information and an imaging unit selection button are displayed on the home screen. If a user taps the imaging unit selection button, one imaging unit is activated. A first display unit 190a displays various types of menus or tools related to other functions, such as a menu, an icon, a keyboard, etc.

Referring to a view (2) of FIG. 33, the second display unit 190b activates one imaging unit to display a photographing screen of the one imaging unit. A quick dock bar 551 and a selection menu area 553 having a vertical shape are displayed on a left side of the second display unit 190b as illustrated in the view (2) of FIG. 33. A control bar and an album area 555 are displayed on a right side of the second display unit 190b. The user activates a second imaging unit using a selection button.

Referring to a view (3) of FIG. 33, at least a portion of the second display unit 190b is divided into two areas to display photographing screens of two imaging units. The areas may be arranged in a vertical direction or in a horizontal direction. In this case, a background of a selection menu area 553a is displayed as a blank to maintain a resolution. The user taps a frame selection button.

Referring to a view (4) of FIG. 33, the second display unit 190b displays a frame selection menu 557 in a pop-up window form according to the frame selection button. A photographing screen of an imaging unit is used only on the second display unit 190b, and thus only a frame having a vertical division form is selected. The user selects the frame having the vertical division form.

Referring to a view (1) of FIG. 34, the second display unit 190b displays a screen that is vertically divided into a plurality of areas, for example, like a plurality of vertical column shapes. A user expands a screen displayed on the second display unit 190b onto the first display unit 190a by using a gesture or the like with respect to the second display unit 190b.

Referring to a view (2) of FIG. 34, the screen expanded from the second display unit onto the first display unit 190a is displayed. In this case, a selection menu area 553 illustrated in the view (1) of FIG. 34 is also moved onto the first display unit 190a to be constituted as a selection menu area 553b on a left side of the first display unit 190a. The album area 555 displayed on the control bar shown in the view (2) of FIG. 33 is also moved onto the first display unit 190a to be constituted as an album area 561 on a right side of the first display unit 190a. The user taps the frame selection button.

Referring to a view (3) of FIG. 34, the second display unit 190b displays a frame selection menu 557a in a pop-up window form according to the frame selection button. The frame selection menu 557a displays a currently available frame. The user selects a displayed frame having a horizontal division form.

Referring to a view (4) of FIG. 34, the first and second display units 190a and 190b respectively display photographing screens of two imaging units according to the selected frame.

Referring to a view (1) of FIG. 35, a selection menu area 553b of the first display unit 190a displays an activated imaging unit and an inactivated imaging unit. The user may tap a selection button for the inactivated imaging unit.

Referring to a view (2) of FIG. 35, the first display unit 190a is vertically divided to display photographing screens 574 and 576 of two imaging units, and the second display unit 190b displays a photographing screen 572 of one imaging unit. The user inputs a command to change an area of the first display unit 190a.

Referring to a view (3) of FIG. 35, a size of a display area of the first display unit 190a is changed according to an input of the user. The user taps a photographing button of a control bar 555. The user may select an image or an area to be photographed before photographing is performed.

Referring to a view (4) of FIG. 35, a photographed image is added as a list 578 of album areas. The photographed image may be one of images of the activated imaging unit, an image displayed on one of the first and second display units 190a and 190b, or an image displayed on a whole part of the first and second display units 190a and 190b.

Figure 36:
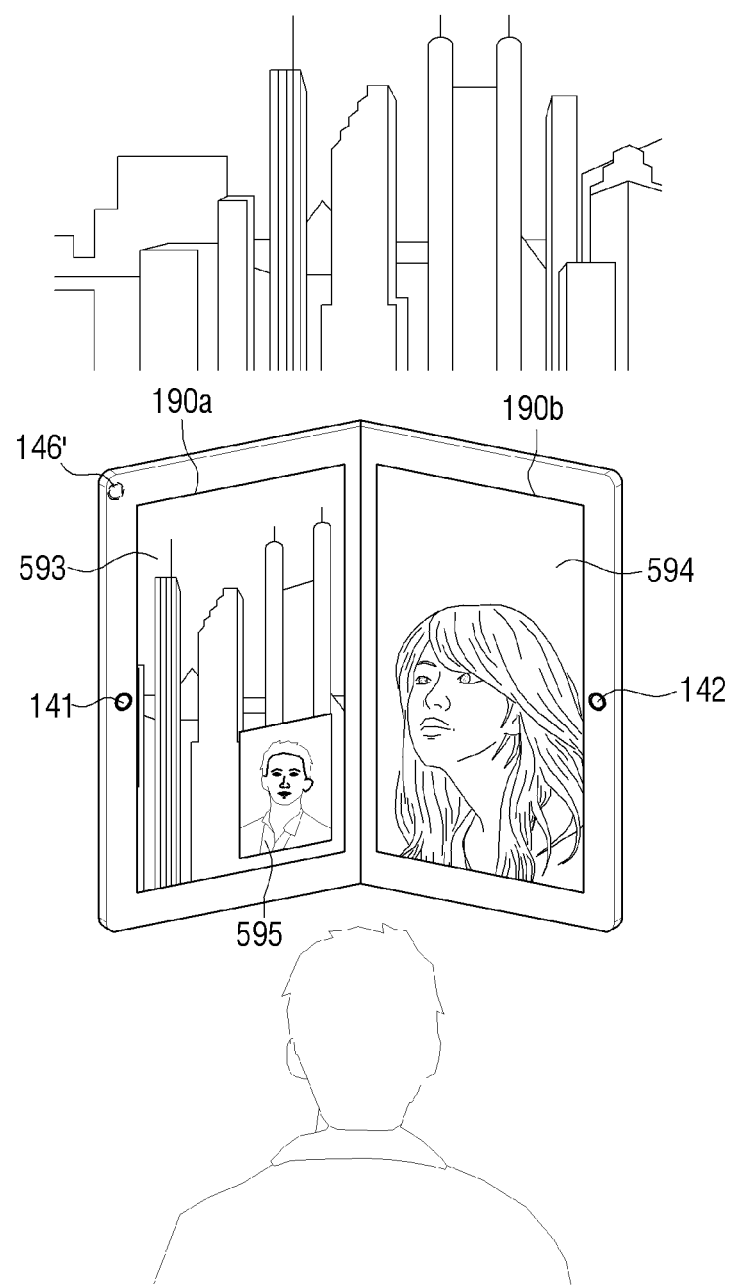
FIG. 36 is a view illustrating a video call function of a multi display device according to an exemplary embodiment of the present general inventive concept.

FIG. 36 is a view illustrating a video call function of a multi display device according to an exemplary embodiment of the present general inventive concept. The multi display device 100 may be used as the multi display device of FIG. 36.

Referring to FIG. 36, the multi display device 100 includes first, second, and third imaging units 141, 142, and 146'. The first display unit 190*a* displays a subject image 593 photographed by the third imaging unit 146' on a whole screen. The first display unit 190*a* displays a user image 595 photographed by the first or second imaging unit 141 or 142. At least one of the subject image 593 and the user image 595 displayed on the first display unit 190*a* may be transmitted to an external counterparty of a video call through an interface (not illustrated) of the multi display device 100. The second display unit 190*b* displays on a screen (or full screen) an image 594 corresponding to an external counterparty of a video call received through an interface (not illustrated) of the multi display device 100. Areas displaying images or sizes of the displayed images may be adjusted according to a user or design selection/preference.

According to an exemplary embodiment, one imaging unit may be arranged on the same side of the first or second body as a display unit, and two imaging units may be displayed on an opposite side to the display unit with respect to a housing of the corresponding body. In this case, the one imaging unit arranged on the same side as the display unit may photograph a user, and the two imaging units arranged on the opposite side to the display unit may photograph a subject. A panorama image content or a 3D image content may be generated by using two images acquired by photographing the subject. The panorama image content or the 3D image content including an image acquired by photographing the user may be displayed on a display unit. Also, at least one of the image acquired by photographing the user, a generated panorama image, and a 3D image may be transmitted to the external counterparty.

Figure 37:
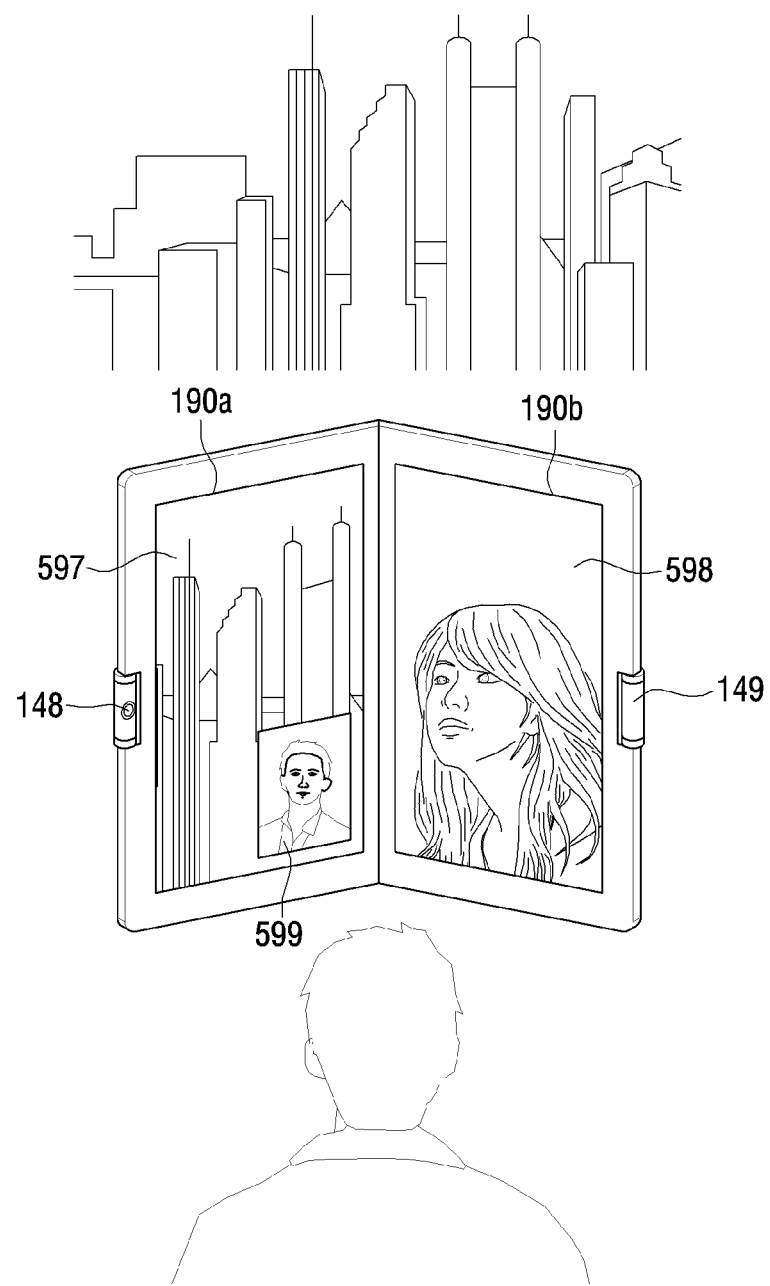
FIG. 37 is a view illustrating a video call function of a multi display device including a rotary imaging unit according to an exemplary embodiment of the present general inventive concept.

FIG. 37 is a view illustrating a video call function of a multi display device including rotary imaging units according to an exemplary embodiment of the present general inventive concept. The multi display device 100 may be used as the multi display device of FIG. 37.

Referring to FIG. 37, the multi display device 100 includes first and second rotary imaging units 148 and 149. The first display unit 190*a* displays a subject image 597 photographed by the second rotary imaging unit 149 on a full screen. The first display unit 190*a* also displays a user image 599 photographed by the first rotary imaging unit 148 as a PIP. At least one of the subject image 597 and the user image 599 displayed on the first display unit 190*a* may be transmitted to a counterpart of a video call. The second display unit 190*b* displays a counterpart 598 of the video call on a full screen. The first and second rotary imaging units 148 and 149 are rotatable and thus freely select subjects to be photographed. Areas display images or sizes of the images may be freely adjusted.

Figure 38:
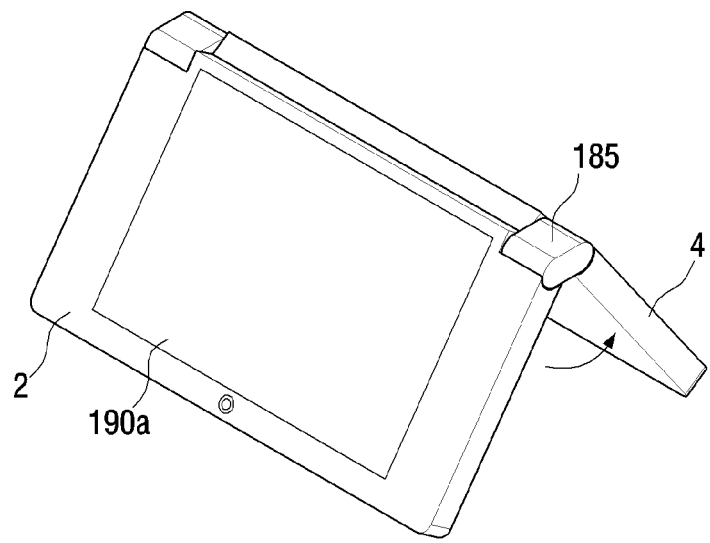
FIG. 38 is a view illustrating a standing mode of a multi display device according to an exemplary embodiment of the present general inventive concept.

FIG. 38 is a view illustrating a standing mode of a multi display device according to an exemplary embodiment of the present general inventive concept.

Referring to FIG. 38, a relative angle between first and second bodies 2 and 4 is smaller than 180°, i.e., first and second display units 190*a* and 190*b* are folded outwards and disposed to respectively face nearly opposite directions. In the present specification, this state is referred to as a standing mode. As an example, the relative angle between the first and second bodies 2 and 3 is within a range between 30° and 90°, the multi display device 100 recognizes the standing mode. In the standing mode, the first and second display units 190*a* and 190*b* are folded outwards, and thus the multi display device 100 stands in a triangle shape on a floor or a reference plane. Therefore, the standing mode may be useful when charging is performed, when the multi display device 10 is used as a digital clock or frame, or when a personal broadcast, a movie, a moving picture, or the like is displayed and viewed for a long period of time.

According to an exemplary embodiment, the standing mode may be applied to an application requiring a cooperation or interaction between two or more users, for example, a video conference, a collaborative game, or the like. The first display unit 190*a* arranged on a front side of the multi display device may display a job screen according to one or more applications and the second display unit 190*b* arranged on a back side may be turned off. A few of applications may turn on the second display unit 190*b* arranged on the back side by using an option menu.

Figure 39:
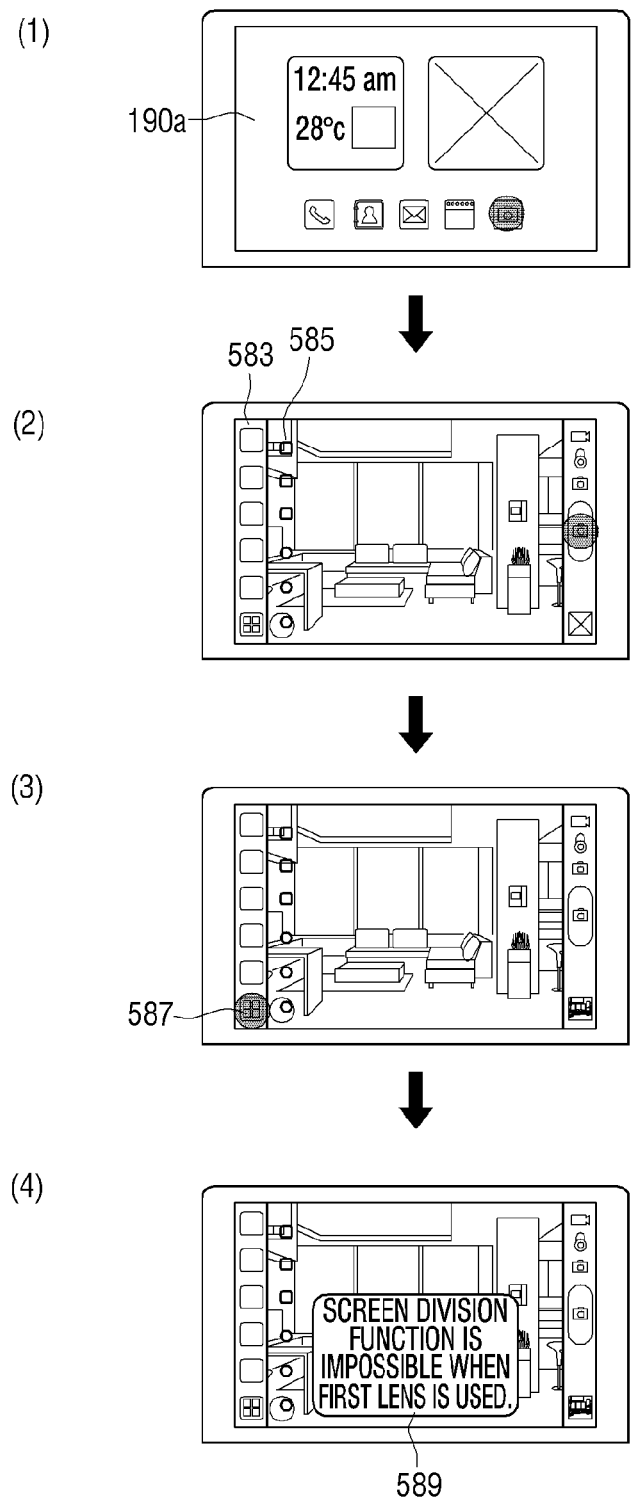
FIGS. 39 and 40 are views illustrating a screen frame in a standing mode according to an exemplary embodiment of the present general inventive concept.
Figure 40:
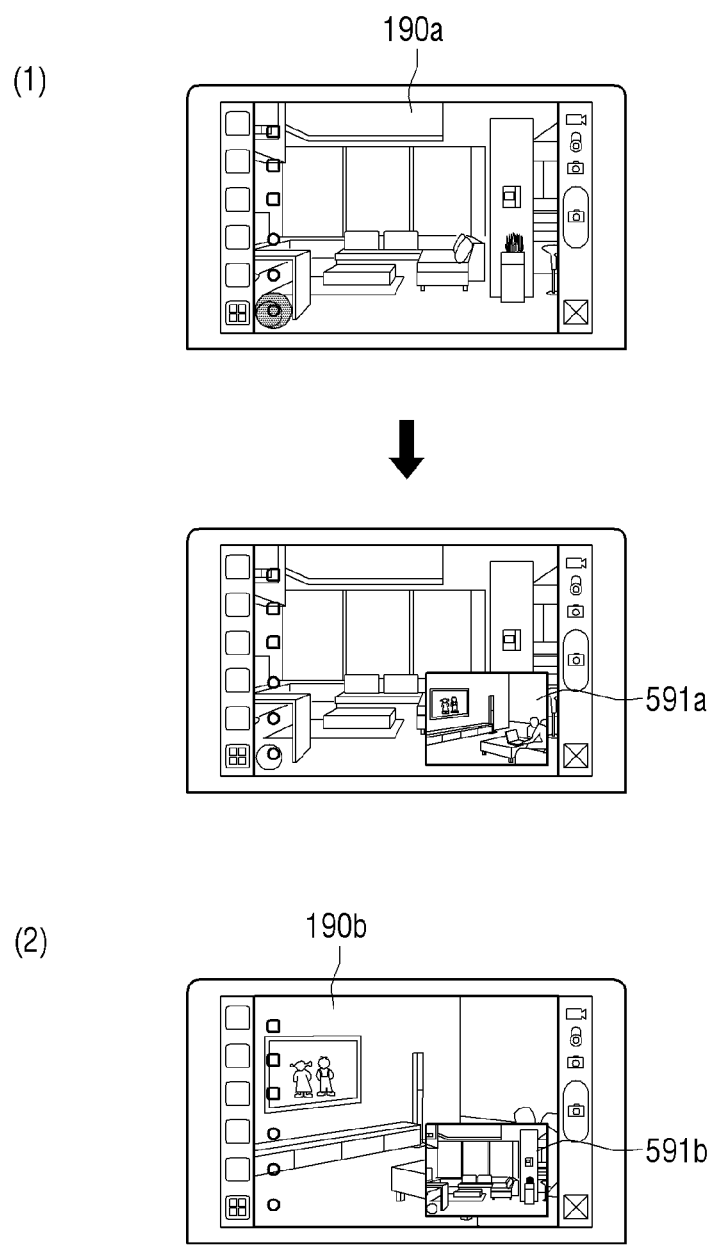

FIGS. 39 and 40 are views illustrating a screen frame in a standing mode of a multi display device according to an exemplary embodiment of the present general inventive concept.

Referring to a view (1) of FIG. 39, a first display unit 190*a* displays a home screen. The home screen displays several types of menus and information and an imaging unit selection button. If a user taps the imaging unit selection button, one imaging unit is activated.

Referring to a view (2) of FIG. 39, a controller of the multi display device may activate one imaging unit according to a selection of a menu of the first display unit 190*a* to display a photographing screen of the imaging unit. In general, the user watches a screen displayed on the first display unit 190*a*. Therefore, the controller may activate a second imaging unit arranged on the same side as a second display unit 190*b* to display a photographing screen of the second imaging unit on the first display unit 190*a*. A quick dock bar 583 having a vertical shape and a selection menu area 585 are displayed on a left side of the first display unit 190*a*. A control bar having a vertical shape and an album area may be displayed on a right side of the first display unit 190*a*. The album area may be displayed in the same area as the control bar and may display only one or two lists. The user taps a photographing button.

Referring to a view (3) of FIG. 39, a photographed image is added as a list of album areas. The user taps a frame selection button 587.

Referring to a view (4) of FIG. 39, since the multi display device activates only one imaging unit, a screen division function may not be used. Therefore, the controller displays information indicating that the screen division function may not be used, in a pop-up window form 589.

Referring to a view (1) of FIG. 40, a selection menu area is displayed on a left side of a first display unit 190*a*. The selection menu area is displayed over a photographing screen of an imaging unit displayed on the first display unit 190*a*. A user taps a first imaging button of the selection menu area to activate a first imaging unit that has been inactivated.

In the view (1) of FIG. 40, the first display unit 190*a* displays the photographing screen of the first imaging unit as a PIP 591*a* according to an input to activate the first imaging unit. Therefore, a full screen of the first display unit 190*a* displays a photographing screen of a second imaging unit, and the PIP 591*a* displays the photographing screen of the first imaging unit.

Referring to a view (2) of FIG. 40, a screen is displayed on a second display unit 190*b*. A full screen of the second display unit 190*b* displays the photographing screen of the first imaging unit, and a PIP 591*b* displays the photographing screen of the second imaging unit. A selection menu area, a quick dock, or a control bar may be displayed on the second display unit 190b.

Figure 41:
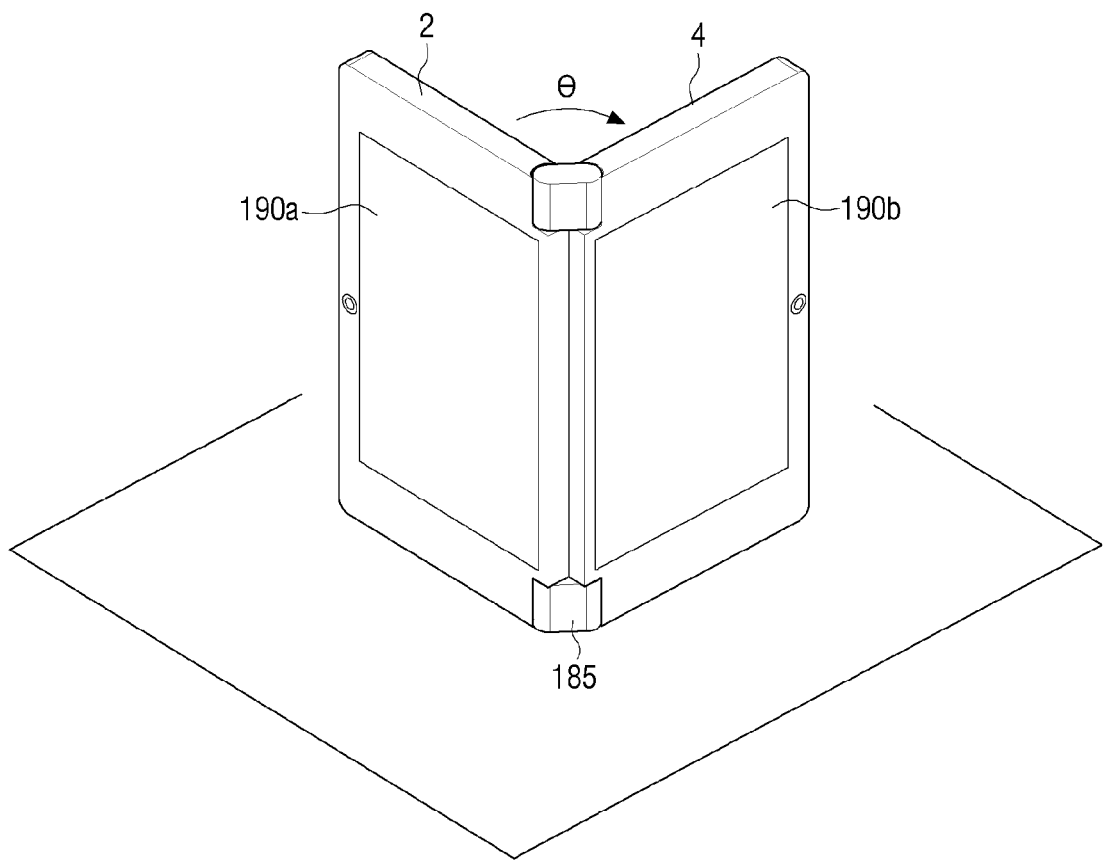
FIG. 41 is a view illustrating a standing mode of a multi display device according to another exemplary embodiment of the present general inventive concept.

FIG. 41 is a view illustrating a standing mode of a multi display device according to another exemplary embodiment of the present general inventive concept. The multi display device 100 may be used as the multi display device.

Referring to FIG. 41, the multi display device 100 is disposed to stand on a floor (reference plane) such that a portion of a hinge contacts the floor. In the present specification, this state is referred to a portrait mode. In the portrait mode, a relative angle between first and second bodies 2 and 4 is within a range between 30° and 90°, and the multi display device 100 is vertically erected by an acceleration sensor.

In detail, the acceleration sensor senses a rotation of the multi display device 100. The acceleration sensor senses a change between the portrait mode in which the first and second display units 190a and 190b of the multi display device 100 are respectively arranged on left and right sides and a landscape mode in which the first and second display units 190a and 190b are arranged on upper and lower sides.

The portrait mode may be applied to an application that provides different images to two or more users, for example, to a video conference, a multi video player, or the like.

Figure 42:
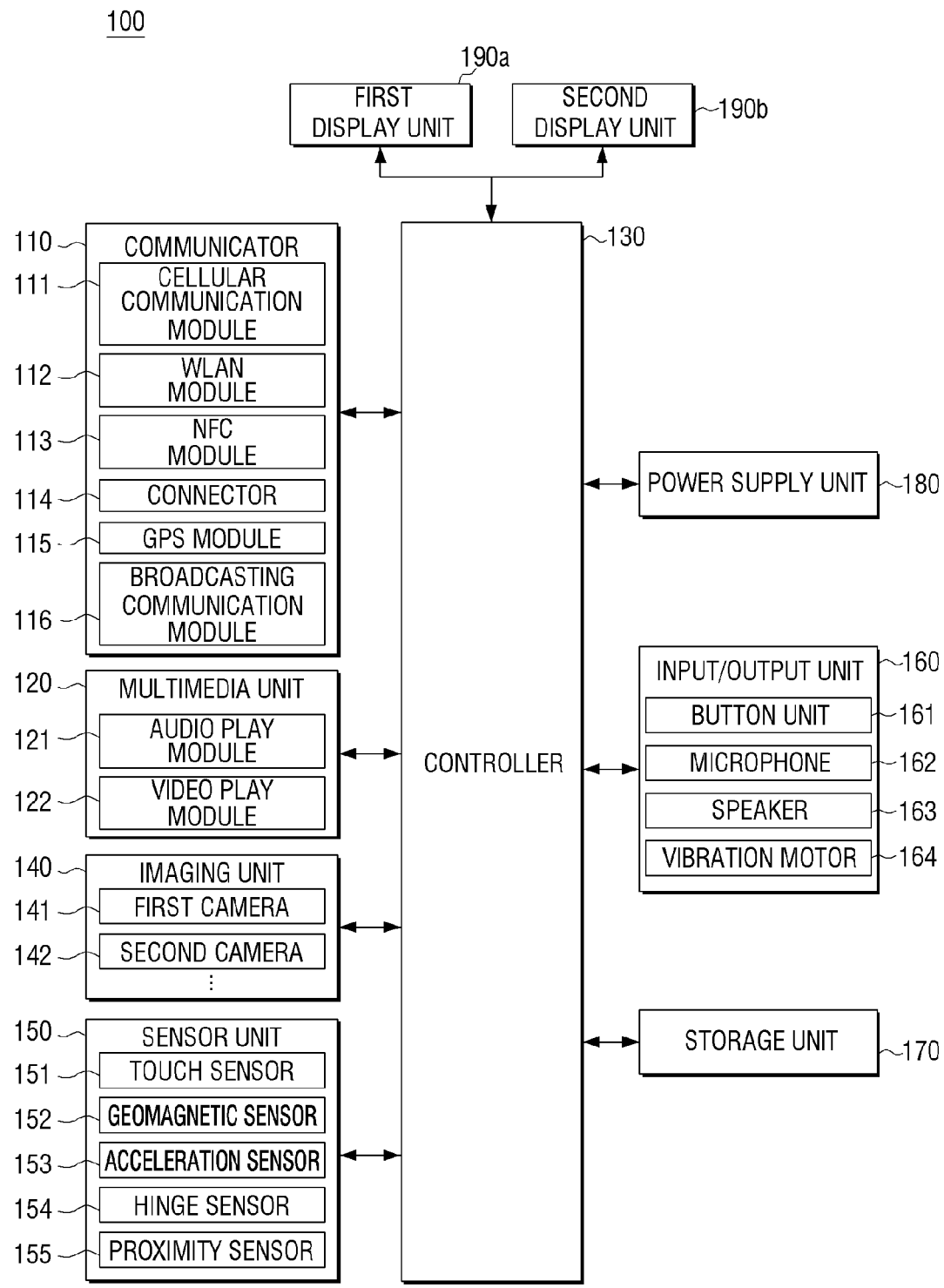
FIG. 42 is a block diagram illustrating a detailed structure of a multi display device according to an exemplary embodiment of the present general inventive concept.

FIG. 42 is a detailed block diagram illustrating a multi display device 100 according to an exemplary embodiment of the present general inventive concept.

The multi display device 100 may be connected to an external device (not illustrated) by using a communicator having at least one of a cellular communication module 111, a wireless local area network (WLAN) module 112, a near field communication (NFC) module 113, a connector 114. The external device may include at least one of another device, a portable phone, a smart phone, a tablet personal computer (PC), a computer server, and a digital TV.

Referring to FIG. 42, the multi display device 100 includes first and second display units 190a and 190b. Although FIG. 42 illustrates two display units, the present general inventive concept is not limited thereto. The multi display device 100 may have three or more display units.

The multi display device 100 according to the present general inventive concept includes the communicator 110, a multimedia unit 120, a controller 130, an imaging unit 140, a sensor unit 150, an input/output unit 160, a storage unit 170, a power supply unit 180, and first and second display units 190a and 190b.

The communicator 110 may be an interface to communicate with the external device and may include the cellular communication module 111, the WLAN module 112, the NFC module 113, the connector 114, a global positioning system (GPS) module 115, and a broadcasting communication module 116.

The cellular communication module 111 is controlled by the controller 130 to connect the multi display device 100 to the external device (in particular, a base station of a cellular system) through at least one antenna or a plurality of antennas (not illustrated) by using a wireless access technology complying with a cellular communication protocol.

The cellular communication module 111 transmits and/or receives a wireless signal including a voice call, a video call, a short messaging service (SMS) message, or a multimedia messaging service (MMS) message with another communicable device such as a portable phone, a smart phone, a tablet PC, or another type of device having a phone number input into the multi display device 100

The communicator 110 may include at least one of the WLAN module 112 and the NFC module 113. For example, the communicator 110 may include only the WLAN module 112, only the NFC module 113, or both of the WLAN module 112 and the NFC module 113.

The WLAN module 112 is controlled by the controller 130 to be connected to the Internet in a place in which a wireless access point (AP) is installed. The WLAN module 112 supports WLAN standard IEEE 802.11x of Institute of Electrical and Electronics Engineers (IEEE).

The NFC module 113 is controlled by the controller 130 to wirelessly perform an NFC between the multi display device 100 and the external device. An NFC method may include a Bluetooth communication, an infrared data association (IrDA) communication, etc.

The connector 114 provides interfaces, such as USB 2.0, USB 3.0, HDMI, IEEE 1394, etc., with various types of devices such The connector 114 may be used as an interface which is to connect the multi display device 100 to the external device or a power source. Under control of the controller 130, the connector 114 transmits data stored in the storage unit 170 of the multi display device 100 to the external device through a cable connected to the connector 114 or receives data from the external device. Power may be input from a power source (not illustrated) through the cable connected to the connector 114 or a battery (not illustrated) may be charged through the cable The GPS module 115 receives electromagnetic waves from a plurality of GPS satellites (not illustrated) and calculates a position of the multi display device 100 by using times of arrivals from the GPS satellites to the multi display device 100 and GPS parameters.

Under control of the controller 130, the broadcasting communication module 116 receives a broadcast signal (for example, a TV broadcast signal, a radio broadcast signal, or a data broadcast signal) and additional broadcast information (for example, an electric program guide (EPS) or an electric service guide (ESG)) from a broadcasting station through a broadcasting communication antenna (not shown).

The multimedia unit 120 includes an audio play module 121 and a video play module 122.

The audio play module 121 plays a digital audio file (for example, a file having file extension "mp3", "wma", "ogg", or "wav") stored or received under control of the controller 130. The video play module 122 supports various types of codecs to play the digital video file. In other words, the video play module 122 plays the digital video file by a stored codec according to a codec form of a video file to be played. The audio play module 121 or the video play module 122 of the multimedia unit 120 may be included in the controller 130.

The controller 130 includes a central processing unit (CPU), a read only memory (ROM) that stores a control program to control the multi display device 100, and a random access memory (RAM) that stores a signal or data input from an outside of the multi display device 100 or is used as a memory space for a job executed in the multi display device 100. The CPU may include at least one of a single core processor, a dual core processor, a triple core processor, and a quad core processor. The CPU, the ROM, and the RAM are connected to one another through an internal bus.

The controller 130 controls the communicator 110, the multimedia unit 120, the imaging unit 140, the sensor unit 150, the input/output unit 160, the storage unit 170, the power supply unit 180, and the first and second display units 190a and 190b.

The imaging unit 140 includes at least one of first and second imaging units 141 and 142. Although FIG. 42 illustrates the first and second imaging units 141 and 142, the present general inventive concept is not limited thereto. It is possible that the imaging unit 140 may further include an additional imaging unit according to an exemplary embodiment.

The imaging unit 140 may include at least one of the first and second imaging units 141 and 142 to photograph still images or moving pictures under control of the controller 130. The imaging unit 140 may further include several imaging units. The first and second imaging units 141 and 142 may be included in a body of the multi display device 100 or may be connected to the multi display device 100 by using an additional connector. At least one of the first and second imaging units 141 and 142 may include an auxiliary light source (for example, a flash (not illustrated)) that provides an amount of light necessary for photographing.

The imaging unit 140 includes a lens and an image sensor. Types of lenses usable in the imaging unit 140 may include a general-purpose lens, a wide angle lens, a zoom lens, etc. The first and second imaging units 141 and 142 are generally imaging units including the same lens or may are imaging units including different lenses.

The image sensor may be a complementary metal oxide semiconductor (CMOS) sensor or a charge-coupled device (CCD) sensor. In general, the first and second imaging units 141 and 142 may be formed of one type of image sensor but may formed of a combination of different types of image sensors. For example, the first and second imaging units 141 and 142 may use CMOS sensors or CCD sensors or the first imaging unit 141 may use the CMOS sensor, and the second imaging unit 140b may use the CCD sensor.

The imaging unit 140 transmits an image photographed through at least one of the first and second imaging units 141 and 142 to the controller 130. The controller 130 analyzes the image to detect a motion or a shape of a user and perform the detected motion or a control operation corresponding to the detected motion. For example, the motion of the user refers to a motion of a hand of the user detected through the first or second imaging unit 141 or 142. The shape of the user may refer to a face shape of the user detected through the first or second imaging unit 141 or 142.

According to another exemplary embodiment, the multi display device 100 may detect a motion (movement or gesture) of the user by using another means such as an infrared sensor and execute or control an application in response to the motion.

The sensor unit 150 includes a touch sensor 151, a geomagnetic sensor 152, an acceleration sensor 153, a hinge sensor 154, and a proximity sensor 155.

The touch sensor 151 senses a touch of the user on a display unit. The touch sensor 151 may be classified into an electrostatic type and a piezoelectric type according to methods of sensing the touch of the user. The touch sensor 151 according to an exemplary embodiment may be realized according to two types of methods. The touch sensor 151 and a display panel may be formed as the display unit. A detailed description thereof will be described later with reference to additional drawings.

The touch sensor 151 generates a signal through display units 190a and 190b using a body such as a user figure or a detectable input means to input a command displayed on a display screen. The touch sensor 151 uses a capacity change, a resistance changes, or a light amount change.

The geomagnetic sensor 152 detects a geomagnetism to detect an azimuth. Therefore, the geomagnetic sensor 152 recognizes a direction of the multi display device 100. The acceleration sensor 153 processes an output signal to measure a dynamic force, such as an acceleration and vibrations of an object, a shock applied to the object, or the like, and senses a change of a moving speed or an intensity of a force. The hinge sensor 154 detects an angle, a movement, or the like of a hinge. The proximity sensor 155 detects whether the object approaches the multi display device 100 of the user.

Although not illustrated in FIG. 42, the sensor unit 150 of the multi display device 100 may further include at least one of a gravity sensor, a gyro sensor, an orientation sensor, an illuminance sensor, an altitude measurement sensor, a red/green/blue (RGB) sensor, a distance measurement sensor, and a hall sensor. The gravity sensor detects in which direction gravity works, and the gyro sensor applies rotations to an existing acceleration sensor to recognize a total of 6 axes. The orientation sensor automatically senses horizontal and vertical frames of a content, such as an image, to automatically rotate and arrange the content. The illuminance sensor detects an amount of light around the multi display device 100, the altitude measurement sensor measures pressure of air, and the RGB sensor detects a color of the object. The distance measurement sensor measures a distance by using ultrasonic waves or infrared rays, and the hall sensor uses changes of a voltage according to an intensity of a magnetic field.

Each sensor of the sensor unit 150 may detect a status, generate a signal corresponding to the detected state, and transmit the signal to the controller 130. The sensors of the sensor unit 150 may be added or deleted according to a performance of the multi display device 100.

The input/output unit 160 includes a button unit 161, a microphone 162, a speaker 163, and a vibration motor 164.

At least one button unit 161 may be formed as a push type or a touch type on a front side, a side, or back side of the body of the multi display device 100 and may include at least one of a power/locking button, a volume adjustment button, a menu button, a home button, a back button, and a search button.

The microphone 162 receives a voice or a sound to generate an electrical signal under control of the controller 130.

The speaker 163 outputs sounds corresponding to various types of signals (for example, a wireless signal, a broadcast signal, a digital audio file, a digital video file, photo photographing, etc.) of the cellular communication module 111, the WLAN module 112, the NFC module 113, the multimedia unit 120, or the imaging unit 140 to the outside of the multi display device 100.

The speaker 163 outputs a sound (for example, a button control sound corresponding to a telephone call or a ring back tone) corresponding to a function performed by the multi display device 100. One speaker 163 or a plurality of speakers 163 may be formed appropriate position or positions of the multi display device 100. For example, the speaker 163 includes an internal speaker module that is arranged in a position appropriate to approach ears of the user and an external speaker module that has a high output appropriate to be used when playing an audio/video file or viewing a broadcast and is arranged in an appropriate position of the body of the multi display device 100.

The vibration motor 164 converts the electric signal into a mechanical vibration under control of the controller 130.

For example, if the multi display device 100 that is in a vibration mode receives a voice call from another device (not illustrated), the vibration motor 164 operates. One vibration motor 164 or a plurality of vibration motors 164 may be formed in the body of the multi display device 100. The vibration motor 164 operates in response to a touch gesture sensed on the first and second display units 190a and 190b and continuous movements of a touch sensed on the first and second display units 190a and 190b The storage unit 170 stores various types of multimedia data and content data processed by the controller 130, data received from an external source, etc.

In detail, under control of the controller 130, the storage unit 170 stores input/output signals, information, or data corresponding to operations of the cellular communication module 111, the WLAN module 112, the NFC module 113, the connector 114, the GPS module 115, the multimedia unit 120, the imaging unit 140, the sensor unit 150, the input/output unit 160, and the first and second display units 190a and 190b.

The storage unit 170 stores a control program and applications to control the multi display device 100 or the controller 130. Hereinafter, the term "storage unit" may include a ROM, a RAM, or a memory card (for example, a secure digital (SD) card, a memory stick, or the like) that is attached to and/or detached from the multi display device 100. The storage unit may also include a nonvolatile memory, a volatile memory, a hard disk drive (HDD), or a solid state drive (SSD).

The power supply unit 180 supplies power used in the multi display device 100. The power supply unit 180 may be realized as a rechargeable battery and may further include a voltage converter that converts power supplied from an external source to supply the power to the rechargeable battery.

The power supply unit 180 may supply the power to the multi display device 100 in various types of modes such as a maximum performance mode, a general mode, a sleep mode, a standby mode, etc. under power management control of the controller 130.

The first and second display units 190a and 190b are connected to each other through a hinge unit (not illustrated). The first and second display units 190a and 190b displays multimedia contents, images, moving pictures, texts, etc. under control of the controller 130.

The first and second display units 190a and 190b may have independent housings physically separated from each other. Display screens displayed on the first and second display units 190a and 190b may be independently controlled. For example, a resolution of the first display unit 190a and a resolution of the second display unit 190b may be separately set. Also, expansions, rotations, movements, divisions, etc. of screens displayed on the first and second display units 190a and 190b may be separately executed.

The first and second display units 190a and 190b may be displayed as a single display screen by using a virtual integrated frame buffer.

The first and second display units 190a and 190b may be realized as various types of display units such as an LCD panel, a PDP, an OLED, a VFD, an FED, an ELD, etc.

The first and second display units 190a and 190b may be realized as general display panels having no touch inputs or touch display panels that recognize user controls by using a proximity sensor or a touch sensor. If the first and second display units 190a and 190b are realized as the touch display panels, the first and second display units 190a and 190b may receive at least one touch gesture through the body of the user (for example, fingers including a thumb) or a sensible input means (for example, a stylus pen).

Such a user interface may include a predetermined touch area, a soft key, and a soft menu. The first and second display units 190a and 190b may transmit an electronic signal corresponding to at least one touch gesture input through the user interface to the controller 130 via an LCD controller (not shown). The first and second display units 190a and 190b may sense continuous movements of touches and transmit an electrical signal corresponding to continuous or discontinuous movement of the touches to the LCD controller.

For example, the first and second display units 190a and 190b may be realized according to a resistive method, a capacitive method, an infrared method, or an acoustic wave method.

The first and second display units 190a and 190b convert a sensing signal of a motion of the user sensed through the touch sensor into a digital signal (for example, X and Y coordinates) and transmit the digital signal to the controller 130. The controller 130 performs a control operation corresponding to a motion of the user input through the first and second display units 190a and 190b by using the received digital signal. For example, the controller 130 may respond to the motion of the user to select a soft key displayed on the first and second display units 190a and 190b or execute an application corresponding to the soft key.

The above-described gesture is not limited to a direct contact between the first and second display units 190a and 19b and the body of the user or a touchable input means but may include a non-contact method. Sensitivity of the motion of the user detectable by the first and second display units 190a and 190b may be changed according to a performance or a structure of the multi display device 100.

According to an exemplary embodiment of the present general inventive concept, a touch gesture may include all kinds of user gestures that directly contact or approach a touch screen to allow the multi display device 100 to sense the direct contact or sensing. For example, the touch gesture is a gesture of the user that selects one position or a plurality of continuous positions on the touch screen by using fingers (thumbs and index fingers) of left and right hands of the user or an object (for example, a stylus pen) sensible through the touch screen. The touch gesture will now be described in detail with reference to Table 1 below.

TABLE 1

| Type | | Mark |
|---|---|---|
| Single Finger Gesture | Tap | |
| | Touch & Hold | ● |
| | Double Tap | |
| | Drag | |
| | Drag & Drop | |
| | Flick | |

Table 1 shows gesture types using one finger.

Referring to Table 1, the gesture types using one finger include a tap, touch & hold, a double tap, a drag, drag & drop, and a flick. The tap refers to a gesture of the user that slightly presses and takes off the touch screen, the touch & hold refers to a long-time touch of the user, and the double tap refers to a gesture of the user that quickly performs tapping two times. The drag refers to a gesture to perform dragging in one direction, the drag & drop refers to a gesture to press an arbitrary object on the touch screen to drag the object from one position onto another position, and the flick refers to a gesture to perform fast dragging.

TABLE 2

| | Type | Mark |
|---|---|---|
| Two Finger Gesture | Two Finger Tap | |
| | Touch & Spread | |
| | Pinch Out | |
| | Pinch In | |
| | Two Finger Drag | |
| | Cross Two Finger | |
| | Touch & Rotate | |

Table 2 shows gesture types using two fingers.

Referring to Table 2, gesture types using two fingers include a two finger tap, a touch & spread, a pinch-out, a pinch-in, a two finger drag, a cross two finger, a touch & rotate, etc. The two finger tap is a gesture to simultaneously perform tapping through two fingers, and the touch & spread is a gesture to simultaneously press the touch screen through two fingers and linearly moving one finger without moving the other finger. The pinch-out is a gesture to press the touch screen through two fingers and then to perform dragging in different directions, and the pinch-in is a gesture to simultaneously press the touch screen through two fingers and then to perform dragging in a facing direction. The two finger drag is a gesture to perform dragging in the same direction through two fingers, and the cross two finger is a gesture to simultaneously perform dragging in facing directions and then to pass two fingers in contrary directions. The touch & rotate is a touch gesture to rotate one finger based on the other finger without moving the other finger.

TABLE 3

| | Type | Mark |
|---|---|---|
| Multi Finger Gesture | Three Finger Touch | |
| | Four Finger Touch | |
| | Five Finger Touch | |
| Palm | Palm | |

Table 3 shows gesture types using two or more fingers and a palm.

Referring to Table 3, gesture types using two or more fingers include a three finger touch, a four finger touch, a five finger touch, etc. Also, as shown in Tables 1 and 2 described above, gestures, such as a tap, a drag, a rotate, etc., may be performed by using two or more fingers.

If the above-described various touch gestures are recognized, the controller 130 performs operations corresponding to the touch gestures. For example, the controller 130 may execute an application, a widget, a web browser, or the like stored in the storage unit 170 to display an execution screen on at least one of the first and second display units 190a and 190b.

Bodies of the multi display device 100 are connected to each other through a hinge unit in the above-described exemplary embodiments but may be connected to each other through a connector formed of a flexible material instead of the hinge unit.

Figure 43:
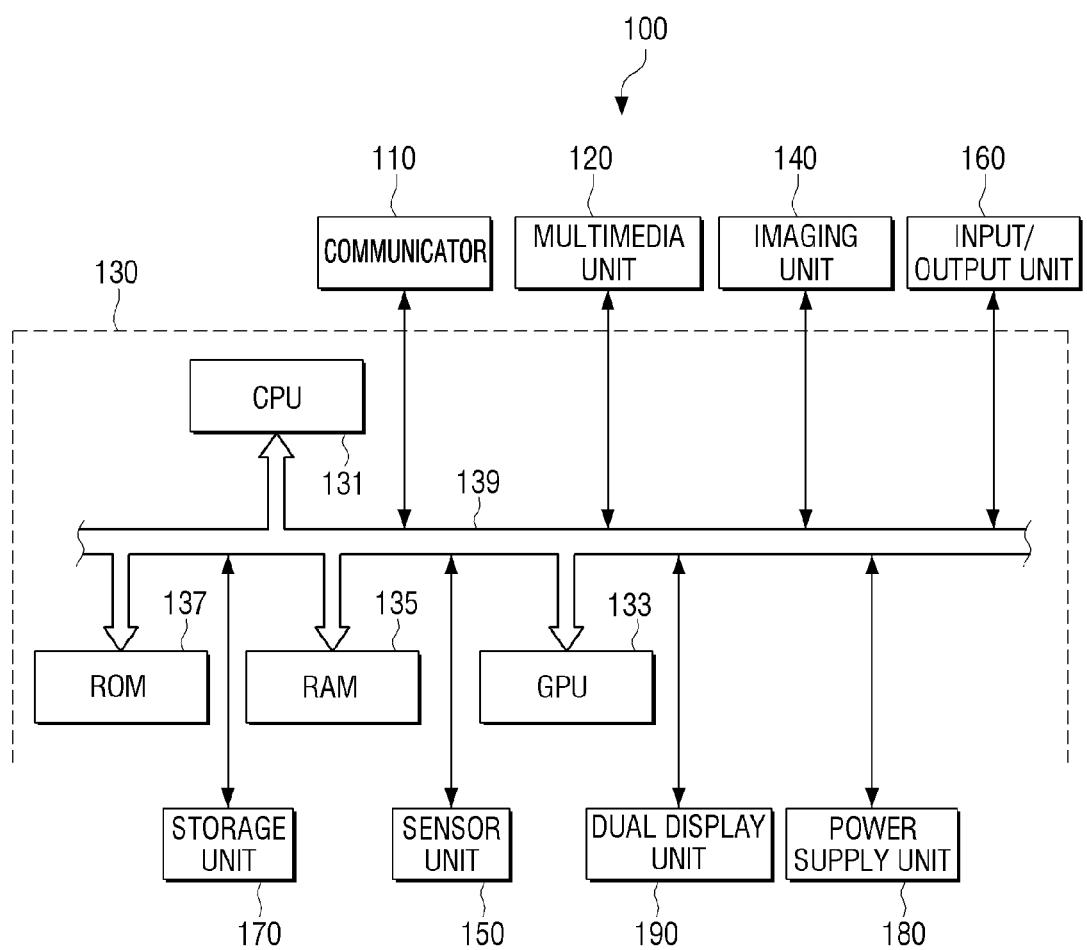
FIG. 43 is a block diagram illustrating a detailed structure of a multi display device according to another exemplary embodiment of the present general inventive concept.

FIG. 43 is a block diagram illustrating a multi display device 100 according to an exemplary embodiment of the present general inventive concept.

Referring to FIG. 43, the multi display device 100 includes a communicator 110, a multimedia unit 120, a controller 130, an imaging unit 140, a sensor unit 150, an input/output unit 160, a storage unit 170, a power supply unit 180, and a multi display unit (or dual display unit) 190. Descriptions of the same elements of FIG. 43 as those of FIG. 42 will be omitted, and only a display process will be described A central processing unit (CPU) 131 reads data stored in the storage unit 170 into an RAM 135 to transmit data necessary for graphic processing among data stored in the RAM 135 to a graphic processing unit (GPU) 133. The CPU 131 receives data graphically processed by the GPU 133 and transmits the data to an LCD controller (not illustrated) connected to a system bus 139 to display an image on the display unit 190.

The CPU 131 temporarily stores image data processed by the GPU 133 in a virtual frame buffer allocated to a predetermined area of the RAM 135. The CPU 131 allocates an area of the virtual frame buffer to support a maximum resolution (for example, 1024×600) of the display unit 190.

If the display unit 190 is two display units, the CPU 131 allocates an area of the virtual frame buffer in a size of 1024×1200

The CPU 131 inputs the data temporarily stored in the virtual frame buffer into the GPU 133 to perform digital signal processing with respect to the data.

The GPU 133 performs graphic processing with respect to the data input under control of the CPU 131. In detail, the GPU 133 generates a screen including various types of objects, such as an icon, an image, a text, etc., by using an operator unit (not illustrated) and a renderer (not illustrated). The operator unit calculates attribute values such as coordinate values at which the objects are respectively displayed according to a layout of the screen, shapes, sizes, and colors of the objects, etc. The renderer generates a screen having various types of layouts including the objects based on the calculated attribute values. The screen generated by the renderer may be transmitted to the first and second display units 190a and 190b through the system bus 139 to be displayed in a display area or to be stored in the storage unit 170

The CPU 131 displays the data graphically processed by the GPU 133 through at least one of the first and second display units 190a and 190b, controls to store the data in the storage unit 170, or inputs the data into a display controller (not shown).

The GPU 133 may include a decoder, a renderer, a scaler, etc. Therefore, the GPU 133 decodes a stored content, renders the decoded content data to form a frame, and scales a size of the frame to a display size under control of the display controller. If the screen is displayed on one of the first and second display units 190a and 190b, the GPU 133 scales the content to a size of the screen. If the screen is displayed on both of the first and second display units 190a and 190b, the GPU 133 scales the content to a full display size. The GPU 133 provides the processed frame to the display unit to display the processed frame.

The multi display device 100 includes a plurality of display units and thus provides various types of screens by using the plurality of display units. A basic detailed structure and operations of a multi display device according to various exemplary embodiment of the present general inventive concept will now be described.

Figure 44:
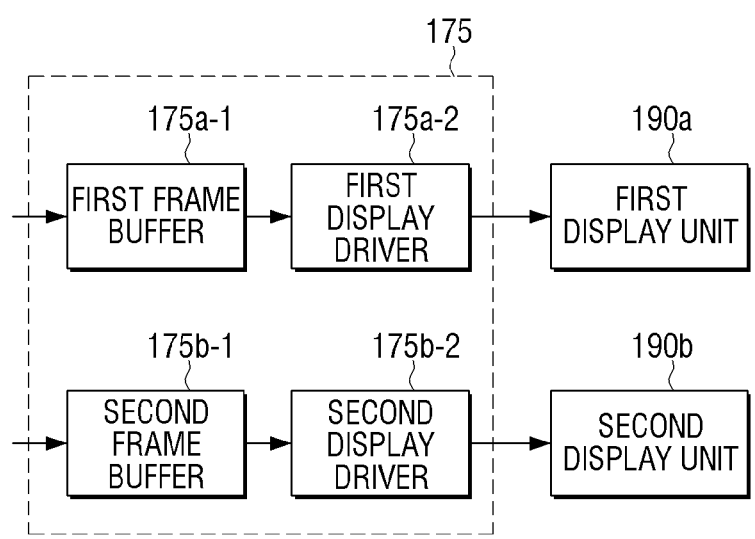
FIG. 44 is a block diagram illustrating a structure of a multi display device that controls operations of display units by using a plurality of frame buffers according to an exemplary embodiment of the present general inventive concept.

FIG. 44 is a block diagram illustrating a multi display device to control operations of display units by using a plurality of frame buffers according to an exemplary embodiment of the present general inventive concept.

Referring to FIG. 44, the multi display device includes first and second display units 190a and 190b and a display controller 175. The display controller 175 may be an element provided separately from the controller 130 of FIG. 32 or may be an element included in the controller 130.

Referring to FIG. 44, the display controller 175 includes first and second display drivers 175a-1 and 175a-2 and first and second display drivers 175a-2 and 175b-2.

The first frame butter 175a-1 buffers an image frame which is to be displayed on the first display unit 190a, and the second frame buffer 175b-1 buffers an image frame which is to be displayed on the second display unit 190b.

An image frame that is processed as a digital signal by the GPU 133 is stored as a bitmap format in the first and second frame buffers 175a-1 and 175b-1. In this case, buffering areas of the first and second frame buffers 175a-1 and 175b-1 are allocated according to a maximum pixel size supportable by the first and second display units 190a and 190b. The first display driver 175a-2 analyzes the image frame stored in the first frame buffer 175a-1 to convert the image frame into a first image source signal. The first display driver 175a-2 provides the first image source signal to the first display unit 190a to drive the first display unit 190a so that the first display unit 190a displays the image frame.

Similarly, the second display driver 175b-2 analyzes the image frame stored in the second frame buffer 175b-1 to convert the image frame into a second image source signal and provides the second image source signal to the second display unit 190b to display the image frame.

Figure 45:
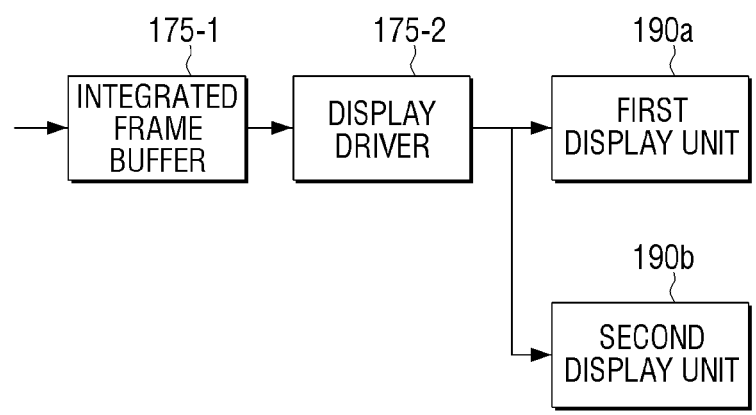
FIG. 45 is a block diagram illustrating a structure of a multi display device that controls operations of display units by using an integrated frame buffer according to an exemplary embodiment of the present general inventive concept.

The first and second frame buffers 175a-1 and 175b-1 respectively corresponding to the first and second display units 190a and 190b are separately provided in FIG. 44 but may be used as one integrated frame buffer according to another exemplary embodiment of FIG. 45.

FIG. 45 is a block diagram illustrating a multi display device to control operations of display units by using an integrated frame buffer according to an exemplary embodiment of the present general inventive concept.

If a frame buffer is realized as an integrated frame buffer 175-1, a size thereof greater than maximum resolutions of first and second display units 190a and 190b may be allocated to the integrated frame buffer 175-1

For example, if the first and second display units 190a and 190b display resolutions of 1024*800, the integrated frame buffer 175-1 allocates a storage area having a frame buffer size for displaying a resolution of 1024*1600. A first area of the integrated frame buffer 175-1 includes a first image frame displayed on the first display unit 190a, and a second area of the integrated frame buffer 175-1 stores a second image frame displayed on the second display unit 190b.

A display driver 175-2 provides the first and second image frames to the first and/or second display units 190a and/or 190b by using addresses of the first and second image frames stored in the integrated frame buffer 175-1.

Figure 46:
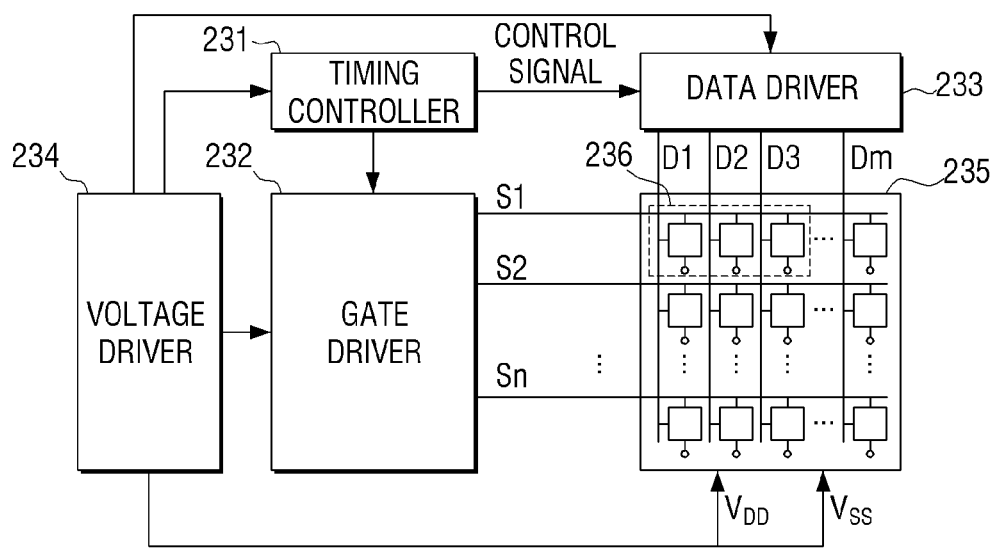
FIG. 46 is a view illustrating a detailed structure of a first display unit of two display units illustrated in FIG. 44.

FIG. 46 is a detailed view illustrating the first display unit 190a of FIG. 44.

FIG. 46 illustrates a display unit having the first and second display units 190a and 190b according to an exemplary embodiment of the present general inventive concept. For convenience of description, only the first display unit 190a is illustrated in FIG. 46, the second display unit 190b may also be realized as the same type as the first display unit 190a.

Referring to FIG. 46, the first display unit 190a includes a timing controller 231, a gate driver 232, a data driver 233, a voltage driver 234, and a display panel 235.

The timing controller 231 receives a clock signal DCLK, a horizontal sync signal Hsync, a vertical sync signal Vsync, etc., appropriate for a resolution of a touch screen from an external source to generate and output a gate signal (a scan control signal) and a data control signal (a data signal) to the gate driver 232 and the data driver 233, respectively, and re-arranges received R, G, and B data to provide the re-arranged R, G, and B data to the data driver 233.

Timing controller 231 generates a gate shift clock (GSC), a gate output enable (GOE), a gate start pulse (GSP), etc., in relation to the gate control signal. Here, the GSC is a signal that determines a time when a thin film transistor (TFT) connected to light-emitting devices such as R, G, and B OLEDs is turned and/or off. The GOE is a signal that controls an output of the gate driver 232, and the GSP is a signal that indicates a first driving line of one vertical sync signal.

The timing controller 231 generates a source sampling clock (SSC), a source output enable (SOE), a source start pulse (SSP), etc., in relation to the data control signal. Here, the SSC is used as a sampling clock for latching data in the data driver 233 and determines a driving frequency of a data drive integrated circuit (IC). The SOE is used to transmit data latched through the SSC to the display panel 235. The SSP is a signal that indicates a start of latching or sampling of data for one horizontal sync period.

The gate driver 232 is an element that generates a scan signal and is connected to the display panel 235 through scan lines S1, S2, S3, . . . , and Sn. The gate driver 232 applies a gate on/off voltage (Vgh/Vgl) provided from the voltage driver 234 to the display panel 235 according to the gate control signal generated by the timing controller 231. The gate on voltage Vgh is sequentially provided to the display panel 235 from a first gate line GL1 to an Nth gate line GLn to realize a unit frame image.

The data driver 233 is an element that generates a data signal and is connected to the display panel 235 through data lines D1, D2, D3, . . . , and Dm. The data driver 233 inputs R, G, and B data of an image frame, which is completely scaled according to the control signal generated by the timing controller 231, into the display panel 235. The data driver 233 converts R, G, and B image data serially provided from the timing controller 231 into parallel R, G, and B image data and converts digital data into an analog voltage to provide image data corresponding to one horizontal line. This process is sequentially performed according to horizontal lines.

The voltage driver 234 generates driving voltages and respectively transmits the driving voltages to the gate driver 232, the data driver 233, the display panel 235, etc. In other words, the voltage driver 234 receives commercial power, i.e., an alternating current (AC) voltage of 110V or 220V, from an external source to generate and provide a power supply voltage VDD necessary for the display panel 235 or provide a ground voltage VSS. Also, the voltage driver 234 generates a gate on voltage Vgh and provides the gate on voltage Vgh to the gate driver 232. For this purpose, the voltage driver 234 may include a plurality of voltage driving modules (not illustrated) that separately operate. Here, the plurality of voltage driving modules operate to provide different driving voltages under control of the controller 130. The controller 130 controls the voltage driver 230 to provide the different driving voltages through the plurality of voltage driving modules according to preset information. For example, the plurality of voltage driving modules respectively provide different first voltages and second voltages set to defaults according to preset information under control of the controller 130.

According to an exemplary embodiment, the voltage driver 234 may include a plurality of voltage driving modules respectively corresponding to a plurality of areas of the display panel 235. In this case, the controller 130 controls the plurality of voltage driving modules to provide the different first voltages, i.e., a voltage ELVDD, according to screen information (or input image information) of the plurality of areas. In other words, the controller 130 controls a size of the voltage ELVDD by using an image signal input into the data driver 233. Here, the screen information may be at least one of luminance and gradation information of an input image.

The display panel 235 includes a plurality of gate lines GL1 through GLn and a plurality of data lines DL1 through DLm that intersect with one other to define a pixel area 236. R, G, and B light-emitting devices such as OLEDs may be formed in the pixel area 236. A switching device, i.e., a TFT, is formed in an area of the pixel area 235, further precisely, at a corner. When the TFT is turned on, a gradation voltage is provided from the data driver 233 to the R, G, and B light-emitting devices. Here, the R, G, and B light-emitting devices provide light corresponding to an amount of a provided current based on the gradation voltage. In other words, if a large amount of current is provided, the R, G, and B light-emitting devices provides light of an amount corresponding to the large amount of current.

Figure 47:
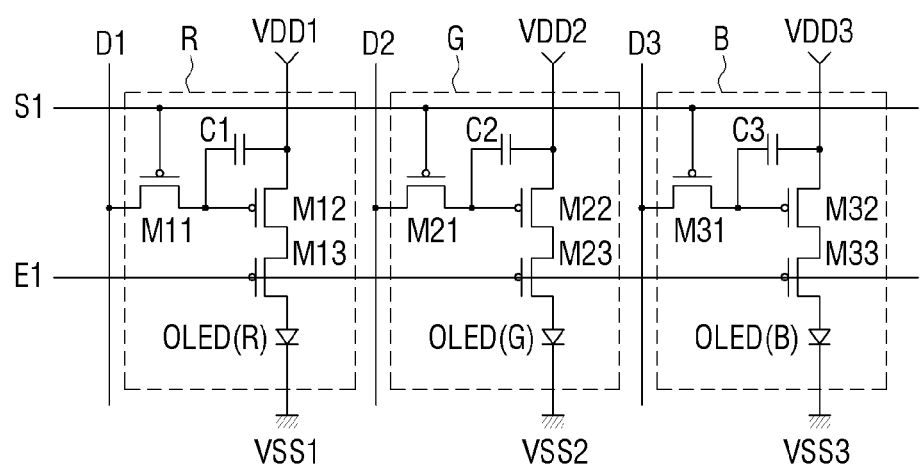
FIG. 47 is a view illustrating a circuit structure constituting R, G, and B pixels constituting a display panel illustrated in FIG. 46.

FIG. 47 is a view illustrating a circuit configuration of a pixel area 236 having R, G, and B pixels of the display panel 235 of FIG. 46.

Referring to FIG. 47, the display panel 235 includes a plurality of pixel areas 236 each having three R, G, and B pixels. The R, G, and B pixel areas include switching elements M11, M21, and M31 that operate according to a scan signal S1 and a gate on voltage Vgh, switching elements M12, M22, and M32 that output currents based on pixel values including changed high gradation value provided to data lines DL1 through DLm, and switching elements M13, M23, and M33 that adjust amounts of currents provided from the switching elements M12, M22, and M23 to the R, G, and B light-emitting devices. The switching elements M13, M23, and M33 respectively connected to the OLEDs to supply currents to the OLEDs. Here, the OLEDs refer to displays that self-emit light by using a principle of electroluminescence if a current flows in fluorescent or phosphorescence organic thin films. Anodes of the OLEDs are connected to pixel circuits, and cathodes of the OLEDs are connected to ELVSS. The OLED described above generate light having predetermined luminance in response to currents supplied from the pixel circuits. Here, gate electrodes of the switching elements M11, M21, and M31 are connected to the scan line S1, and source electrodes or drain electrodes of the switching elements M11, M21, and M31 are connected to a data line D1. As described above, the display panel 235 may be realized as an active matrix OLED (AM-OLED) panel. However, the above-described exemplary embodiment is only an exemplary embodiment and thus the present general inventive concept does not exclude a passive matrix OLEDs (PM-OLED) in which one line simultaneously emits light.

OLEDs are described in the exemplary embodiment of FIG. 47, but a display unit may be realized as various types of display technologies such as an LCD panel, a PDP, a VFD, an FED, an LED, etc.

Figure 48:
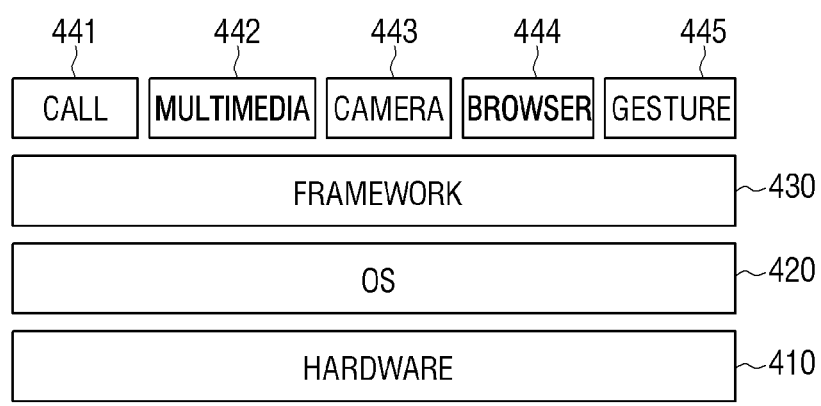
FIG. 48 is a view illustrating a system hierarchy structure of a multi display device according to an exemplary embodiment of the present general inventive concept.

FIG. 48 is a view illustrating a system hierarchical structure of a multi display device according to an exemplary embodiment of the present general inventive concept. The multi display device includes hardware 410 and various types of software (programs) such as an operating system (OS) 420, a framework 430, a call application 441, a multimedia application 442, a camera application 443, a browser 444, a gesture recognition application 445, etc.

The hardware 410 may include various elements as illustrated in FIG. 42.

The OS 420 controls an overall operation of the hardware 410 and manages the hardware 410. In other words, the OS 420 is a hierarchy that takes charges of basic functions such as a hardware management, a memory, security, etc. The OS 420 drives modules, such as a display driver, a communication driver, a camera driver, an audio driver, a power manager, etc., to control an operation of a corresponding device, such as the display device. Here, the display driver drives a multi display unit, the communication driver transmits and receives data, the camera driver drives an imaging unit, and the audio driver drives an audio unit The framework 430 is a hierarchy higher than the OS 420. The framework 430 connects an application hierarchy 440 to the OS 420. In other words, the framework 430 includes a location manager, a notification manager, and a frame buffer to display an image on a display unit.

The application hierarchy 440 is a hierarchy higher than the framework 430 and realizes various functions of the multi display device. For example, the application hierarchy 440 may include various types of application programs, such as an application for the call 441, an application for the multimedia 442, an application for the camera 443, an application for the browser 444, an application for the gesture recognition 445, etc.

Figure 49:
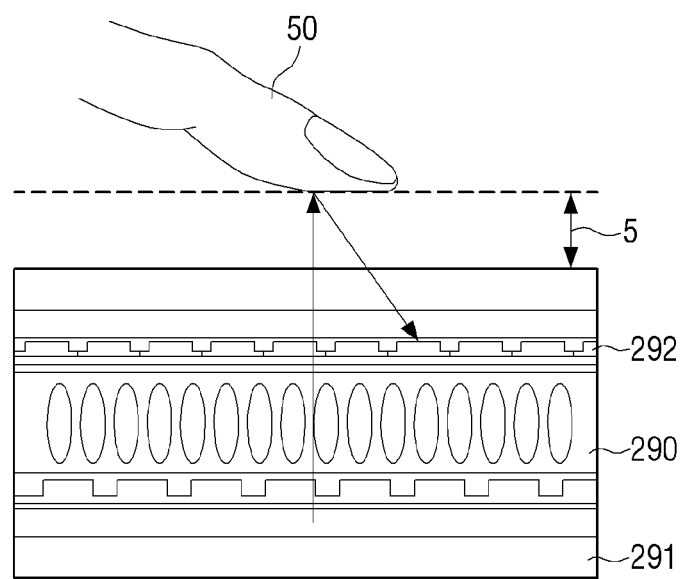
FIGS. 49 and 50 are views illustrating a method of sensing a proximity touch according to an exemplary embodiment of the present general inventive concept.

FIG. 49 is a view illustrating a method of sensing a proximity touch.

A user may input a control command into the multi display device 100 according to a proximity touch method using a proximity sensor. The proximity touch refers to a touch gesture that is recognized as a motion within a predetermined effective recognition range of a space without directly touching a touch screen.

Referring to FIG. 49, a display unit includes a display panel 290, an infrared source unit 291 to recognize the proximity touch, and an infrared sensing unit 292. The infrared source unit 291 irradiates infrared rays in a surface direction of the display unit. In detail, the infrared source unit 29a is arranged in a lower portion of the display unit that displays a picture or an image and irradiates the infrared rays in the surface direction f the display unit. A predetermined area to recognize a proximity of a user object 50 exists on a surface of the display unit. This area is an effective recognition area 5 to recognize a touch proximity.

The user object 50 refers to a means to input a command into the multi display device 100, for example, may be a part of a body such as a hand, an extension of a body part, or the like.

If the user object 50 approaches an inside of the effective recognition area 5, the infrared sensing unit 292 senses an infrared ray reflected by the proximity of the user object 50 to generate an infrared scan image. In detail, the infrared sensing unit 292 generates the infrared scan image corresponding to the infrared ray reflected by the proximity of the user object 50 by using a plurality of infrared sensing elements arranged in an array form. The multi display device 100 senses a proximity touch input by using the generated infrared scan image.

Figure 50:
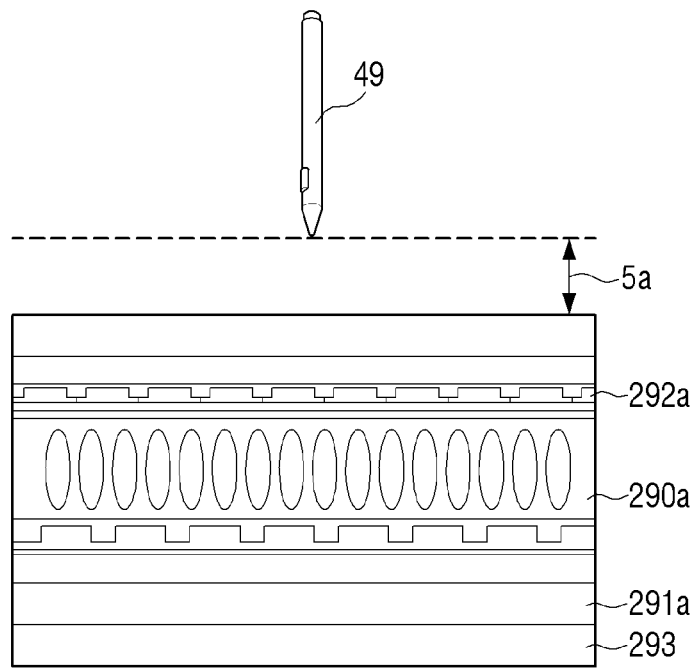

FIG. 50 is a view illustrating a method of sensing a proximity touch according to another method. A user inputs a control command into a multi display device according to a proximity touch method using a predetermined pen.

Referring to FIG. 50, a display unit includes a display panel 290a, a proximity sensor source unit 291a, and a sensing unit 292a as described with reference to FIG. 49. To allow proximate touch recognition, the pen 49 may include a coil. The display unit includes an electrostatic sensor 293. The electrostatic sensor 293 may include a plurality of coils.

If the pen 49 including the coil becomes closes within a predetermined distance 5a, a current is induced into the coils of the electrostatic sensor 293 due to an electrostatic induction phenomenon. The current is most greatly induced into the coil close to the pen 49 and is small induced into coils distance from the pen 49. Therefore, a controller recognizes a point into which the current is most greatly induced as a position of the pen 49.

The display unit illustrated in FIG. 50 includes the infrared sensing unit 292a. Therefore, if the pen 49 becomes close to the display unit within a predetermined distance, both the infrared sensing unit 292a and the electrostatic sensor 293 recognize the proximity of the pen 49. Therefore, a priority is given to a proximity recognition of the electrostatic sensor 293 to solve a problem of a dual recognition.

Figure 51:
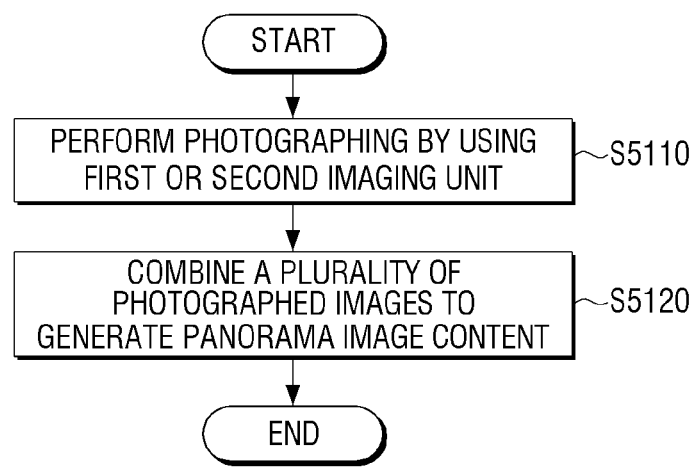
FIG. 51 is a flowchart illustrating a photographing method of a multi display device according to an exemplary embodiment of the present general inventive concept.

FIG. 51 is a flowchart illustrating a photographing method of a multi display device according to an exemplary embodiment of the present general inventive concept.

Referring to FIG. 51, in operation S5110, the multi display device performs photographing by using a first imaging unit provided in a first body or a second imaging unit provided in a second body. Images photographed by the first and second imaging units may be displayed on first and/or second display units. In operation S5120, the multi display device combines a plurality of images that have been photographed to generate a panorama image content. When the first or second body pivots based on a hinge unit, the photographing may be performed by the first or second imaging unit. Alternatively, a first live view generated by the first imaging unit may be displayed through the first display unit, and a second live view generated by the second imaging unit may be displayed through the second display unit. If a size of an overlapping area between the first and second live views meets a preset condition, the first and second imaging units may be respectively controlled to perform photographing. A detailed photographing method and a detailed generating method for generating the panorama image content are as described above and thus will be omitted herein.

Figure 52:
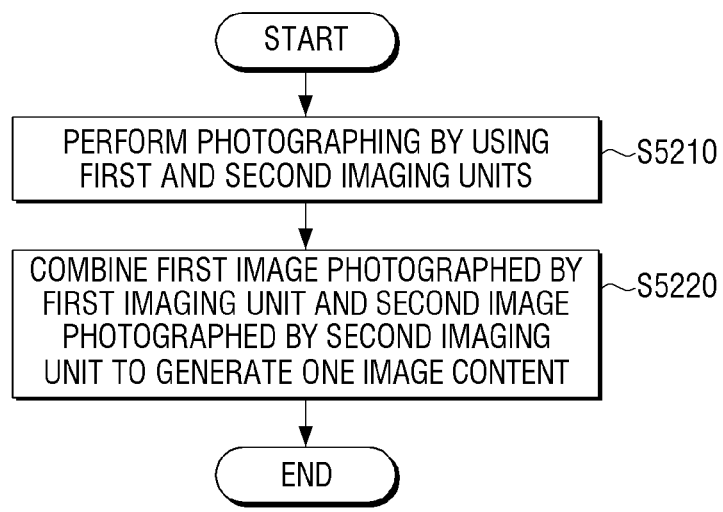
FIG. 52 is a flowchart illustrating a photographing method of a multi display device according to another exemplary embodiment of the present general inventive concept.

FIG. 52 is a flowchart illustrating a photographing method of a multi display device according to an exemplary embodiment of the present general inventive concept.

Referring to FIG. 52, in operation S5210, the multi display device performs photographing by using first and second imaging units. In operation S5220, the multi display device combines a first image photographed by the first imaging unit and a second image photographed by the second imaging unit to generate one image content. The one image content may be a panorama image content or a 3D image content. In order to generate one 3D image content, the first image is processed as a left eye image, and the second image is processed as a right eye image to combine the left and right eye images.

Figure 53:
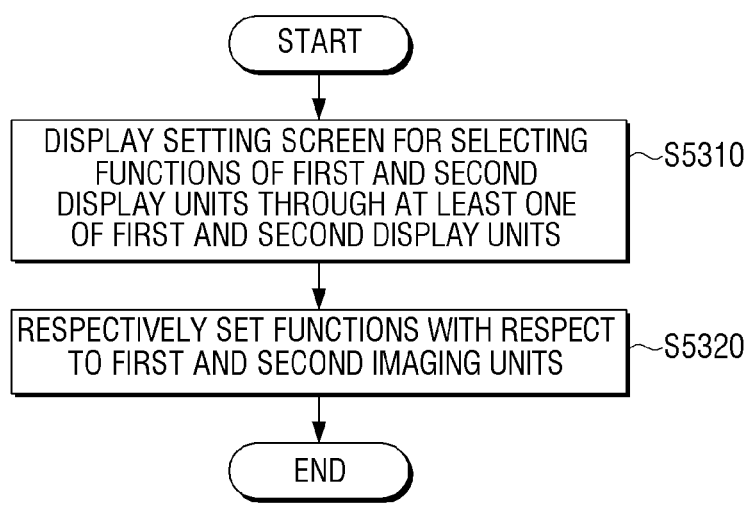
FIG. 53 is a flowchart illustrating a photographing method of a multi display device according to another exemplary embodiment of the present general inventive concept.

FIG. 53 is a flowchart illustrating a photographing method of a multi display device according to an exemplary embodiment of the present general inventive concept.

Referring to FIG. 53, in operation S5310, the multi display device displays a setting screen to select functions of first and second imaging units through at least one of first and second display units. The functions of the first and second imaging units may be various functions such as general photographing, moving picture photographing, shutter first photographing, iris first photographing, special effect photographing, continuous photographing, etc. In operation S5320, the multi display device respectively set selected functions with respect to the first and second imaging units. If the number of photographing units is 3, different functions may be set with respect to the three imaging units.

According to various exemplary embodiments of the present general inventive concept as described above, a multi display device including a plurality of display units performs photographing by using a plurality of imaging units to generate a 3D image content or a panorama image content. Also, the multi display device may perform various functions of photographing by using the plurality of imaging units. Therefore, further various functions of imaging units may be used.

Therefore, the multi display device generates various types of images by using images photographed by a plurality of cameras.

A method of controlling an operation of the multi display device and a photographing method of the multi display device according to the above-described various exemplary embodiments may be realized as a program to be provided to the multi display device.

For example, there may be provided a non-transitory computer-readable medium that stores a program to execute a method described above or hereinafter. The method may be referred to include performing photographing by using a first imaging unit provided in a first body of a multi display device or a second imaging unit provided in a second body, and combining a plurality of images photographed by the first and second imaging units to generate one image content.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi display device comprising:
   a first body having a first display unit;
   a second body having a second display unit;
   a hinge unit disposed to couple to the first and second bodies;
   a first imaging unit disposed in the first body and configured to perform photographing;
   a second imaging unit disposed in the second body and configured to perform photographing; and
   a controller configured to, in response to one of the first and second imaging units performing photographing of a plurality of images while one of the first and second bodies having the one of the first and second imaging units pivots based on the hinge unit, combine the plurality of photographed images to generate a panorama image content.

2. The multi display device of claim 1, wherein, while the first body pivots in a first direction based on the hinge unit, the controller controls the second display unit to display a live view generated by the first imaging unit and performs photographing of the plurality of images by using the first imaging unit to capture the plurality of images within a first photographing range, and combines the plurality of captured images within the first photographing range to generate the panorama image content.

3. The multi display device of claim 1, wherein:
while the first body pivots in a first direction based on the hinge unit, the controller controls the second display unit to display a live view generated by the first imaging unit and performs photographing of a first plurality of images by using the first imaging unit to capture the first plurality of images within a first photographing range;
while the second body pivots in a second direction opposite to the first direction based on the hinge unit, the controller controls the first display unit to display a live view generated by the second imaging unit and performs photographing of a second plurality of images by using the second imaging unit to capture the second plurality of images within a second photographing range; and
the controller combines the first plurality of captured images captured within the first photographing range and the second plurality of captured images captured with in the second photographing range to one another to generate the panorama image content.

4. The multi display device of claim 2, wherein, while a particular portion of a subject is recognized in the live view, the controller performs automatic photographing of the plurality of images.

5. The multi display device of claim 2, wherein, while an interval angle between the first and second bodies meets a set condition, the controller performs automatic photographing of the plurality of images.

6. The multi display device of claim 2, wherein, while the pivoting starts, the controller performs automatic photographing of the plurality of images every set time period.

7. The multi display device of claim 1, wherein the controller controls at least one of the first and second display units to display a photographing range setting screen if a panorama photographing mode starts and automatically adjusts one or more photographing angles of the first and second imaging units according to a set photographing range if the photographing range is set on the photographing range setting screen.

8. The multi display device of claim 1, wherein the controller controls at least one of the first and second display units to display a photographing range setting screen if a panorama photographing mode starts and displays a guide image on the first and second display units, wherein the guide image induces one or more photographing angles of the first and second imaging units to be adjusted according to a set photographing range if the photographing range is set on the photographing range setting screen.

9. The multi display device of claim 1, wherein the controller controls at least one of the first and second display units to display a setting screen to respectively set one or more functions of the first and second display units and separately controls display operations of the first and second display units according to the one or more functions selected on the setting screen.

10. The multi display device of claim 9, wherein if a panorama display function is set on the first display unit, and a general display function is set on the second display unit, the controller controls to display the panorama image content on the first display unit and controls to display at least one of image contents respectively photographed by the first and second imaging units on the second display unit.

11. A photographing method of a multi display device including a first body having a first display unit, a second body having a second display unit, a hinge unit disposed to couple to the first and second bodies, a first imaging unit disposed in the first body and configured to perform photographing, and a second imaging unit disposed in the second body and configured to perform photographing, the photographing method comprising:
performing photographing of a plurality of images by using one of the first and second imaging units in response to one of the first and second bodies having the one of the first and second imaging units pivots based on the hinge unit; and
combining the plurality of photographed images to generate a panorama image content.

12. The photographing method of claim 11, wherein:
while the first body pivots in a first direction based on the hinge unit, a live view generated by the first imaging unit is displayed on the second display unit, and the photographing of the plurality of images is performed by using the first imaging unit to capture the plurality of images within a first photographing range; and
the plurality of captured images captured in the first photographing range are combined to one another to generate the panorama image content.

13. The photographing method of claim 11, wherein:
while the first body pivots in a first direction based on the hinge unit, a live view generated by the first imaging unit is displayed on the second display unit, and the photographing of a first plurality of images is performed by using the first imaging unit to capture the first plurality of images within a photographing range;
while a second body pivots in a second direction different from the first direction based on the hinge unit, a live view generated by the second imaging unit is displayed on the first display unit, and the photographing of a second plurality of images is performed by the second imaging unit to capture the second plurality of images within a second photographing range; and
the first plurality of captured images captured within the first photographing range and the second plurality of captured images captured within the second photographing range are combined to one another to generate the panorama image content.

14. The photographing method of claim 12, wherein, while a particular portion of a subject is recognized in the live view, automatic photographing of the plurality of images is performed.

15. The photographing method of claim 12, wherein, while an interval angle between the first and second bodies meets a set condition, automatic photographing of the plurality of images is performed.

16. The photographing method of claim 12, wherein, while the pivoting starts, automatic photographing of the plurality of images is performed every set time period.

17. The photographing method of claim 11, wherein if a panorama photographing mode starts, a photographing range setting screen is displayed through at least one of the first and second display units, and if a photographing range is set on the photographing range setting screen, photographing angles of the first and second imaging units are automatically adjusted according to the set photographing range.

18. The photographing method of claim 11, wherein if a panorama photographing mode starts, a photographing range setting screen is displayed through at least one of the first and second imaging units, and a guide image is displayed on the first and second display units, wherein the guide image induces photographing angles of the first and second imaging units to be adjusted according to a set photographing range if the photographing range is set on the photographing range setting screen.

19. The photographing method of claim 11, further comprising: displaying a setting screen to respectively set one or more functions of the first and second display units through at least one of the first and second display units; and displaying the one or more functions selected on the setting screen on the first and second display units.

20. The photographing method of claim 19, wherein if a panorama display function is set on the first display unit, and a general display function is set on the second display unit, the panorama image content is displayed on the first display unit, and at least one of image contents photographed by the first and second imaging units is displayed on the second display unit.

21. A multi display device comprising:
a first body having a first display unit and a first imaging unit, the first imaging unit configured to perform photographing;
a second body having a second display unit and a second imaging unit, the second imaging unit configured to perform photographing;
a hinge unit disposed to couple to the first and second bodies; and
a controller configured to:
control the first imaging unit to perform photographing of a plurality of images while the first body pivots based on the hinge unit,
control the second imaging unit to display a live view generated by the first imaging unit, and
combine the plurality of photographed images to generate an image content.

* * * * *